US012653263B2

(12) United States Patent
Molyneux et al.

(10) Patent No.: US 12,653,263 B2
(45) Date of Patent: Jun. 16, 2026

(54) FOOTWEAR HAVING SENSOR SYSTEM

(71) Applicant: NIKE, Inc., Beaverton, OR (US)

(72) Inventors: James Molyneux, Portland, OR (US);
Aaron B. Weast, Portland, OR (US);
Jordan M. Rice, Portland, OR (US);
Allan M. Schrock, Portland, OR (US);
Michael S. Amos, Beaverton, OR (US);
Andrew A. Owings, Portland, OR
(US); Martine Stillman, Seattle, WA
(US); Joseph B. Horrell, Seattle, WA
(US); Jonathan B. Knight, Seattle, WA
(US); Dane R. Weitmann, Seattle, WA
(US); Jeffrey J. Hebert, Seattle, WA
(US)

(73) Assignee: NIKE, Inc., Beaverton, OR (US)

( * ) Notice: Subject to any disclaimer, the term of this
patent is extended or adjusted under 35
U.S.C. 154(b) by 0 days.

(21) Appl. No.: 17/340,805

(22) Filed: Jun. 7, 2021

(65) Prior Publication Data

US 2021/0289878 A1 Sep. 23, 2021

Related U.S. Application Data

(63) Continuation of application No. 16/035,099, filed on
Jul. 13, 2018, now Pat. No. 11,026,469, which is a
(Continued)

(51) Int. Cl.
*A43B 3/00* (2022.01)
*A43B 3/34* (2022.01)
(Continued)

(52) U.S. Cl.
CPC .............. *A43B 3/00* (2013.01); *A43B 3/0031*
(2013.01); *A43B 3/34* (2022.01); *A43B 3/44*
(2022.01);
(Continued)

(58) Field of Classification Search
CPC ........... A43B 3/00; A43B 3/0031; A43B 3/34;
A43B 3/44; A43B 3/46
See application file for complete search history.

(56) References Cited

U.S. PATENT DOCUMENTS

| | | | |
|---|---|---|---|
| 3,270,564 A | 9/1966 | Evans | |
| 4,372,558 A | 2/1983 | Shimamoto et al. | |
| | (Continued) | | |

FOREIGN PATENT DOCUMENTS

| | | | |
|---|---|---|---|
| CA | 2668946 A1 | 5/2008 | |
| CN | 1101757 A | 4/1995 | |
| | (Continued) | | |

OTHER PUBLICATIONS

Jul. 11, 2012—(WO) ISR & WO App No. PCT/US2012/025709.
(Continued)

*Primary Examiner* — Sharon M Prange
(74) *Attorney, Agent, or Firm* — Banner & Witcoff, Ltd.

(57) ABSTRACT

An article of footwear includes an upper member and a sole
structure, with a sensor system connected to the sole struc-
ture. The sensor system includes a plurality of sensors that
are configured for detecting forces exerted by a user's foot
on the sensor. The sensor system also includes a port that is
configured to receive a module to place the module in
communication with the sensors. The port includes a hous-
ing with a chamber configured to receive the module and an
interface engaged with the housing and having at least one
electrical contact exposed to the chamber. Additional retain-
ing structure and interface structure may be included.

17 Claims, 33 Drawing Sheets

Related U.S. Application Data continuation of application No. 13/399,786, filed on Feb. 17, 2012, now Pat. No. 10,070,680, which is a continuation-in-part of application No. 12/483,824, filed on Jun. 12, 2009, now Pat. No. 8,676,541, and a continuation-in-part of application No. 12/483,828, filed on Jun. 12, 2009, now Pat. No. 9,462,844.

(60) Provisional application No. 61/443,911, filed on Feb. 17, 2011, provisional application No. 61/443,800, filed on Feb. 17, 2011, provisional application No. 61/138,048, filed on Dec. 16, 2008, provisional application No. 61/061,427, filed on Jun. 13, 2008.

(51) Int. Cl.

| | |
|---|---|
| *A43B 3/44* | (2022.01) |
| *A63B 24/00* | (2006.01) |
| *A63B 60/46* | (2015.01) |
| *A63B 69/00* | (2006.01) |
| *G01C 22/00* | (2006.01) |
| *G01L 1/26* | (2006.01) |
| *G06F 3/033* | (2013.01) |
| *A63B 26/00* | (2006.01) |
| *A63B 71/06* | (2006.01) |
| *A63B 102/02* | (2015.01) |
| *A63B 102/18* | (2015.01) |
| *A63B 102/22* | (2015.01) |
| *A63B 102/32* | (2015.01) |

(52) U.S. Cl.

CPC .......... *A63B 24/0062* (2013.01); *A63B 60/46* (2015.10); *A63B 69/00* (2013.01); *A63B 69/0028* (2013.01); *G01C 22/006* (2013.01); *G01L 1/26* (2013.01); *G06F 3/0334* (2013.01); *A63B 26/003* (2013.01); *A63B 2069/0006* (2013.01); *A63B 2071/0638* (2013.01); *A63B 2102/02* (2015.10); *A63B 2102/18* (2015.10); *A63B 2102/182* (2015.10); *A63B 2102/22* (2015.10); *A63B 2102/32* (2015.10); *A63B 2220/12* (2013.01); *A63B 2220/40* (2013.01); *A63B 2220/53* (2013.01); *A63B 2220/836* (2013.01); *A63B 2225/50* (2013.01); *A63B 2243/0025* (2013.01); *A63F 2300/1012* (2013.01); *A63F 2300/1031* (2013.01)

(56) References Cited

U.S. PATENT DOCUMENTS

| | | | |
|---|---|---|---|
| 4,373,651 | A | 2/1983 | Fanslow |
| 4,518,267 | A | 5/1985 | Hepp |
| 4,578,769 | A | 3/1986 | Frederick |
| 4,578,969 | A | 4/1986 | Larson |
| 4,647,918 | A | 3/1987 | Goforth |
| 4,703,445 | A | 10/1987 | Dassler |
| 4,745,930 | A | 5/1988 | Confer |
| 4,771,555 | A | 9/1988 | Ohashi |
| 4,814,661 | A | 3/1989 | Ratzlaff et al. |
| 4,862,743 | A * | 9/1989 | Seitz ...................... G01L 1/146 |
| | | | 600/592 |
| 4,866,412 | A | 9/1989 | Rzepczynski |
| 4,991,317 | A | 2/1991 | Lakic |
| 5,010,774 | A | 4/1991 | Kikuo et al. |
| 5,033,291 | A | 7/1991 | Podoloff et al. |
| 5,047,952 | A | 9/1991 | Kramer et al. |
| 5,050,962 | A | 9/1991 | Monnier et al. |
| 5,150,536 | A | 9/1992 | Strong |
| 5,154,960 | A | 10/1992 | Mucci et al. |
| 5,249,967 | A | 10/1993 | O'Leary et al. |
| 5,253,656 | A | 10/1993 | Rincoe et al. |
| 5,303,131 | A | 4/1994 | Wu |
| 5,323,650 | A | 6/1994 | Fullen et al. |
| 5,357,696 | A | 10/1994 | Gray et al. |
| 5,373,651 | A | 12/1994 | Wood |
| 5,374,821 | A | 12/1994 | Muhs et al. |
| 5,393,651 | A | 2/1995 | Hoshi |
| 5,408,873 | A * | 4/1995 | Schmidt ................... G01L 1/20 |
| | | | 600/592 |
| 5,419,562 | A | 5/1995 | Cromarty |
| 5,422,521 | A | 6/1995 | Neer et al. |
| 5,444,462 | A | 8/1995 | Wambach |
| 5,471,405 | A | 11/1995 | Marsh |
| 5,500,635 | A | 3/1996 | Mott |
| 5,588,227 | A | 12/1996 | Goldston et al. |
| 5,636,146 | A | 6/1997 | Flentov et al. |
| 5,636,378 | A | 6/1997 | Griffith |
| 5,638,300 | A | 6/1997 | Johnson |
| 5,644,858 | A | 7/1997 | Bemis |
| 5,655,316 | A | 8/1997 | Huang |
| 5,678,448 | A * | 10/1997 | Fullen .................. A61B 5/1036 |
| | | | 600/592 |
| 5,697,791 | A | 12/1997 | Nashner et al. |
| 5,702,323 | A | 12/1997 | Poulton |
| 5,714,706 | A | 2/1998 | Nakada et al. |
| 5,720,200 | A | 2/1998 | Anderson et al. |
| 5,724,265 | A | 3/1998 | Hutchings |
| 5,764,786 | A | 6/1998 | Kuwashima et al. |
| 5,785,666 | A | 7/1998 | Costello et al. |
| 5,812,142 | A | 9/1998 | Small et al. |
| 5,813,142 | A | 9/1998 | Demon |
| 5,813,406 | A | 9/1998 | Kramer et al. |
| 5,815,954 | A | 10/1998 | Huang |
| 5,844,861 | A | 12/1998 | Maurer |
| 5,889,464 | A | 3/1999 | Huang |
| 5,903,454 | A | 5/1999 | Hoffberg et al. |
| 5,907,819 | A | 5/1999 | Johnson |
| 5,913,727 | A | 6/1999 | Ahdoot |
| 5,929,332 | A | 7/1999 | Brown |
| 5,957,642 | A | 9/1999 | Pratt |
| 5,960,380 | A | 9/1999 | Flentov et al. |
| 5,963,891 | A | 10/1999 | Walker et al. |
| 6,017,128 | A | 1/2000 | Goldston et al. |
| 6,018,705 | A | 1/2000 | Gaudet et al. |
| 6,050,962 | A | 4/2000 | Kramer et al. |
| 6,066,075 | A | 5/2000 | Poulton |
| 6,081,750 | A | 6/2000 | Hoffberg et al. |
| 6,122,340 | A | 9/2000 | Darley et al. |
| 6,122,846 | A | 9/2000 | Gray et al. |
| 6,148,280 | A | 11/2000 | Kramer |
| 6,174,294 | B1 | 1/2001 | Crabb et al. |
| 6,195,921 | B1 * | 3/2001 | Truong ................... A43B 3/00 |
| | | | 36/137 |
| 6,198,394 | B1 | 3/2001 | Jacobsen et al. |
| 6,226,577 | B1 | 5/2001 | Yeo |
| 6,266,623 | B1 | 7/2001 | Vock et al. |
| 6,287,200 | B1 | 9/2001 | Sharma |
| 6,298,314 | B1 | 10/2001 | Blackadar et al. |
| 6,305,100 | B1 | 10/2001 | Komarnycky et al. |
| 6,330,757 | B1 | 12/2001 | Russell |
| 6,336,365 | B1 | 1/2002 | Blackadar et al. |
| 6,356,856 | B1 | 3/2002 | Damen et al. |
| 6,357,147 | B1 | 3/2002 | Darley et al. |
| 6,360,597 | B1 | 3/2002 | Hubbard, Jr. |
| 6,426,490 | B1 | 7/2002 | Storz |
| 6,428,490 | B1 | 8/2002 | Kramer et al. |
| 6,430,843 | B1 | 8/2002 | Potter et al. |
| 6,493,652 | B1 | 12/2002 | Ohlenbusch et al. |
| 6,496,787 | B1 | 12/2002 | Flentov et al. |
| 6,496,952 | B1 | 12/2002 | Osada et al. |
| 6,498,994 | B2 | 12/2002 | Vock et al. |
| 6,515,284 | B1 | 2/2003 | Walle et al. |
| 6,516,284 | B2 | 2/2003 | Flentov et al. |
| 6,536,139 | B2 | 3/2003 | Darley et al. |
| 6,539,336 | B1 | 3/2003 | Vock et al. |
| 6,544,858 | B1 | 4/2003 | Beekman et al. |
| 6,560,903 | B1 | 5/2003 | Darley |
| 6,578,291 | B2 | 6/2003 | Hirsch et al. |
| 6,611,789 | B1 | 8/2003 | Darley |
| 6,640,144 | B1 | 10/2003 | Huang et al. |
| 6,656,042 | B2 | 12/2003 | Reiss et al. |

(56)                References Cited

U.S. PATENT DOCUMENTS

| | | | |
|---|---|---|---|
| 6,718,200 B2 | 4/2004 | Marmaropoulos et al. | |
| 6,748,462 B2 | 6/2004 | Dubil et al. | |
| 6,778,973 B2 | 8/2004 | Harlan | |
| 6,785,579 B2 | 8/2004 | Huang et al. | |
| 6,785,805 B1 | 8/2004 | House et al. | |
| 6,808,462 B2 | 10/2004 | Snyder et al. | |
| 6,829,512 B2 | 12/2004 | Huang et al. | |
| 6,836,744 B1 | 12/2004 | Asphahani et al. | |
| 6,876,947 B1 | 4/2005 | Darley et al. | |
| 6,882,897 B1 | 4/2005 | Fernandez | |
| 6,885,971 B2 | 4/2005 | Vock et al. | |
| 6,889,282 B2 | 5/2005 | Schollenberger | |
| 6,892,216 B2 | 5/2005 | Coburn, II et al. | |
| 6,909,420 B1 | 6/2005 | Nicolas et al. | |
| 6,922,664 B1 | 7/2005 | Fernandez et al. | |
| 6,932,698 B2 | 8/2005 | Sprogis | |
| 6,959,259 B2 | 10/2005 | Vock et al. | |
| 6,963,818 B2 | 11/2005 | Flentov et al. | |
| 6,978,320 B2 | 12/2005 | Nonaka | |
| 7,030,861 B1 | 4/2006 | Westerman et al. | |
| 7,045,151 B2 | 5/2006 | Trant | |
| 7,046,151 B2 | 5/2006 | Dundon | |
| 7,054,784 B2 | 5/2006 | Flentov et al. | |
| 7,057,551 B1 | 6/2006 | Vogt | |
| 7,070,571 B2 | 7/2006 | Kramer et al. | |
| 7,072,789 B2 | 7/2006 | Vock et al. | |
| 7,092,846 B2 | 8/2006 | Vock et al. | |
| 7,152,343 B2 | 12/2006 | Whatley | |
| 7,162,392 B2 | 1/2007 | Vock et al. | |
| 7,171,331 B2 | 1/2007 | Vock et al. | |
| 7,200,517 B2 | 4/2007 | Darley et al. | |
| 7,219,449 B1 | 5/2007 | Hoffberg et al. | |
| 7,245,898 B2 | 7/2007 | Van Bosch et al. | |
| 7,277,021 B2 | 10/2007 | Beebe et al. | |
| 7,283,647 B2 | 10/2007 | McNitt | |
| 7,304,580 B2 | 12/2007 | Sullivan et al. | |
| 7,310,895 B2 | 12/2007 | Whittlesey et al. | |
| 7,383,728 B2 | 6/2008 | Noble et al. | |
| RE40,474 E | 9/2008 | Quellais et al. | |
| 7,426,873 B1 * | 9/2008 | Kholwadwala | A43B 3/00 |
| | | | 73/818 |
| 7,428,471 B2 | 9/2008 | Darley et al. | |
| 7,433,805 B2 | 10/2008 | Vock et al. | |
| 7,457,724 B2 | 11/2008 | Vock et al. | |
| 7,497,037 B2 | 3/2009 | Vick et al. | |
| 7,498,856 B2 | 3/2009 | Lin et al. | |
| 7,498,956 B2 | 3/2009 | Baier et al. | |
| 7,522,970 B2 | 4/2009 | Fernandez | |
| 7,552,549 B2 | 6/2009 | Whittlesey et al. | |
| 7,579,946 B2 | 8/2009 | Case, Jr. | |
| 7,596,891 B2 | 10/2009 | Carnes et al. | |
| 7,602,301 B1 | 10/2009 | Stirling et al. | |
| 7,607,243 B2 * | 10/2009 | Berner, Jr. | A43B 3/34 |
| | | | 36/137 |
| 7,617,068 B2 | 11/2009 | Tadin et al. | |
| 7,623,987 B2 | 11/2009 | Vock et al. | |
| 7,625,314 B2 | 12/2009 | Ungari et al. | |
| 7,651,442 B2 | 1/2010 | Carlson | |
| 7,658,694 B2 | 2/2010 | Ungari | |
| 7,670,263 B2 | 3/2010 | Ellis et al. | |
| 7,726,206 B2 | 6/2010 | Terrafranca, Jr. et al. | |
| 7,726,994 B1 | 6/2010 | Willey | |
| 7,739,076 B1 | 6/2010 | Vock et al. | |
| 7,758,523 B2 | 7/2010 | Collings et al. | |
| 7,771,320 B2 | 8/2010 | Riley et al. | |
| 7,805,150 B2 | 9/2010 | Graham et al. | |
| 7,816,632 B2 | 10/2010 | Bourke, III et al. | |
| 7,840,378 B2 | 11/2010 | Vock et al. | |
| 7,901,325 B2 | 3/2011 | Henderson | |
| 7,905,815 B2 | 3/2011 | Ellis et al. | |
| 7,909,737 B2 | 3/2011 | Ellis et al. | |
| 7,921,716 B2 | 4/2011 | Morris Bamberg et al. | |
| 7,934,983 B1 | 5/2011 | Eisner | |
| 7,969,315 B1 | 6/2011 | Ross et al. | |
| 7,997,007 B2 | 8/2011 | Sanabria-Hernandez | |

| | | | |
|---|---|---|---|
| 8,056,268 B2 | 11/2011 | DiBenedetto et al. | |
| 8,061,061 B1 | 11/2011 | Rivas | |
| 8,099,258 B2 | 1/2012 | Alten et al. | |
| 8,131,498 B1 | 3/2012 | McCauley | |
| 8,142,267 B2 | 3/2012 | Adams | |
| 8,172,722 B2 | 5/2012 | Molyneux et al. | |
| 8,212,158 B2 | 7/2012 | Wiest | |
| 8,216,081 B2 | 7/2012 | Snyder et al. | |
| 8,251,930 B2 | 8/2012 | Ido | |
| 8,253,586 B1 | 8/2012 | Matak | |
| 8,291,618 B2 | 10/2012 | Ellis | |
| 8,333,643 B2 | 12/2012 | Eisner | |
| 8,467,979 B2 | 6/2013 | Sobolewski | |
| 8,474,153 B2 | 7/2013 | Brie et al. | |
| 8,484,654 B2 | 7/2013 | Graham et al. | |
| 8,676,541 B2 | 3/2014 | Schrock et al. | |
| 8,739,639 B2 | 6/2014 | Owings et al. | |
| 8,870,795 B2 * | 10/2014 | Kim | A61B 5/1038 |
| | | | 600/592 |
| 9,089,182 B2 | 7/2015 | Schrock et al. | |
| 9,445,646 B2 | 9/2016 | Cook et al. | |
| 9,462,844 B2 | 10/2016 | Schrock et al. | |
| 9,642,415 B2 | 5/2017 | Pease et al. | |
| 10,314,361 B2 | 6/2019 | Amos et al. | |
| 2001/0003665 A1 | 6/2001 | Kim | |
| 2001/0054043 A1 | 12/2001 | Harlan | |
| 2002/0035184 A1 | 3/2002 | Plaver et al. | |
| 2002/0134153 A1 | 9/2002 | Grenlund | |
| 2003/0009308 A1 | 1/2003 | Kirtley | |
| 2003/0054327 A1 | 3/2003 | Evensen | |
| 2003/0097878 A1 | 5/2003 | Farringdon et al. | |
| 2003/0120183 A1 | 6/2003 | Simmons | |
| 2003/0163287 A1 | 8/2003 | Vock et al. | |
| 2003/0207718 A1 | 11/2003 | Perlmutter | |
| 2004/0078091 A1 | 4/2004 | Elkins | |
| 2004/0148799 A1 | 8/2004 | Lussier et al. | |
| 2004/0154190 A1 | 8/2004 | Munster | |
| 2004/0162702 A1 | 8/2004 | Pandipati et al. | |
| 2004/0177531 A1 | 9/2004 | DiBenedetto et al. | |
| 2004/0215413 A1 | 10/2004 | Weldum et al. | |
| 2004/0218317 A1 | 11/2004 | Kawazu et al. | |
| 2004/0225467 A1 | 11/2004 | Vock et al. | |
| 2004/0226192 A1 | 11/2004 | Geer et al. | |
| 2005/0011085 A1 | 1/2005 | Swigart et al. | |
| 2005/0032582 A1 | 2/2005 | Mahajan et al. | |
| 2005/0046576 A1 | 3/2005 | Julian et al. | |
| 2005/0106977 A1 | 5/2005 | Coulston | |
| 2005/0183292 A1 | 8/2005 | DiBenedetto et al. | |
| 2005/0188566 A1 | 9/2005 | Whittlesey et al. | |
| 2005/0217142 A1 | 10/2005 | Ellis, III | |
| 2005/0221403 A1 | 10/2005 | Gazenko | |
| 2005/0231379 A1 | 10/2005 | Sprecher et al. | |
| 2005/0261609 A1 | 11/2005 | Collings et al. | |
| 2005/0282633 A1 | 12/2005 | Nicolas et al. | |
| 2006/0010174 A1 | 1/2006 | Nguyen et al. | |
| 2006/0017692 A1 | 1/2006 | Wehrenberg et al. | |
| 2006/0025229 A1 | 2/2006 | Mahajan et al. | |
| 2006/0026120 A1 | 2/2006 | Carolan et al. | |
| 2006/0053656 A1 | 3/2006 | Kumle | |
| 2006/0082977 A1 | 4/2006 | Kim | |
| 2006/0091715 A1 | 5/2006 | Schmitz et al. | |
| 2006/0143645 A1 | 6/2006 | Vock et al. | |
| 2006/0144152 A1 | 7/2006 | Cabuz et al. | |
| 2006/0217231 A1 | 9/2006 | Parks et al. | |
| 2006/0226843 A1 | 10/2006 | Al-Anbuky et al. | |
| 2006/0248749 A1 | 11/2006 | Ellis | |
| 2006/0262120 A1 | 11/2006 | Rosenberg | |
| 2006/0282017 A1 | 12/2006 | Avni et al. | |
| 2006/0283050 A1 * | 12/2006 | Carnes | A43B 3/34 |
| | | | 36/35 R |
| 2007/0000154 A1 | 1/2007 | DiBenedetto et al. | |
| 2007/0006489 A1 | 1/2007 | Case et al. | |
| 2007/0016091 A1 | 1/2007 | Butt et al. | |
| 2007/0026421 A1 | 2/2007 | Sundberg et al. | |
| 2007/0028486 A1 | 2/2007 | Montanya et al. | |
| 2007/0032748 A1 | 2/2007 | McNeil et al. | |
| 2007/0033838 A1 | 2/2007 | Luce et al. | |
| 2007/0060408 A1 | 3/2007 | Schultz et al. | |
| 2007/0063849 A1 | 3/2007 | Rosella et al. | |

(56)  References Cited

U.S. PATENT DOCUMENTS

| 2007/0063850 A1 | 3/2007 | Devaul et al. |
| 2007/0067885 A1 | 3/2007 | Fernandez |
| 2007/0068244 A1 | 3/2007 | Billing et al. |
| 2007/0073178 A1 | 3/2007 | Browning et al. |
| 2007/0078324 A1 | 4/2007 | Wijisiriwardana |
| 2007/0082389 A1 | 4/2007 | Clark et al. |
| 2007/0094890 A1 | 5/2007 | Cho et al. |
| 2007/0118328 A1 | 5/2007 | Vock et al. |
| 2007/0143452 A1 | 6/2007 | Suenbuel et al. |
| 2007/0152812 A1 | 7/2007 | Wong et al. |
| 2007/0173705 A1 | 7/2007 | Teller et al. |
| 2007/0193070 A1 | 8/2007 | Bertagna et al. |
| 2007/0208544 A1 | 9/2007 | Kulach et al. |
| 2007/0232455 A1 | 10/2007 | Hanoun |
| 2007/0250286 A1 | 10/2007 | Duncan et al. |
| 2007/0260421 A1* | 11/2007 | Berner ................. G01C 22/006 |
| | | 702/155 |
| 2007/0261271 A1 | 11/2007 | Krouse |
| 2007/0283599 A1 | 12/2007 | Talbott |
| 2008/0027679 A1 | 1/2008 | Shklarski |
| 2008/0028783 A1 | 2/2008 | Immel et al. |
| 2008/0039203 A1 | 2/2008 | Ackley et al. |
| 2008/0048616 A1 | 2/2008 | Paul et al. |
| 2008/0056508 A1 | 3/2008 | Pierce et al. |
| 2008/0060224 A1 | 3/2008 | Whittlesey et al. |
| 2008/0061023 A1 | 3/2008 | Moor |
| 2008/0066343 A1 | 3/2008 | Sanabria-Hernandez |
| 2008/0066560 A1 | 3/2008 | Yu et al. |
| 2008/0127527 A1 | 6/2008 | Chen |
| 2008/0134583 A1 | 6/2008 | Polus |
| 2008/0165140 A1 | 7/2008 | Christie et al. |
| 2008/0172498 A1 | 7/2008 | Boucard |
| 2008/0177507 A1 | 7/2008 | Mian et al. |
| 2008/0188353 A1 | 8/2008 | Vitolo et al. |
| 2008/0200312 A1 | 8/2008 | Tagliabue |
| 2008/0203144 A1 | 8/2008 | Kim |
| 2008/0218310 A1 | 9/2008 | Alten et al. |
| 2008/0221403 A1 | 9/2008 | Fernandez |
| 2008/0246629 A1 | 10/2008 | Tsui et al. |
| 2008/0255794 A1 | 10/2008 | Levine |
| 2008/0258921 A1 | 10/2008 | Woo et al. |
| 2008/0259028 A1 | 10/2008 | Teepell et al. |
| 2008/0269644 A1 | 10/2008 | Ray |
| 2008/0287832 A1 | 11/2008 | Collins et al. |
| 2008/0293023 A1 | 11/2008 | Diehl et al. |
| 2008/0297832 A1 | 12/2008 | Otsuka |
| 2008/0306410 A1 | 12/2008 | Kalpaxis et al. |
| 2008/0307899 A1 | 12/2008 | Von Lilienfeld-Toal et al. |
| 2008/0318679 A1 | 12/2008 | Tran et al. |
| 2009/0018691 A1 | 1/2009 | Fernandez |
| 2009/0027917 A1 | 1/2009 | Chen et al. |
| 2009/0048538 A1 | 2/2009 | Levine et al. |
| 2009/0061837 A1 | 3/2009 | Chaudhri et al. |
| 2009/0075347 A1 | 3/2009 | Cervin et al. |
| 2009/0075781 A1 | 3/2009 | Schwarzberg et al. |
| 2009/0076341 A1 | 3/2009 | James et al. |
| 2009/0100705 A1 | 4/2009 | Cook et al. |
| 2009/0105047 A1 | 4/2009 | Guidi et al. |
| 2009/0107009 A1* | 4/2009 | Bishop .................... A43B 3/00 |
| | | 36/114 |
| 2009/0135001 A1 | 5/2009 | Yuk |
| 2009/0137933 A1 | 5/2009 | Lieberman et al. |
| 2009/0149299 A1 | 6/2009 | Tchao et al. |
| 2009/0150178 A1 | 6/2009 | Sutton et al. |
| 2009/0152456 A1 | 6/2009 | Waid et al. |
| 2009/0153369 A1 | 6/2009 | Baier et al. |
| 2009/0153477 A1 | 6/2009 | Saenz |
| 2009/0163287 A1 | 6/2009 | Vald'Via et al. |
| 2009/0163322 A1 | 6/2009 | Andren et al. |
| 2009/0167677 A1 | 7/2009 | Kruse et al. |
| 2009/0171614 A1 | 7/2009 | Damen |
| 2009/0259566 A1 | 10/2009 | White, III et al. |
| 2009/0262088 A1 | 10/2009 | Moll-Carrillo et al. |
| 2009/0293319 A1 | 12/2009 | Avni |
| 2009/0297832 A1 | 12/2009 | Hatta et al. |

| 2010/0000121 A1 | 1/2010 | Brodie et al. |
| 2010/0004566 A1 | 1/2010 | Son et al. |
| 2010/0009810 A1 | 1/2010 | Trzecieski |
| 2010/0023231 A1 | 1/2010 | Allgaier et al. |
| 2010/0023531 A1 | 1/2010 | Brisebois et al. |
| 2010/0035688 A1 | 2/2010 | Picunko |
| 2010/0053867 A1 | 3/2010 | Ellis et al. |
| 2010/0056340 A1 | 3/2010 | Ellis et al. |
| 2010/0057951 A1 | 3/2010 | Ellis et al. |
| 2010/0059561 A1 | 3/2010 | Ellis et al. |
| 2010/0062740 A1 | 3/2010 | Ellis et al. |
| 2010/0063778 A1 | 3/2010 | Schrock et al. |
| 2010/0063779 A1 | 3/2010 | Schrock et al. |
| 2010/0065836 A1 | 3/2010 | Lee |
| 2010/0072948 A1 | 3/2010 | Sun et al. |
| 2010/0082735 A1 | 4/2010 | Petersen et al. |
| 2010/0088023 A1 | 4/2010 | Werner |
| 2010/0094147 A1 | 4/2010 | Inan et al. |
| 2010/0111705 A1 | 5/2010 | Sato et al. |
| 2010/0113160 A1 | 5/2010 | Belz et al. |
| 2010/0129780 A1 | 5/2010 | Homsi et al. |
| 2010/0152619 A1 | 6/2010 | Kalpaxis et al. |
| 2010/0184563 A1 | 7/2010 | Molyneux et al. |
| 2010/0184564 A1 | 7/2010 | Molyneux et al. |
| 2010/0191490 A1 | 7/2010 | Martens et al. |
| 2010/0201500 A1 | 8/2010 | Stirling et al. |
| 2010/0201512 A1 | 8/2010 | Stirling et al. |
| 2010/0204616 A1 | 8/2010 | Shears et al. |
| 2010/0225763 A1 | 9/2010 | Vock et al. |
| 2010/0231580 A1 | 9/2010 | Miyasaka |
| 2010/0286601 A1 | 11/2010 | Yodfat et al. |
| 2010/0292599 A1 | 11/2010 | Oleson et al. |
| 2010/0298659 A1 | 11/2010 | McCombie et al. |
| 2010/0312083 A1 | 12/2010 | Southerland |
| 2010/0324455 A1 | 12/2010 | Rangel et al. |
| 2010/0332188 A1 | 12/2010 | Vock et al. |
| 2011/0003665 A1 | 1/2011 | Burton et al. |
| 2011/0021280 A1 | 1/2011 | Boroda et al. |
| 2011/0087445 A1* | 4/2011 | Sobolewski ............. A43B 3/34 |
| | | 36/114 |
| 2011/0107369 A1 | 5/2011 | O'Brien et al. |
| 2011/0119027 A1 | 5/2011 | Zhu et al. |
| 2011/0119058 A1 | 5/2011 | Berard et al. |
| 2011/0136627 A1 | 6/2011 | Williams |
| 2011/0152695 A1 | 6/2011 | Granqvist et al. |
| 2011/0203390 A1 | 8/2011 | Tao et al. |
| 2011/0208444 A1 | 8/2011 | Solinsky |
| 2011/0214501 A1 | 9/2011 | Ross et al. |
| 2012/0041767 A1 | 2/2012 | Hoffman et al. |
| 2012/0050351 A1 | 3/2012 | Dobler et al. |
| 2012/0050529 A1 | 3/2012 | Bentley |
| 2012/0234111 A1 | 9/2012 | Molyneux et al. |
| 2012/0291563 A1 | 11/2012 | Schrock et al. |
| 2012/0291564 A1 | 11/2012 | Amos et al. |
| 2013/0019694 A1 | 1/2013 | Molyneux et al. |
| 2013/0079907 A1 | 3/2013 | Homsi et al. |
| 2013/0171599 A1 | 7/2013 | Bleich et al. |
| 2013/0190903 A1 | 7/2013 | Balakrishnan et al. |
| 2013/0213145 A1 | 8/2013 | Owings et al. |
| 2014/0033572 A1 | 2/2014 | Steier et al. |
| 2014/0174205 A1 | 6/2014 | Clarke et al. |
| 2014/0222173 A1 | 8/2014 | Giedwoyn et al. |
| 2014/0350435 A1 | 11/2014 | Lam |
| 2015/0177081 A1* | 6/2015 | Steier ........................ G01L 1/20 |
| | | 600/592 |
| 2015/0257475 A1 | 9/2015 | Langvin et al. |
| 2016/0242500 A1 | 8/2016 | Langvin et al. |
| 2016/0345663 A1 | 12/2016 | Walker et al. |

FOREIGN PATENT DOCUMENTS

| CN | 1213520 A | 4/1999 |
| CN | 1596083 A | 3/2005 |
| CN | 1839724 A | 10/2006 |
| CN | 200977748 Y | 11/2007 |
| CN | 200994779 Y | 12/2007 |
| CN | 101116561 A | 2/2008 |
| CN | 101240461 A | 8/2008 |
| CN | 101242880 A | 8/2008 |

(56) References Cited

FOREIGN PATENT DOCUMENTS

| CN | 101367011 A | 2/2009 |
|----|----|----|
| CN | 101367012 A | 2/2009 |
| CN | 101784230 A | 7/2010 |
| CN | 101890215 A | 11/2010 |
| CN | 101894206 A | 11/2010 |
| CN | 101951798 A | 1/2011 |
| CN | 102143695 A | 8/2011 |
| CN | 201948063 U | 8/2011 |
| DE | 370480 C | 3/1923 |
| EP | 0160880 A1 | 11/1985 |
| EP | 0662600 A1 | 7/1995 |
| EP | 1707065 A1 | 10/2006 |
| EP | 1928178 A1 | 6/2008 |
| EP | 2189191 A2 | 5/2010 |
| FR | 2929827 A1 | 10/2009 |
| GB | 251054 A | 4/1926 |
| GB | 2421416 A | 6/2006 |
| JP | S5616302 U | 2/1981 |
| JP | 5664301 | 5/1981 |
| JP | H023020 A | 1/1990 |
| JP | H0355077 A | 3/1991 |
| JP | 0561724 | 6/1993 |
| JP | H06014803 A | 1/1994 |
| JP | H06336967 A | 12/1994 |
| JP | H08089482 A | 4/1996 |
| JP | H10241648 A | 9/1998 |
| JP | 3036281 B2 | 4/2000 |
| JP | 2001028260 A | 1/2001 |
| JP | 2001351591 A | 12/2001 |
| JP | 2002163404 A | 6/2002 |
| JP | 2003236002 A | 8/2003 |
| JP | 2004267784 A | 9/2004 |
| JP | 2005079019 A | 3/2005 |
| JP | 2005507678 A | 3/2005 |
| JP | 2005156531 A | 6/2005 |
| JP | 2005270640 A | 10/2005 |
| JP | 2006086072 A | 3/2006 |
| JP | 2006280955 A | 10/2006 |
| JP | 2007134473 A | 5/2007 |
| JP | 200715117 | 6/2007 |
| JP | 20083752 A | 10/2008 |
| JP | 2009148338 A | 7/2009 |
| JP | 2009158401 A | 7/2009 |
| JP | 2009535157 A | 10/2009 |
| JP | 2010088886 A | 4/2010 |
| JP | 2010517725 A | 5/2010 |
| JP | 2011112938 A | 6/2011 |
| JP | 2011524207 A | 9/2011 |
| JP | 2011196931 A | 10/2011 |
| JP | 2012065942 A | 4/2012 |
| JP | 2012524638 A | 10/2012 |
| JP | 20229776 A | 1/2022 |
| KR | 20050032119 | 4/2005 |
| KR | 20060021632 | 3/2006 |
| KR | 20060034353 A | 4/2006 |
| KR | 20070090474 A | 9/2007 |
| KR | 20090102550 | 9/2009 |
| KR | 20100012845 U | 12/2010 |
| KR | 20100130860 A | 12/2010 |
| KR | 20110071728 A | 6/2011 |
| KR | 20110124964 A | 11/2011 |
| KR | 20130130051 | 11/2013 |
| TW | 200838475 A | 10/2008 |
| WO | 98007341 A2 | 2/1998 |
| WO | 200033031 A1 | 6/2000 |
| WO | 2002035184 A2 | 5/2002 |
| WO | 2006065679 A2 | 6/2006 |
| WO | 2006067434 A1 | 6/2006 |
| WO | 2006091715 A1 | 8/2006 |
| WO | 2007064735 A2 | 6/2007 |
| WO | 2007082389 A1 | 7/2007 |
| WO | 2007128049 A1 | 11/2007 |
| WO | 2007130287 A2 | 11/2007 |
| WO | 2008061023 A2 | 5/2008 |
| WO | 2008101085 A2 | 8/2008 |
| WO | 2008134583 A1 | 11/2008 |
| WO | 2009027917 A1 | 3/2009 |
| WO | 2009126818 A2 | 10/2009 |
| WO | 2009152456 A2 | 12/2009 |
| WO | 2010065836 A2 | 6/2010 |
| WO | 2010065886 A1 | 6/2010 |
| WO | 2010111705 A2 | 9/2010 |
| WO | 2011157607 A1 | 12/2011 |
| WO | 2012021507 A2 | 2/2012 |
| WO | 2012061804 A1 | 5/2012 |
| WO | 2012109244 A1 | 8/2012 |
| WO | 2012112930 A1 | 8/2012 |
| WO | 2012112931 A2 | 8/2012 |
| WO | 2012112934 A2 | 8/2012 |
| WO | 2012112938 A2 | 8/2012 |
| WO | 2012143274 A2 | 10/2012 |
| WO | 2014100045 A1 | 6/2014 |

OTHER PUBLICATIONS

Aug. 21, 2013—(WO) International Preliminary Report on Patentability App No. PCT/US2012/025713.

Morris, Stacy J., A Shoe-Integrated Sensor System for Wireless Gait Analysis and Real-Time Therapeutic Feedback, dissertation, 2004, pp. 1-314, Massachusetts Institute of Technology, MA.

May 28, 2013—(WO) ISR & WO App No. PCT/US2013/027421.

Fleming et al, Athlete and Coach Perceptions of Technology Needs for Evaluating Running Performance, article, Aug. 14, 2010, 18 pages, 13:1-18, UK.

Salpavaara, et al. Wireless Insole Sensor System for Plantar Force Measurements during Sports Events, article, Sep. 6-11, 2009, XIX IMEKO World Congress, Fundamental and Applied Metrology, 6 pages, Lisbon, Portugal.

Mar. 7, 2012—(WO) ISR and WO—App. PCT/US2011/060187.

Jul. 15, 2013—(WO) Search Report and Written Opinion—App. No. PCT/US2013/022219.

Lovell, "A system for real-time gesture recognition and classification of coordinated motion," Massachusetts Institute of Technology, Dept. of Electrical Engineering and Computer Science, 2005, <http://dspace.mit.edu/handle/1721.1/33290> (2 pages).

Chee et al, "A low cost wearable wireless sensing system for upper limb home rehabilitation," Robotics Automation and Mechatronics (RAM) 2010 IEEE Conference on Jun. 28-30, 2010; Abstract printout (1 page).

Guraliuc et al., "Channel model for on the body communication along and around the human torso at 2.4Ghz and 5.8Ghz," Antenna Technology (IWAT), 2010 International Workshop on Mar. 1-3, 2010; Abstract printout (1 page).

Jun. 21, 2012—(WO) ISR—App No. PCT/US2012/025701.

Frazier, Karen, "How Many Calories to 1 Carb?" published Nov. 12, 2010, Livestrong.com, 3 pages.

Oct. 1, 2013—(WO) ISR and WO—App No. PCT/US2013/048157.

Llosa et al., "Design of a Motion Detector to Monitor Rowing Performance Based on Wireless Sensor Networks," Intelligent Networking and Collaborative Systems, 2009, http://ieeexplore.ieee.org/xpl/freeabs_all.jsp?arnumber=5369324 (1 page).

Choquette et al., "Accelerometer-based wireless body area network to estimate intensity of therapy in post-acute rehabilitation," Journal of NeuroEngineering and Rehabilitation 2008, http://www.jneuroengrehab.com/content/5/1/20/abstract (1 page).

Morris, "A shoe-integrated sensor system for wireless gait analysis and real-time therapeutic feedback," Harvard-MIT Division of Health Sciences and Technology, 2004, http://dspace.mitedu/handle/1721.1/28601 (3 pages).

Lapinski, "A wearable, wireless sensor system for sports medicine," Massachusetts Institute of Technology, School of Architecture and Planning, Program in Media Arts and Sciences, 2008, http://dspace.mit.edulhandle/1721.1/46581(3 pages).

Aylward, "Sensemble : a wireless inertial sensor system for the interactive dance and collective motion analysis," Massachusetts Institute of Technology, School of Architecture and Planning, Program in Media Arts and Sciences, 2006, http://dspace.mitedu/handle/1721.1/37391 (3 pages).

(56)          References Cited

OTHER PUBLICATIONS

Danko; How to Work a Nike Sensor; Dec. 26, 2010; eHow website; 4 pages.
Coyne; Stout's Shoes on Mass Ave Oldest Shoe Store in the USA; Jun. 18, 2013; FunCityFinder website; 5 pages.
Jul. 2, 2009—(WO) International Search Report and Written Opinion—App. No. PCT/US2009/35877.
Jun. 15, 2010—(WO) International Search Report—App. No. PCT/US2009/066745.
May 11, 2010—(WO) International Search Report—App. No. PCT/US2009/066819.
Apr. 25, 2012—(EP) European Search Report—App. No. 11 195 591.0.
Davis, The Re-emergence of the Minimal Running Shoe, Clinical Commentary, Journal of Orthopaedic & Sports Physical Therapy, vol. 44, No. 10, pp. 775-784, Oct. 2014.

Lim, Joo-Tack, STO Ltd., Final Report on IT development cooperative project, "Development of IT running shoes that an transmit athletic information of the shoes when running and development of receiver technology," Ministry of Knowledge Economy (Institute For Information Technology Advancement (ITA)) (Jun. 30, 2009).
Aug. 9, 2016—(EP) Extended Search Report—App. No. 16170589.2.
Sep. 1, 2016—(EP) Extended Search Report—App. No. 16167470.0.
Sep. 25, 2012—(WO) ISR & WO, App. No. PCT/US12/025713.
Mar. 15, 2017—(EP) ESR—App. No. 16199665.7.
Dec. 11, 2009—(WO) ISR—App. No. PCT/US09/047246.
Aug. 7, 2013—(WO) ISR—App. No. PCT/US13/027397.
Aug. 21, 2012—(WO) ISR and WO—App. No. PCT/US2012/025717.

* cited by examiner

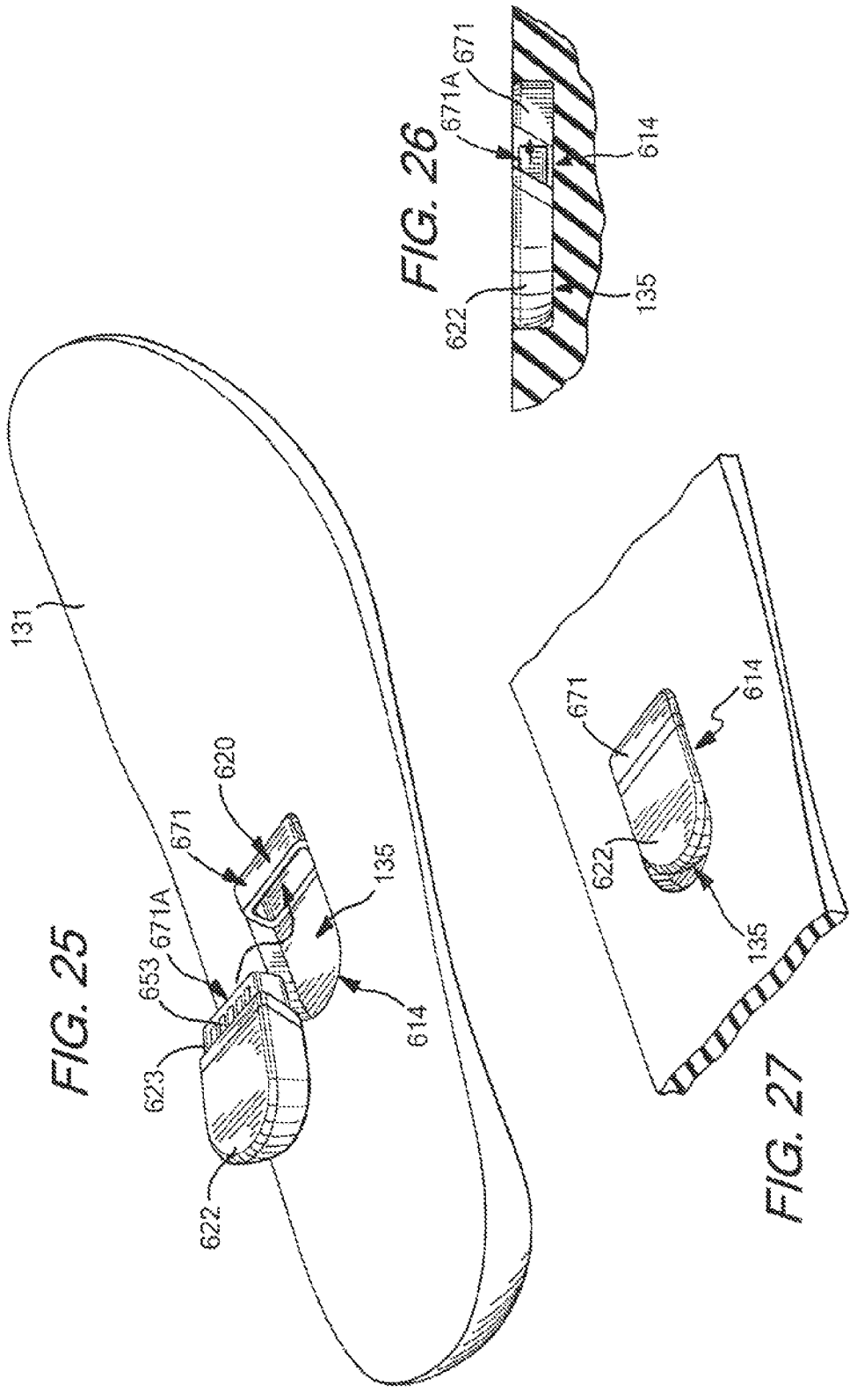

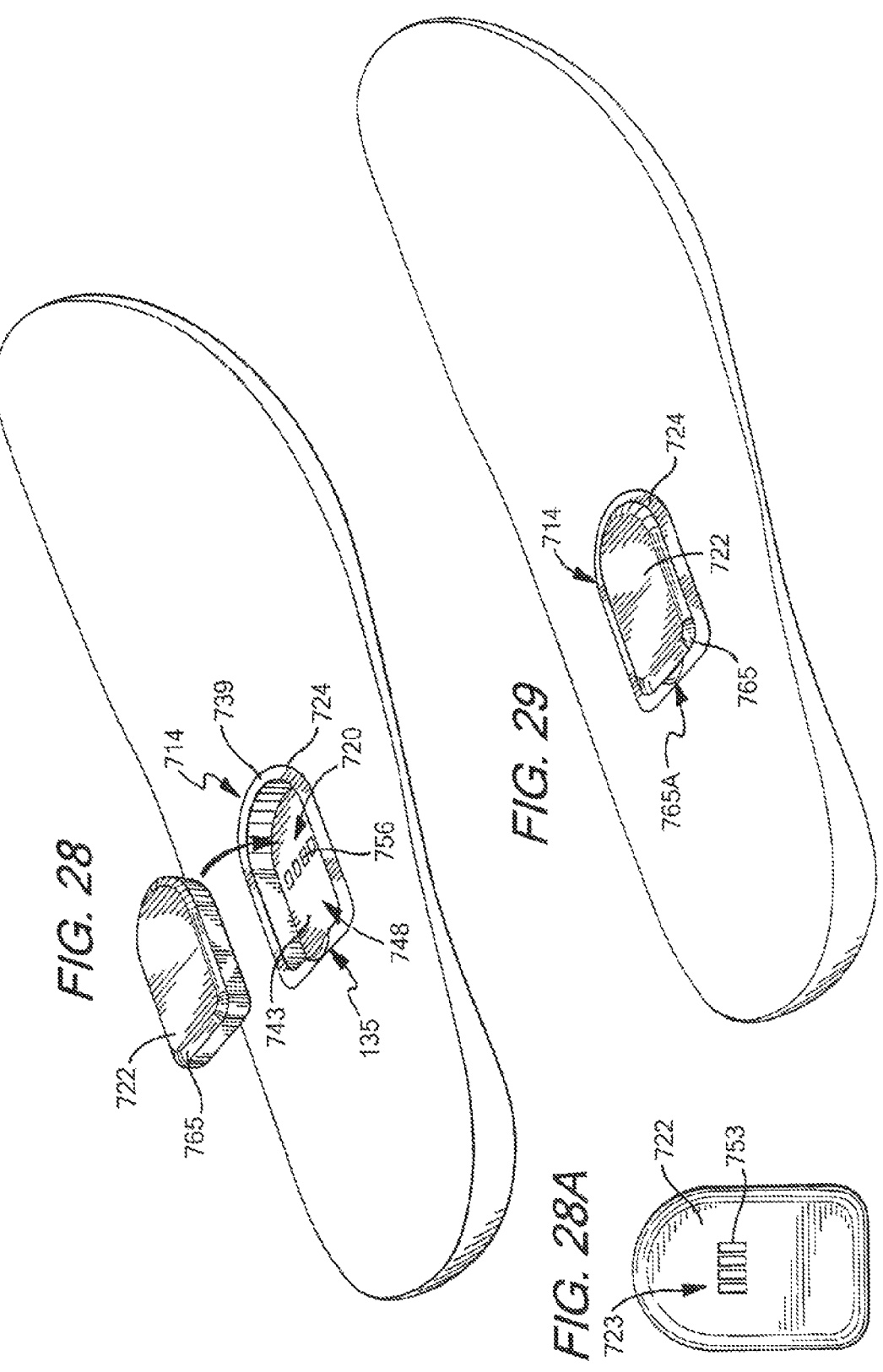

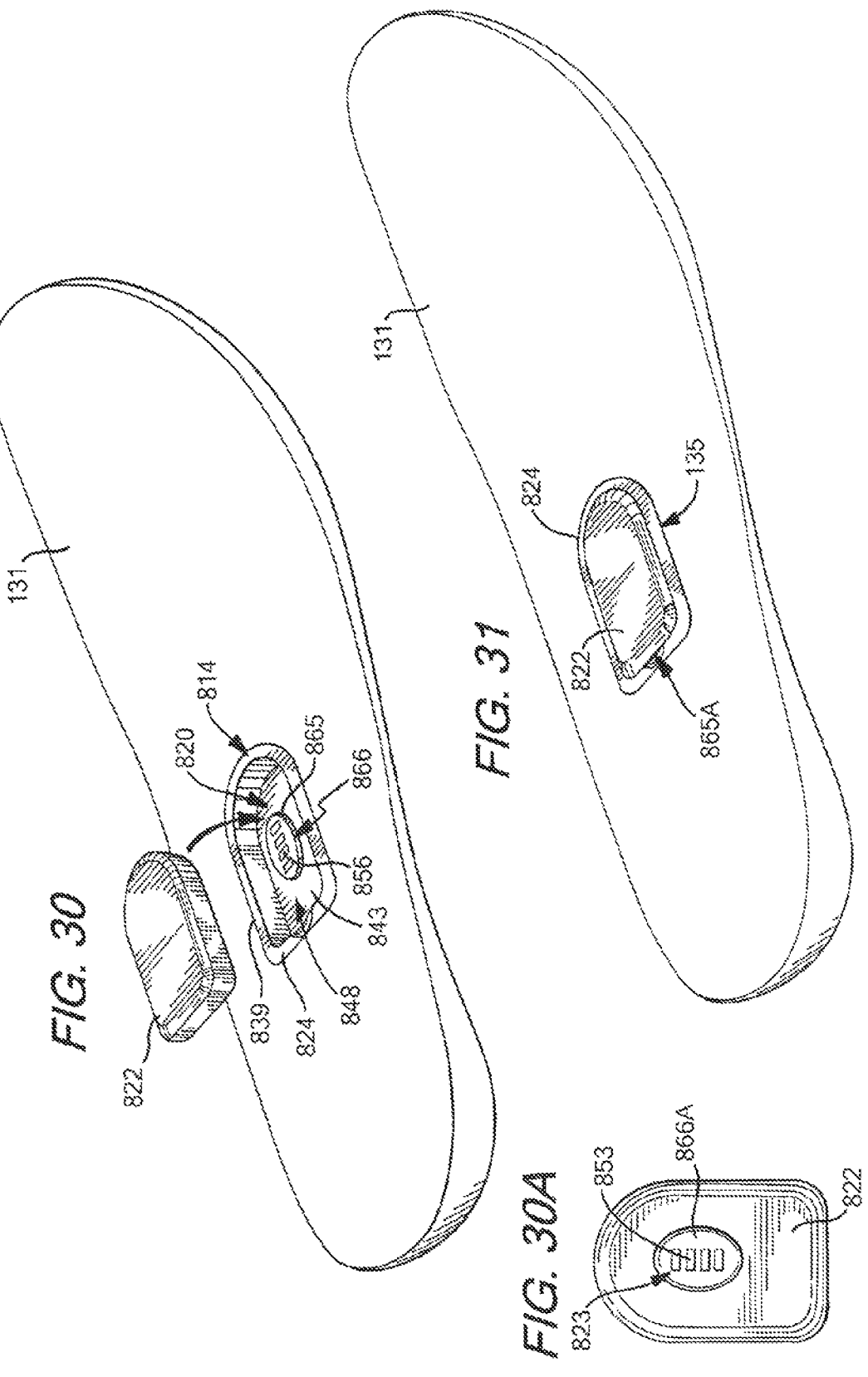

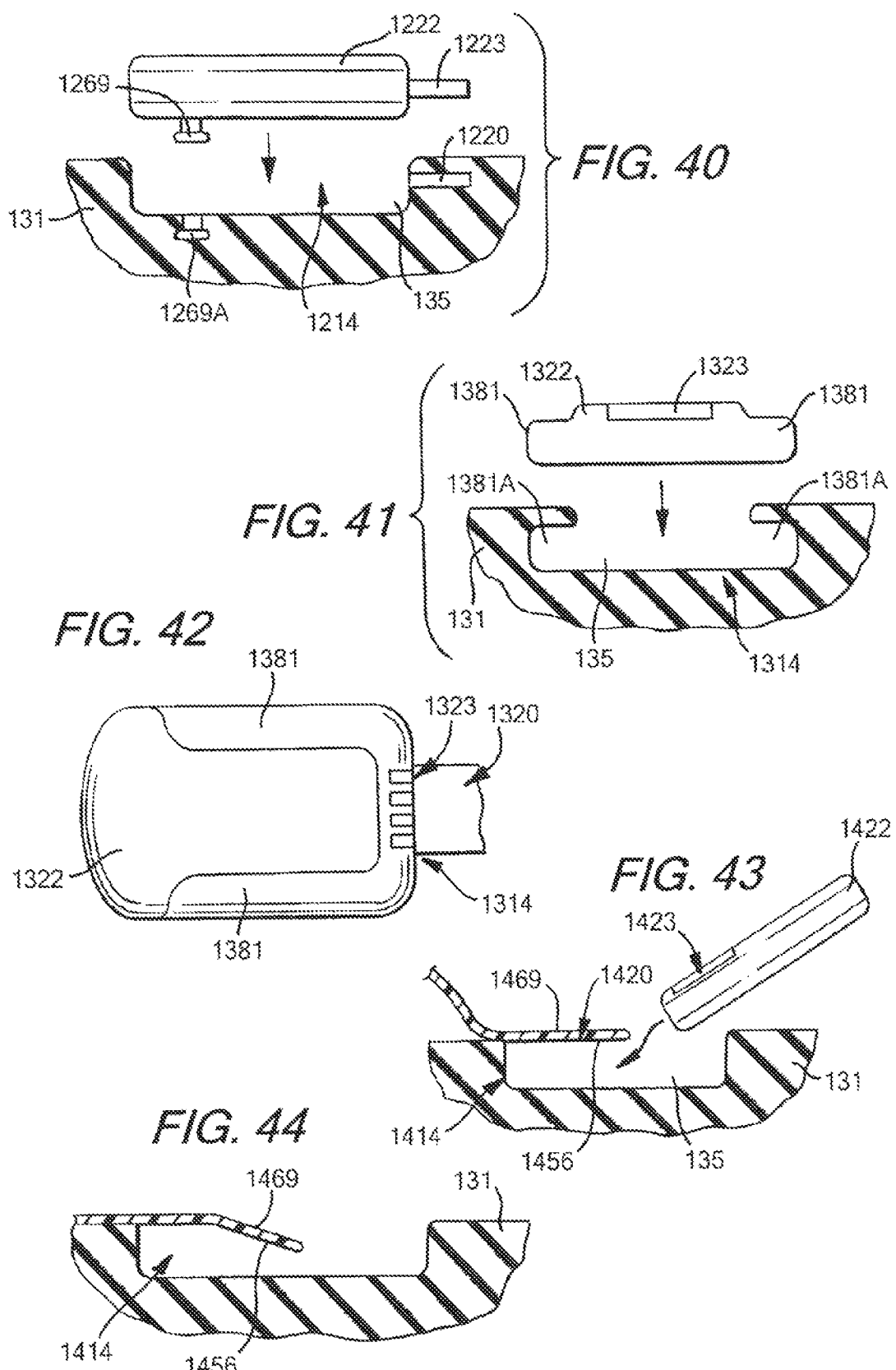

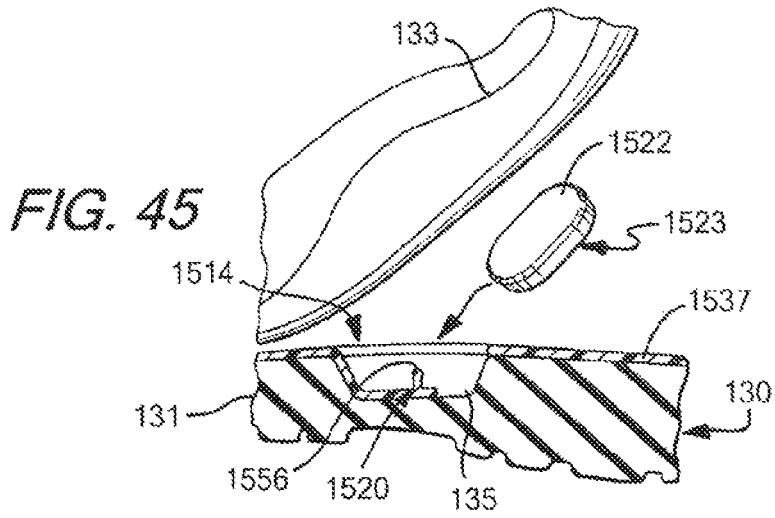
*FIG. 45*
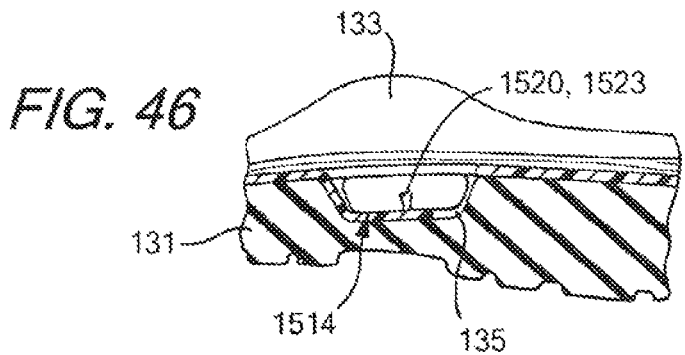
*FIG. 46*
*FIG. 46A*

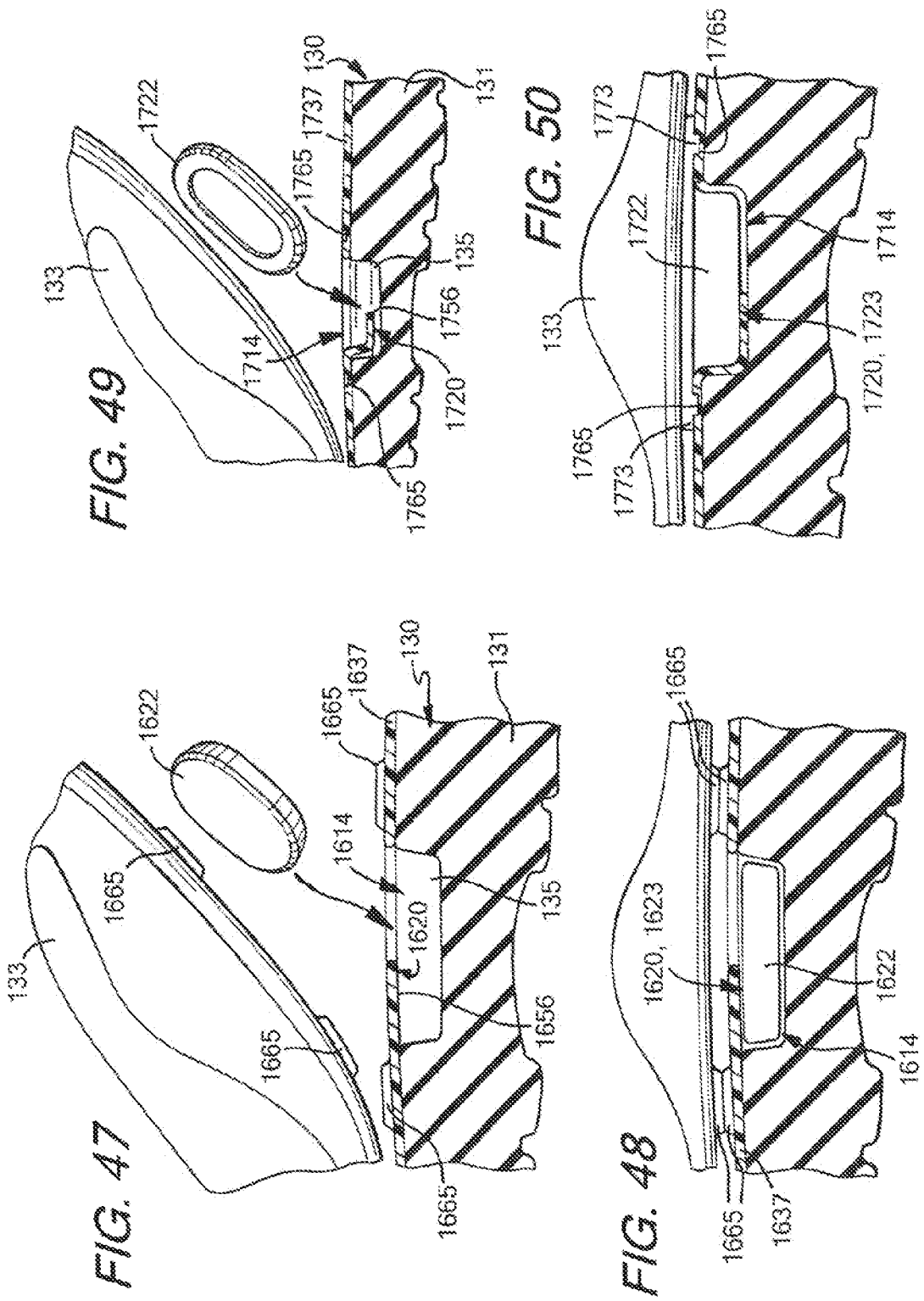

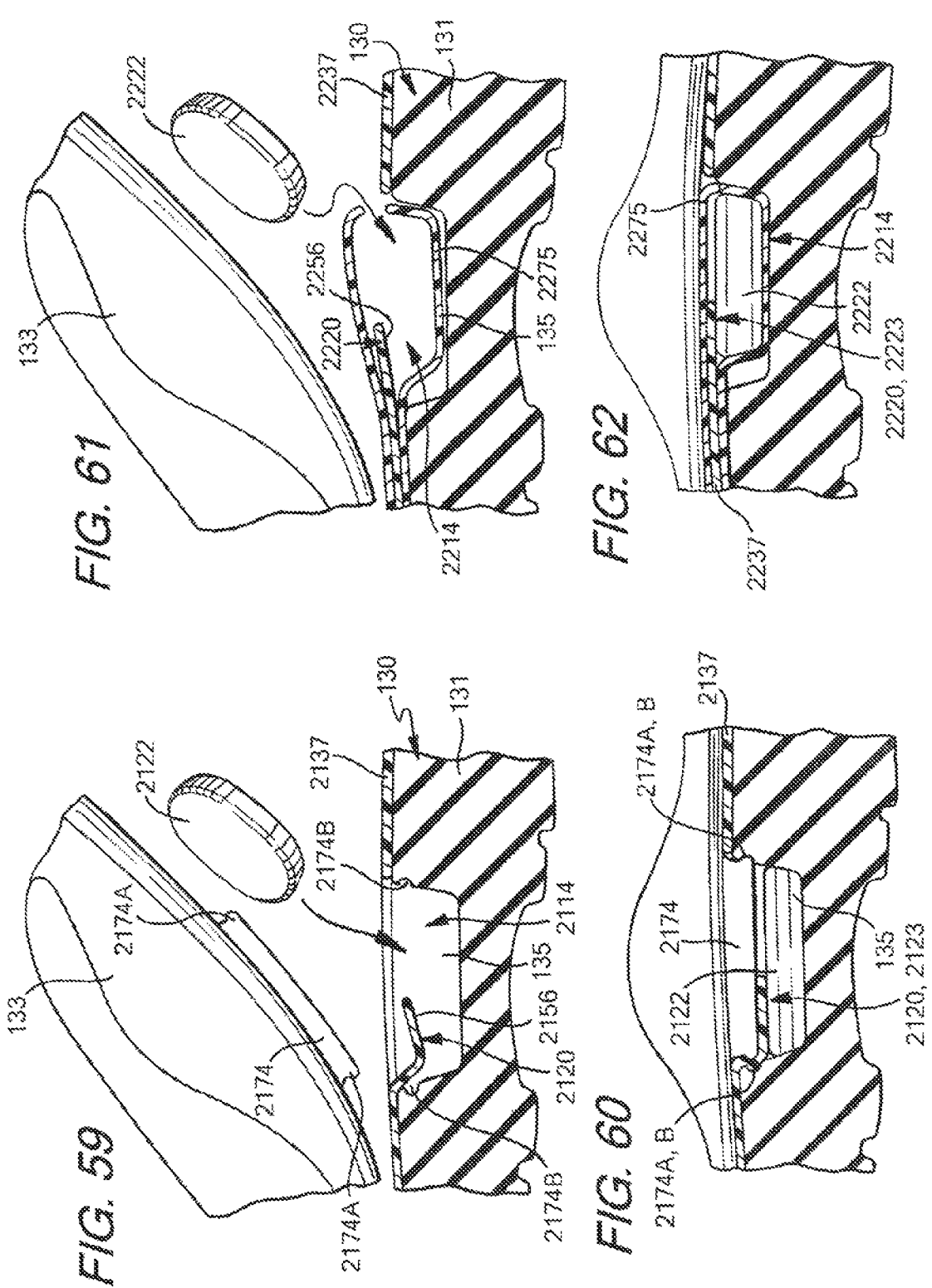

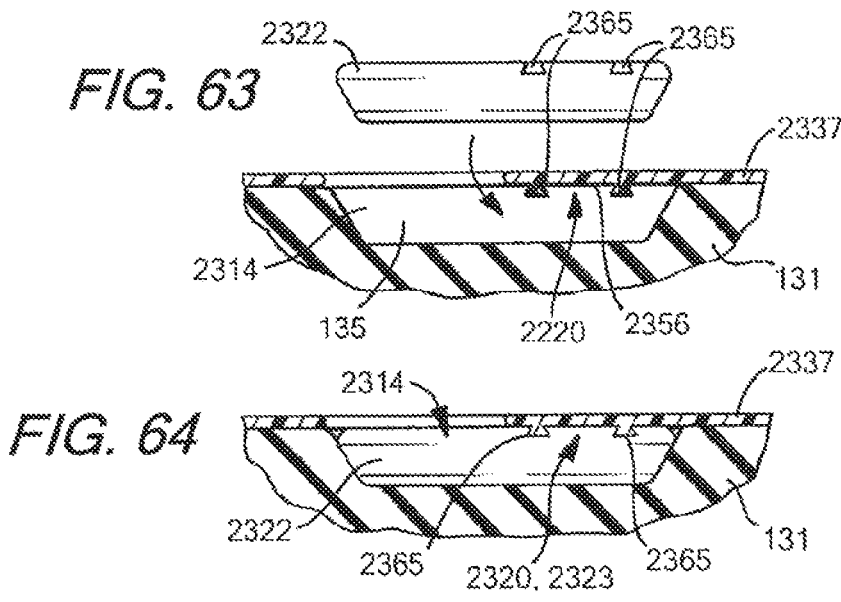
FIG. 63
FIG. 64
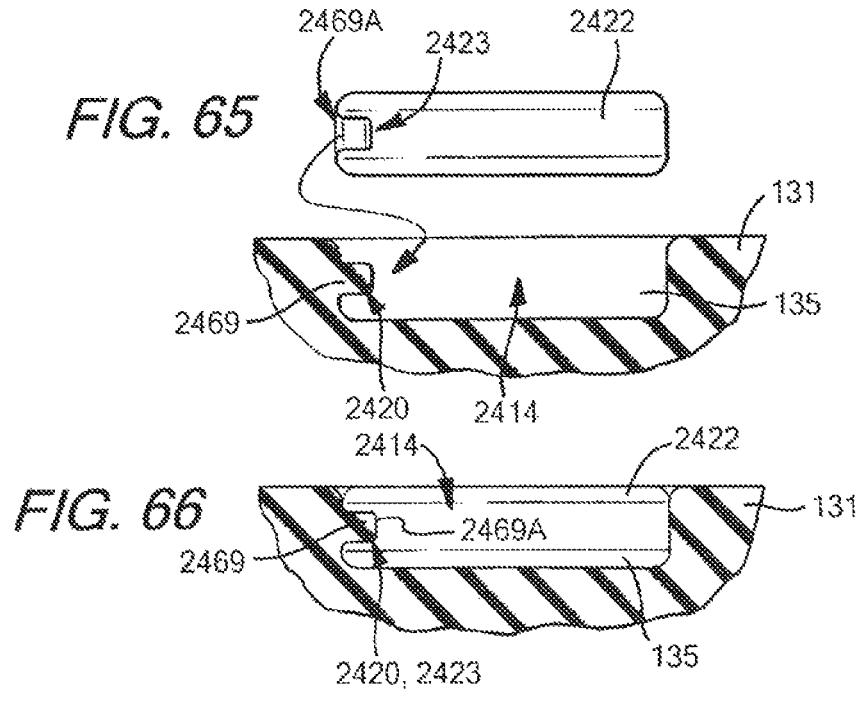
FIG. 65
FIG. 66

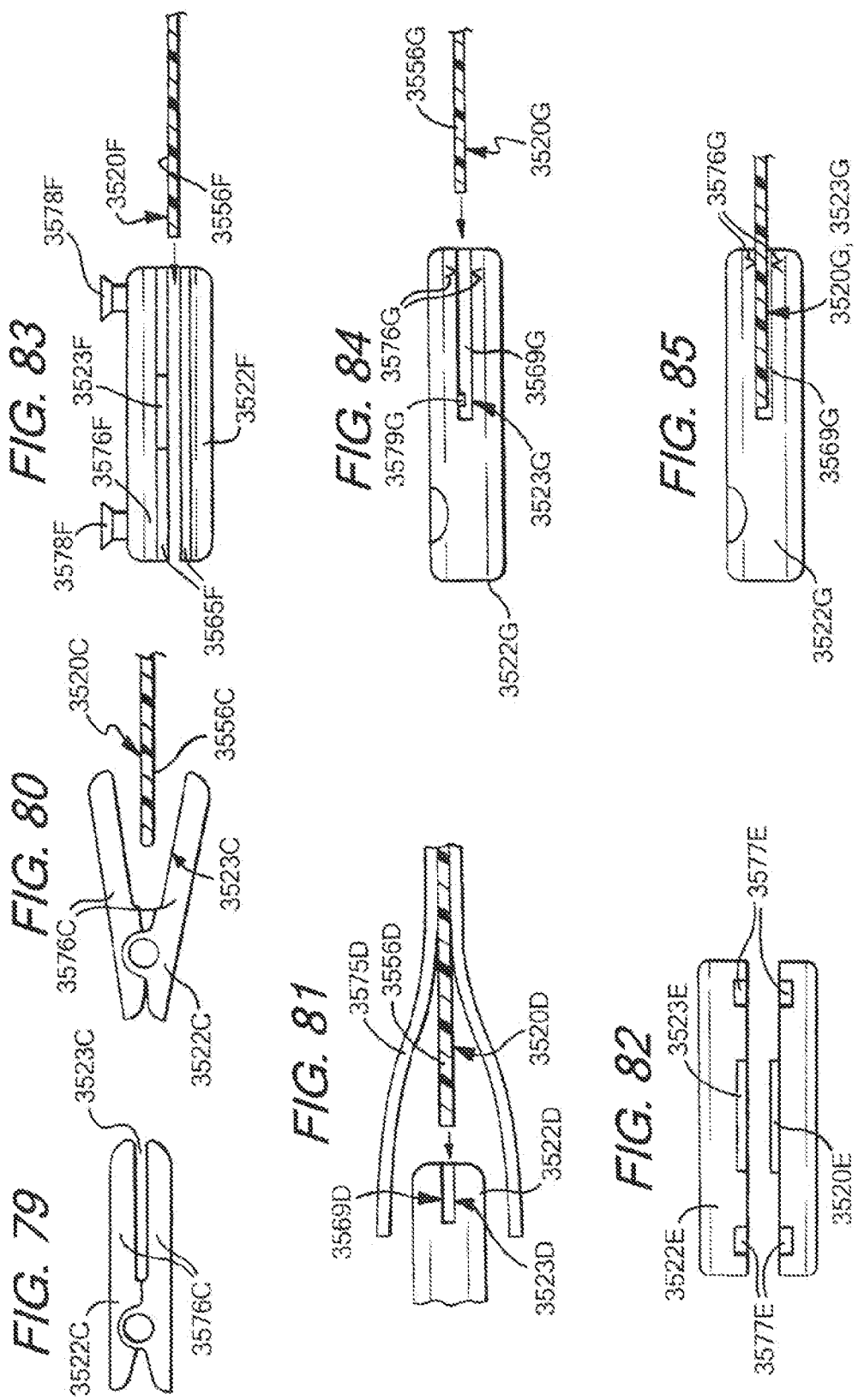

FOOTWEAR HAVING SENSOR SYSTEM

CROSS-REFERENCE TO RELATED APPLICATIONS

The present application is a continuation of and claims priority to U.S. patent application Ser. No. 16/035,099, filed Jul. 13, 2018, which is a continuation of and claims priority to U.S. patent application Ser. No. 13/399,786, filed Feb. 17, 2012, issued as U.S. Pat. No. 10,070,680 on Sep. 11, 2018, which is a continuation-in-part of and claims priority to and the benefit of U.S. patent application Ser. No. 12/483,824, filed Jun. 12, 2009, issued as U.S. Pat. No. 8,676,541 on Mar. 18, 2014, and U.S. patent application Ser. No. 12/483,828, filed Jun. 12, 2009, issued as U.S. Pat. No. 9,462,844 on Oct. 11, 2016, both of which claim priority to and the benefit of U.S. Provisional Patent Application No. 61/061,427, filed on Jun. 13, 2008, and U.S. Provisional Patent Application No. 61/138,048, filed on Dec. 16, 2008; and application Ser. No. 13/399,786 also claims priority to U.S. Provisional Application No. 61/443,800, filed Feb. 17, 2011, and U.S. Provisional Application No. 61/443,911, filed Feb. 17, 2011; and the present application claims priority to all of such prior applications, all of which are incorporated by reference herein in their entireties.

TECHNICAL FIELD

The present invention generally relates to footwear having a sensor system and, more particularly, to a shoe having a force sensor assembly operably connected to a communication port located in the shoe.

BACKGROUND

Shoes having sensor systems incorporated therein are known. Sensor systems collect performance data wherein the data can be accessed for later use such as for analysis purposes. In certain systems, the sensor systems are complex or data can only be accessed or used with certain operating systems. Thus, uses for the collected data can be unnecessarily limited. Accordingly, while certain shoes having sensor systems provide a number of advantageous features, they nevertheless have certain limitations. The present invention seeks to overcome certain of these limitations and other drawbacks of the prior art, and to provide new features not heretofore available.

BRIEF SUMMARY

The present invention relates generally to footwear having a sensor system. Aspects of the invention relate to an article of footwear that includes an upper member and a sole structure, with a sensor system connected to the sole structure. The sensor system includes a plurality of sensors that are configured for detecting forces exerted by a user's foot on the sensor.

According to one aspect, the footwear further contains a communication port operably connected with the sensors. In one embodiment, the communication port is configured for transmitting data regarding forces detected by each sensor in a universally readable format. The port may also be configured for connection to an electronic module to allow communication between the sensors and the module.

Additional aspects of the invention relate to a port for use with an article of footwear may include a housing adapted to be at least partially received within the sole structure of the article of footwear. The housing includes a plurality of side walls defining a chamber adapted to receive an electronic module therein. An interface is engaged with the housing and has at least one electrical contact exposed to the chamber. In this configuration, the interface is adapted to form an electrical connection with the module such that the module engages the at least one electrical contact when the module is received within the chamber.

Further aspects of the invention relate to an article of footwear adapted to receive a foot and including a sole structure, an upper portion, a sensor system, and a port as described above. The sole structure includes an outsole member and a midsole member supported by the outsole member, the midsole member having a well therein. The upper portion is connected to the sole structure. The sensor system includes a force sensor connected to the sole structure and a sensor lead extending away from the force sensor, the force sensor being adapted to sense a force exerted on the sole structure by the foot. The interface of the port includes an electrical contact that is connected to the sensor lead and thereby in electronic communication with the force sensor.

Still further aspects of the invention relate to a system for use with article of footwear adapted to engage a foot. The system includes a sole structure having an outsole member and a midsole member supported by the outsole member, the midsole member having a well therein and an upper portion connected to the sole structure. The system also includes a sensor system having a plurality of force sensors connected to the sole structure and a plurality of sensor leads extending away from the force sensors, the force sensors each being adapted to sense a force exerted on the sole structure by the foot. A port is connected to the sole structure and the sensor system. The port includes a housing at least partially received within the well in the midsole member and an interface engaged with the housing. The housing includes a plurality of side walls defining a chamber and a retaining member connected to at least one of the side walls. The interface has a plurality of electrical contacts exposed to the chamber, such that the electrical contacts are connected to the plurality of sensor leads and are thereby in electronic communication with the force sensors. The system further includes an electronic module received in the chamber of the port, such that the module engages the plurality of electrical contacts of the interface when the module is received within the chamber, forming an electrical connection with the interface. The module is configured to receive signals from the force sensor through the electrical connection with the interface and store data received from the force sensor. Additionally, the retaining member of the housing exerts a force on the module to retain the module within the chamber.

Still other features and advantages of the invention will be apparent from the following specification taken in conjunction with the following drawings.

BRIEF DESCRIPTION OF THE DRAWINGS

FIG. 25 is a perspective view of another embodiment of a sole member of an article of footwear, having a port and an electronic module configured for connection to the port;

FIG. 26 is a partial cross-sectional view of the sole member of FIG. 25, with the module being connected to the port;

FIG. 27 is a perspective view of the sole member of FIG. 25, with the module connected to the port;

FIG. 28 is a perspective view of another embodiment of a sole member of an article of footwear, having a port and an electronic module configured for connection to the port;

FIG. 28A is a bottom view of the module of FIG. 28;

FIG. 29 is a perspective view of the sole member of FIG. 28, with the module connected to the port;

FIG. 30 is a perspective view of another embodiment of a sole member of an article of footwear, having a port and an electronic module configured for connection to the port;

FIG. 30A is a bottom view of the module of FIG. 30;

FIG. 31 is a perspective view of the sole member of FIG. 30, with the module connected to the port;

FIG. 40 is a partial cross-sectional view of a portion of another embodiment of a sole structure for an article of footwear, having a port and an electronic module configured for connection to the port;

FIG. 41 is a partial cross-sectional view of a portion of another embodiment of a sole structure for an article of footwear, having a port and an electronic module configured for connection to the port;

FIG. 42 is a partial cross-sectional view of the module of FIG. 41;

FIG. 43 is a partial cross-sectional view of a portion of another embodiment of a sole structure for an article of footwear, having a port and an electronic module configured for connection to the port;

FIG. 44 is a partial cross-sectional view of the a portion of the port of FIG. 43;

FIG. 45 is a partial cross-sectional view of a portion of another embodiment of an article of footwear, having a port and an electronic module configured for connection to the port;

FIG. 46 is a partial cross-sectional view of the portion of the article of footwear of FIG. 45, with the module connected to the port;

FIG. 46A is a magnified partial cross-sectional view of the port and the module of FIG. 45;

FIG. 47 is a partial cross-sectional view of a portion of another embodiment of an article of footwear, having a port and an electronic module configured for connection to the port;

FIG. 48 is a partial cross-sectional view of the portion of the article of footwear of FIG. 47, with the module connected to the port;

FIG. 49 is a partial cross-sectional view of a portion of another embodiment of an article of footwear, having a port and an electronic module configured for connection to the port;

FIG. 50 is a partial cross-sectional view of the portion of the article of footwear of FIG. 49, with the module connected to the port;

FIG. 59 is a partial cross-sectional view of a portion of another embodiment of an article of footwear, having a port and an electronic module configured for connection to the port;

FIG. 60 is a partial cross-sectional view of the portion of the article of footwear of FIG. 59, with the module connected to the port;

FIG. 61 is a partial cross-sectional view of a portion of another embodiment of an article of footwear, having a port and an electronic module configured for connection to the port;

FIG. 62 is a partial cross-sectional view of the portion of the article of footwear of FIG. 61, with the module connected to the port;

FIG. 63 is a partial cross-sectional view of a portion of another embodiment of a sole structure for an article of footwear, having a port and an electronic module configured for connection to the port;

FIG. 64 is a partial cross-sectional view of the portion of the sole structure of FIG. 63, with the module connected to the port;

FIG. 65 is a partial cross-sectional view of a portion of another embodiment of a sole structure for an article of footwear, having a port and an electronic module configured for connection to the port;

FIG. 66 is a partial cross-sectional view of the portion of the sole structure of FIG. 65, with the module connected to the port;

FIG. 79 is a partial cross-sectional view of a portion of another embodiment of a sole structure for an article of footwear, having a port and an electronic module configured for connection to the port;

FIG. 80 is a partial cross-sectional view of the portion of the sole structure of FIG. 79, with the module connected to the port;

FIG. 81 is a partial cross-sectional view of a portion of another embodiment of a sole structure for an article of footwear, having a port and an electronic module configured for connection to the port;

FIG. 82 is a partial cross-sectional view of the portion of the sole structure of FIG. 81, with the module connected to the port;

FIG. 83 is a partial cross-sectional view of a portion of another embodiment of a sole structure for an article of footwear, having a port and an electronic module configured for connection to the port;

FIG. 84 is a partial cross-sectional view of a portion of another embodiment of a sole structure for an article of footwear, having a port and an electronic module configured for connection to the port;

FIG. 85 is a partial cross-sectional view of the portion of the sole structure of FIG. 101, with the module connected to the port;

DETAILED DESCRIPTION

Figure 1:
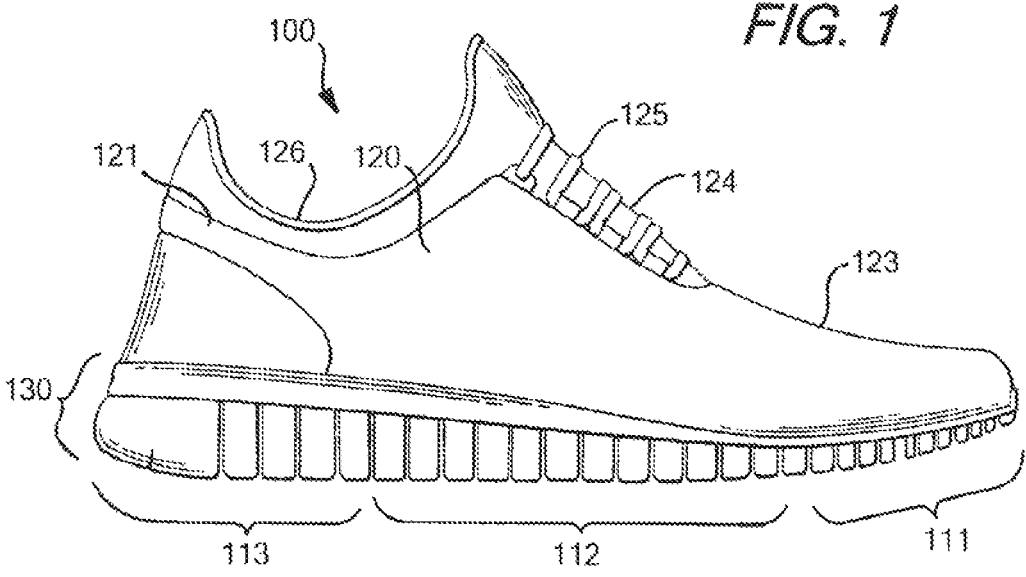
FIG. 1 is a side view of a shoe.

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

Figure 2:
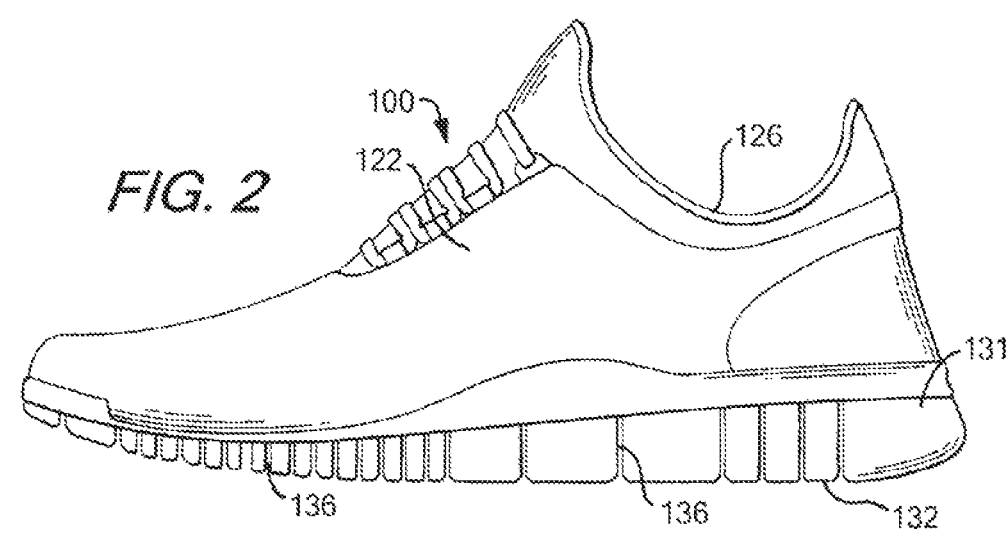
FIG. 2 is an opposed side view of the shoe of FIG. 1.

Footwear, such as a shoe, is shown as an example in FIGS. 1-2 and generally designated with the reference numeral 100. The footwear 100 can take many different forms, including, for example, various types of athletic footwear. In one exemplary embodiment, the shoe 100 generally includes a force sensor system 12 operably connected to a universal communication port 14. As described in greater detail below, the sensor system 12 collects performance data relating to a wearer of the shoe 100. Through connection to the universal communication port 14, multiple different users can access the performance data for a variety of different uses as described in greater detail below.

An article of footwear 100 is depicted in FIGS. 1-2 as including an upper 120 and a sole structure 130. For purposes of reference in the following description, footwear 100 may be divided into three general regions: a forefoot region 111, a midfoot region 112, and a heel region 113, as illustrated in FIG. 1. Regions 111-113 are not intended to demarcate precise areas of footwear 100. Rather, regions 111-113 are intended to represent general areas of footwear 100 that provide a frame of reference during the following discussion. Although regions 111-113 apply generally to footwear 100, references to regions 111-113 also may apply specifically to upper 120, sole structure 130, or individual components included within and/or formed as part of either upper 120 or sole structure 130.

As further shown in FIGS. 1 and 2, the upper 120 is secured to sole structure 130 and defines a void or chamber for receiving a foot. For purposes of reference, upper 120 includes a lateral side 121, an opposite medial side 122, and a vamp or instep area 123. Lateral side 121 is positioned to extend along a lateral side of the foot (i.e., the outside) and generally passes through each of regions 111-113. Similarly, medial side 122 is positioned to extend along an opposite medial side of the foot (i.e., the inside) and generally passes through each of regions 111-113. Vamp area 123 is positioned between lateral side 121 and medial side 122 to correspond with an upper surface or instep area of the foot. Vamp area 123, in this illustrated example, includes a throat 124 having a lace 125 or other desired closure mechanism that is utilized in a conventional manner to modify the dimensions of upper 120 relative the foot, thereby adjusting the fit of footwear 100. Upper 120 also includes an ankle opening 126 that provides the foot with access to the void within upper 120. A variety of materials may be used for constructing upper 120, including materials that are conventionally utilized in footwear uppers. Accordingly, upper 120 may be formed from one or more portions of leather, synthetic leather, natural or synthetic textiles, polymer sheets, polymer foams, mesh textiles, felts, non-woven polymers, or rubber materials, for example. The upper 120 may be formed from one or more of these materials wherein the materials or portions thereof are stitched or adhesively bonded together, e.g., in manners that are conventionally known and used in the art.

Upper 120 may also include a heel element (not shown) and a toe element (not shown). The heel element, when present, may extend upward and along the interior surface of upper 120 in the heel region 113 to enhance the comfort of footwear 100. The toe element, when present, may be located in forefoot region 111 and on an exterior surface of upper 120 to provide wear-resistance, protect the wearer's toes, and assist with positioning of the foot. In some embodiments, one or both of the heel element and the toe element may be absent, or the heel element may be positioned on an exterior surface of the upper 120, for example. Although the configuration of upper 120 discussed above is suitable for footwear 100, upper 120 may exhibit the configuration of any desired conventional or non-conventional upper structure without departing from this invention.

Sole structure 130 is secured to a lower surface of upper 120 and may have a generally conventional shape. The sole structure 130 may have a multipiece structure, e.g., one that includes a midsole 131, an outsole 132, and a foot contacting member 133, which may be a sockliner, a strobel, an insole member, a bootie element, a sock, etc. (See FIGS. 4-5). In the embodiment shown in FIGS. 4-5, the foot contacting member 133 is an insole member or sockliner. The term "foot contacting member," as used herein does not necessarily imply direct contact with the user's foot, as another element may interfere with direct contact. Rather, the foot contacting member forms a portion of the inner surface of the foot-receiving chamber of an article of footwear. For example, the user may be wearing a sock that interferes with direct contact. As another example, the sensor system 12 may be incorporated into an article of footwear that is designed to slip over a shoe or other article of footwear, such as an external bootie element or shoe cover. In such an article, the upper portion of the sole structure may be considered a foot contacting member, even though it does not directly contact the foot of the user.

Midsole member 131 may be an impact attenuating member. For example, the midsole member 131 may be formed of polymer foam material, such as polyurethane, ethylvinylacetate, or other materials (such as phylon, phylite, etc.) that compress to attenuate ground or other contact surface reaction forces during walking, running, jumping, or other activities. In some example structures according to this invention, the polymer foam material may encapsulate or include various elements, such as a fluid-filled bladder or moderator, that enhance the comfort, motion-control, stability, and/or ground or other contact surface reaction force attenuation properties of footwear 100. In still other example structures, the midsole 131 may include additional elements that compress to attenuate ground or other contact surface reaction forces. For instance, the midsole may include column type elements to aid in cushioning and absorption of forces.

Outsole 132 is secured to a lower surface of midsole 131 in this illustrated example footwear structure 100 and is formed of a wear-resistant material, such as rubber or a flexible synthetic material, such as polyurethane, that contacts the ground or other surface during ambulatory or other activities. The material forming outsole 132 may be manufactured of suitable materials and/or textured to impart enhanced traction and slip resistance. The structure and methods of manufacturing the outsole 132 will be discussed further below. A foot contacting member 133 (which may be an insole member, a sockliner, a bootie member, a strobel, a sock, etc.) is typically a thin, compressible member that may be located within the void in upper 120 and adjacent to a lower surface of the foot (or between the upper 120 and midsole 131) to enhance the comfort of footwear 100. In some arrangements, an insole or sockliner may be absent, and in other embodiments, the footwear 100 may have a foot contacting member positioned on top of an insole or sockliner.

The outsole 132 shown in FIGS. 1 and 2 includes a plurality of incisions or sipes 136 in either or both sides of the outsole 132. These sipes 136 may extend from the bottom of the outsole 132 to an upper portion thereof or to the midsole 131. In one arrangement, the sipes 136 may extend from a bottom surface of the outsole 132 to a point halfway between the bottom of the outsole 132 and the top of the outsole 132. In another arrangement, the sipes 136 may extend from the bottom of the outsole 132 to a point greater than halfway to the top of the outsole 132. In yet another arrangement, the sipes 136 may extend from the bottom of the outsole 132 to a point where the outsole 132 meets the midsole 131. The sipes 136 may provide additional flexibility to the outsole 132, and thereby allow the outsole to more freely flex in the natural directions in which the wearer's foot flexes. In addition, the sipes 136 may aid in providing traction for the wearer. It is understood that embodiments of the present invention may be used in connection with other types and configurations of shoes, as well as other types of footwear and sole structures.

Figures 3, 4, 5:
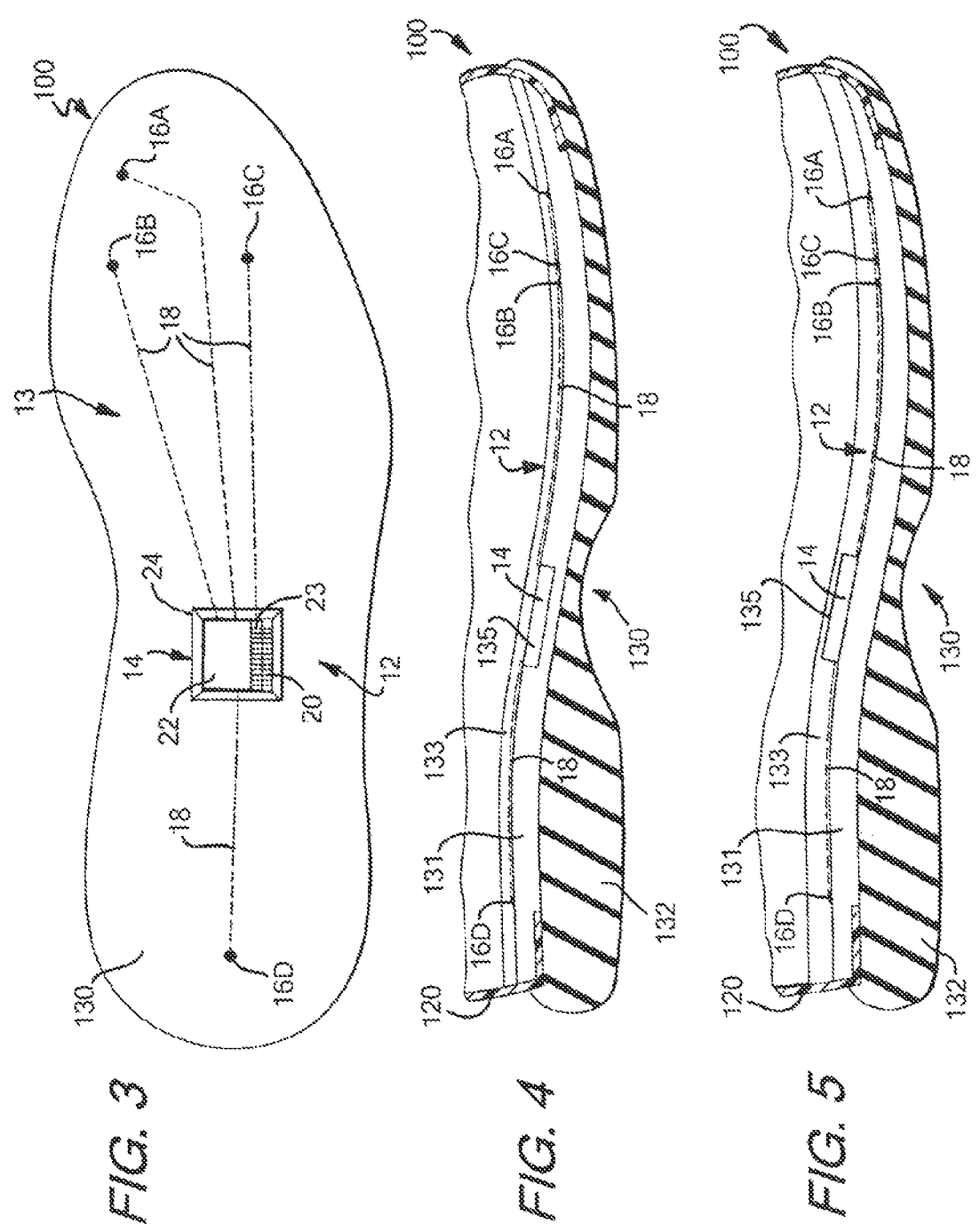
FIG. 3 is a top view of a sole of a shoe incorporating one embodiment of a sensor system.
FIG. 4 is a side cross-sectional view of one embodiment of a shoe incorporating the sensor system of FIG. 3.
FIG. 5 is a side cross-sectional view of another embodiment of a shoe incorporating the sensor system of FIG. 3.

FIGS. 3-5 illustrate exemplary embodiments of the footwear 100 incorporating a sensor system 12 in accordance with the present invention. The sensor system 12 includes a force sensor assembly 13, having a plurality of sensors 16, and a communication or output port 14 in communication with the sensor assembly 13 (e.g., electrically connected via conductors). In the embodiment illustrated in FIG. 3, the system 12 has four sensors 16: a first sensor 16A at the big toe (first phalange) area of the shoe, two sensors 16B-C at the forefoot area of the shoe, including a second sensor 16B at the first metatarsal head region and a third sensor 16C at the fifth metatarsal head region, and a fourth sensor 16D at the heel. These areas of the foot typically experience the greatest degree of pressure during movement. The embodiment described below and shown in FIGS. 7-9 utilizes a similar configuration of sensors 16. Each sensor 16 is configured for detecting a force exerted by a user's foot on the sensor 16. The sensors communicate with the port 14 through sensor leads 18, which may be wire leads and/or another electrical conductor or suitable communication medium. For example, in one embodiment, the sensor leads 18 may be an electrically conductive medium printed on the foot contacting member 133, the midsole member 131, or another member of the sole structure 130, such as a layer between the foot contacting member 133 and the midsole member 131.

Other embodiments of the sensor system 12 may contain a different number or configuration of sensors 16, such as the embodiments described below and shown in FIGS. 7-9 and generally include at least one sensor 16. For example, in one embodiment, the system 12 includes a much larger number of sensors, and in another embodiment, the system 12 includes two sensors, one in the heel and one in the forefoot of the shoe 100. In addition, the sensors 16 may communicate with the port 14 in a different manner, including any known type of wired or wireless communication, including Bluetooth and near-field communication. A pair of shoes may be provided with sensor systems 12 in each shoe of the pair, and it is understood that the paired sensor systems may operate synergistically or may operate independently of each other, and that the sensor systems in each shoe may or may not communicate with each other. The communication of the sensor systems 12 is described in greater detail below. It is understood that the sensor system 12 may be provided with computer programs/algorithms to control collection and storage of data (e.g., pressure data from interaction of a user's foot with the ground or other contact surface), and that these programs/algorithms may be stored in and/or executed by the sensors 16, the port 14, the module 22, and/or the external device 110. The sensors 16 may include necessary components (e.g. a processor, memory, software, TX/RX, etc.) in order to accomplish storage and/or execution of such computer programs/algorithms and/or direct (wired or wireless) transmission of data and/or other information to the port 14 and/or the external device 110.

The sensor system 12 can be positioned in several configurations in the sole 130 of the shoe 100. In the examples shown in FIGS. 4-5, the port 14, the sensors 16, and the leads 18 can be positioned between the midsole 131 and the foot contacting member 133, such as by connecting the port 14, the sensors 16, and/or the leads 18 to the top surface of the midsole 131 or the bottom surface of the foot contacting member 133. A cavity or well 135 can be located in the midsole 131 (FIG. 4) or in the foot contacting member 133 (FIG. 5) for receiving an electronic module, as described below, and the port 14 may be accessible from within the well 135. In the embodiment shown in FIG. 4, the well 135 is formed by an opening in the upper major surface of the midsole 131, and in the embodiment shown in FIG. 5, the well 135 is formed by an opening in the lower major surface of the foot contacting member 133 foot contacting member 133. The well 135 may be located elsewhere in the sole structure 130 in other embodiments. For example, the well 135 may be located partially within both the foot contacting member 133 and the midsole member 131 in one embodiment, or the well 135 may be located in the lower major surface of the midsole 131 or the upper major surface of the foot contacting member 133. In a further embodiment, the well 135 may be located in the outsole 132 and may be accessible from outside the shoe 100, such as through an opening in the side, bottom, or heel of the sole 130. In the configurations illustrated in FIGS. 4-5, the port 14 is easily accessible for connection or disconnection of an electronic module, as described below. In other embodiments, the sensor system 12 can be positioned differently. For example, in one embodiment, the port 14, the sensors 16, and/or the leads 18 can be positioned within the outsole 132, midsole 131, or foot contacting member 133. In one exemplary embodiment, the port 14, the sensors 16, and/or the leads 18 may be positioned within a foot contacting member 133 positioned above the foot contacting member 133, such as a sock, sockliner, interior footwear bootie, or other similar article. In a further embodiment, the port 14, the sensors 16, and/or the leads 18 can be formed into an insert or a liner, designed to be quickly and easily engaged with the sole structure 130, such as by inserting the insert between the foot contacting member 133 and the midsole 131, such as shown in FIGS. 4-5 and 7-10. Still other configurations are possible, and some examples of other configurations are described below. As discussed, it is understood that the sensor system 12 may be included in each shoe in a pair.

Figure 7:
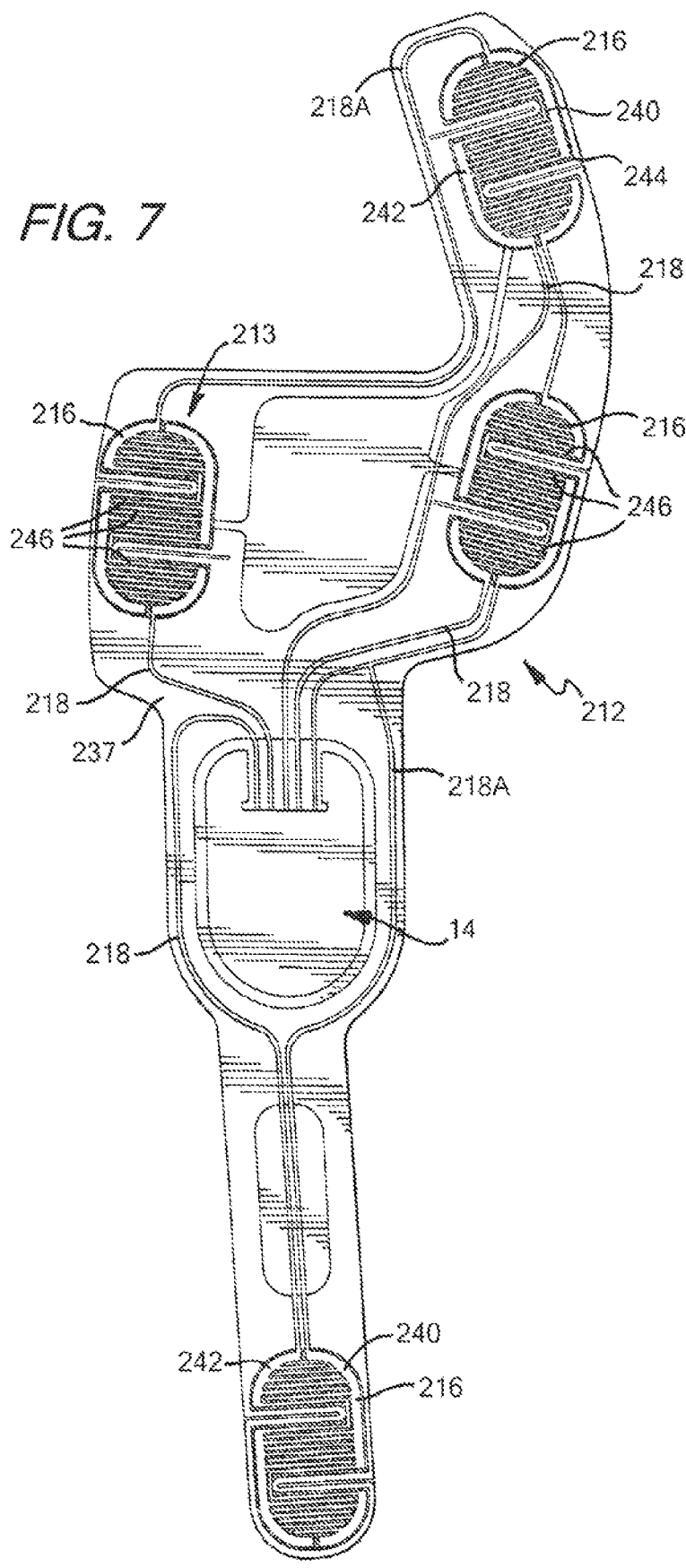
FIG. 7 is a top view of another embodiment of an insert member containing a sensor system according to aspects of the invention.
Figure 8:
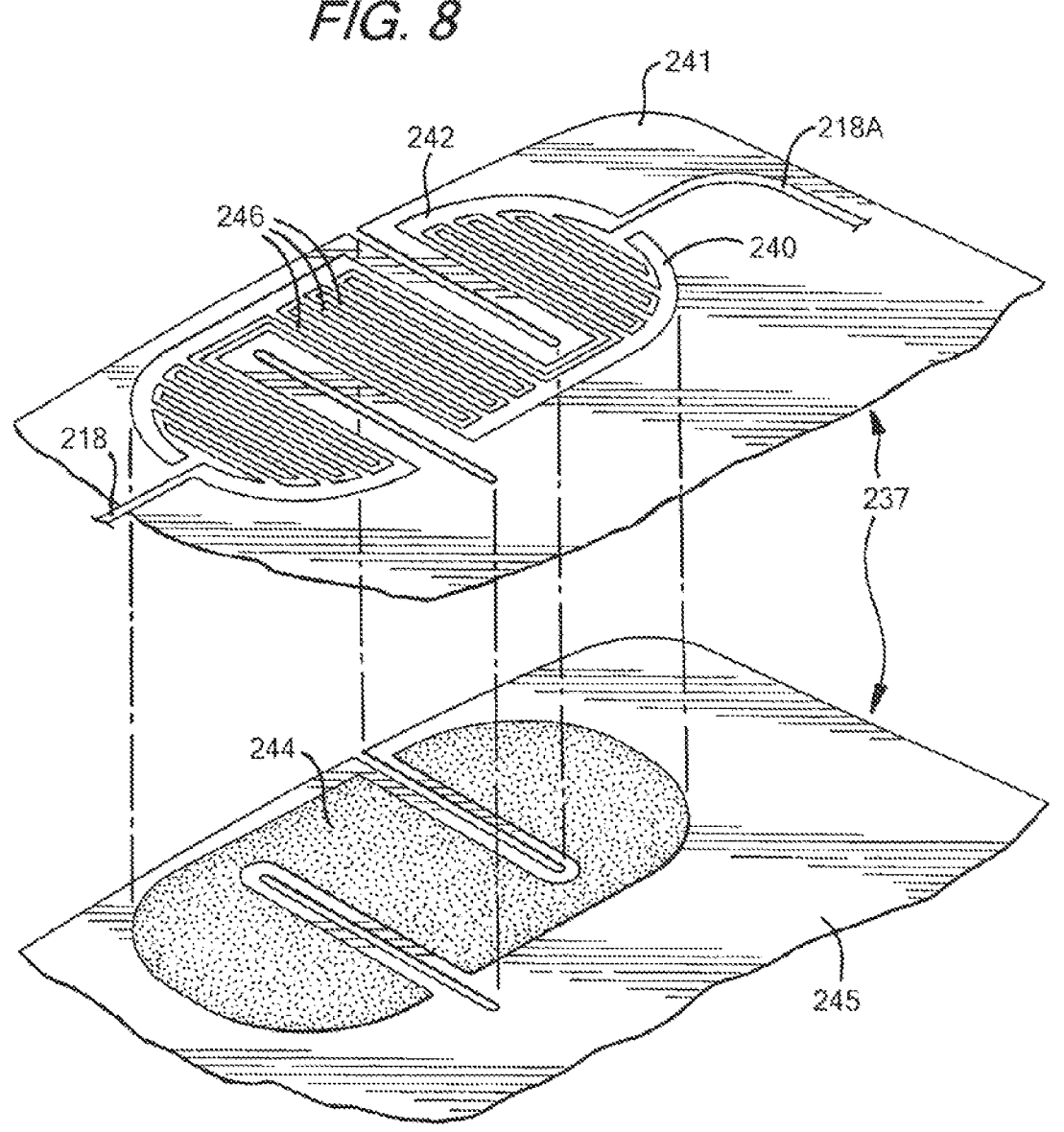
FIG. 8 is a top view of a left and right pair of insert members as shown in FIG. 7.
Figure 9:
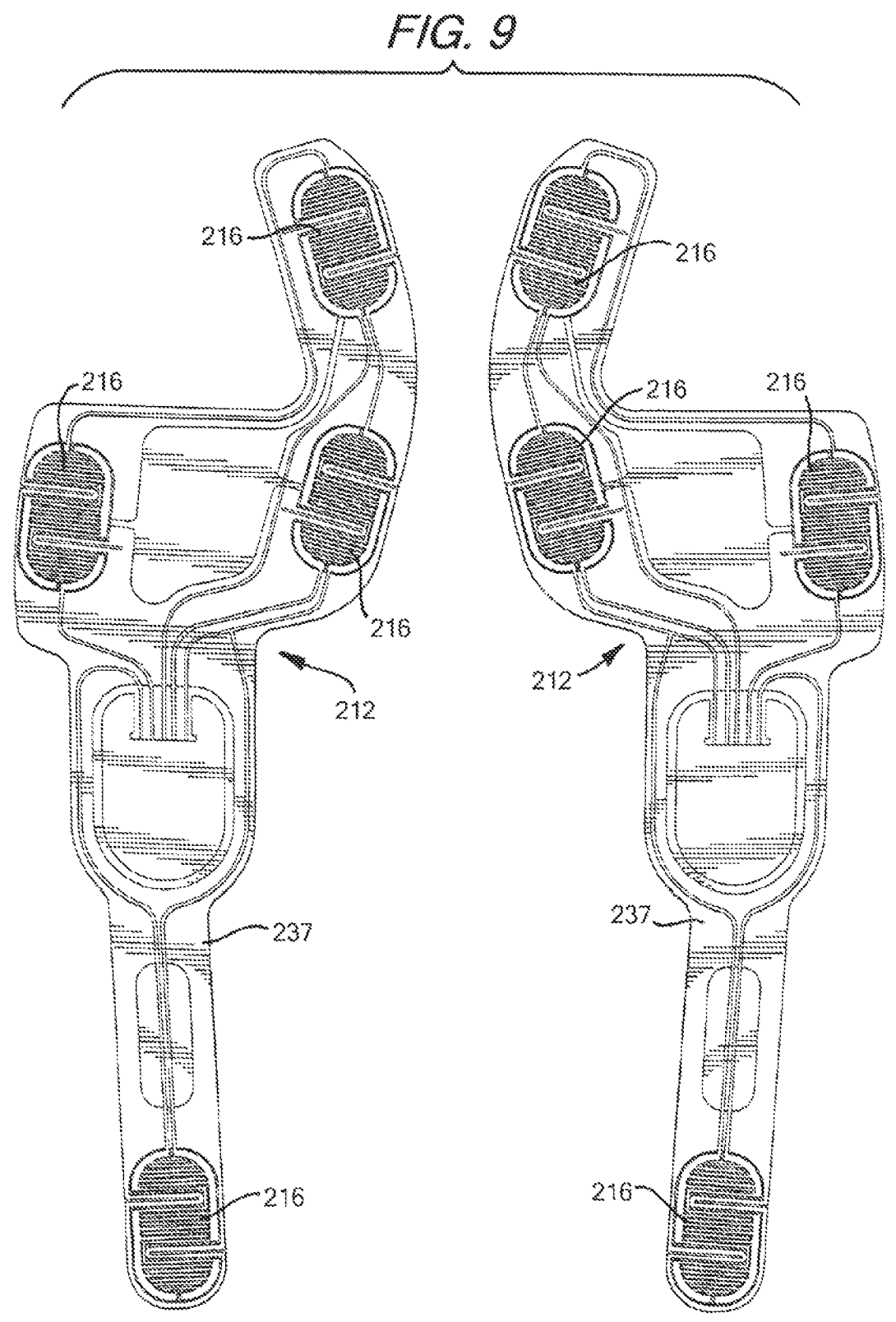
FIG. 9 is a magnified exploded view of a portion of the insert member and sensor system of FIG. 7.
Figure 10:
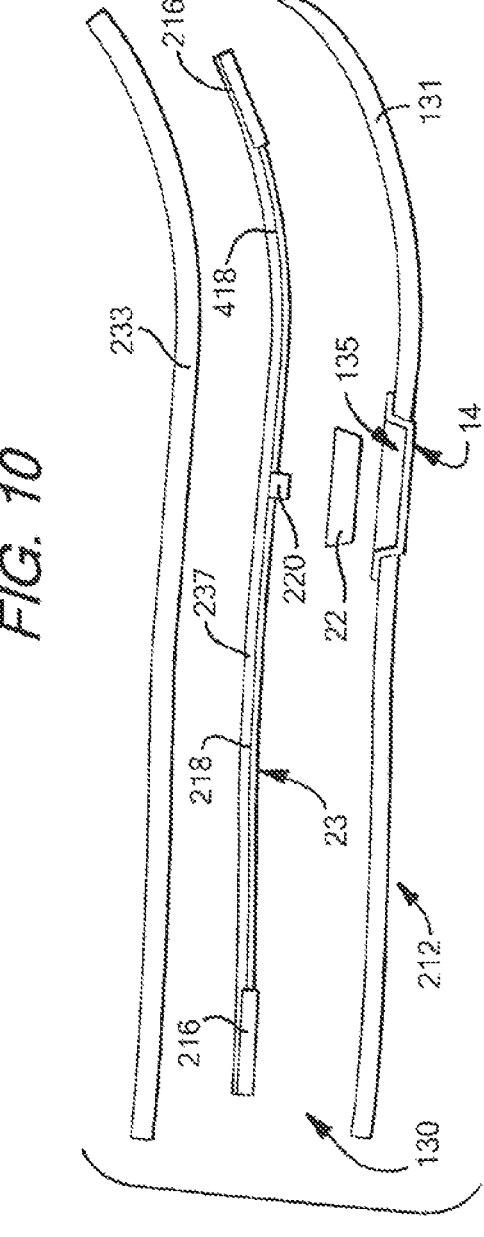
FIG. 10 is a side cross-sectional view of one embodiment of a shoe incorporating the insert member of FIG. 7.

In one embodiment, as shown in FIGS. 7-9, the sensors 16 are force sensors for measuring stress, compression, or other force and/or energy exerted on or otherwise associated with the sole 130. For example, the sensors 16 may be or comprise force-sensitive resistor (FSR) sensors or other sensors utilizing a force-sensitive resistive material (such as a quantum tunneling composite, a custom conductive foam, or a force-transducing rubber, described in more detail below), magnetic resistance sensors, piezoelectric or piezoresistive sensors, strain gauges, spring based sensors, fiber optic based sensors, polarized light sensors, mechanical actuator based sensors, displacement based sensors, and/or any other types of known sensors or switches capable of measuring force and/or compression of the foot contacting member 133, midsole 131, outsole 132, etc. A sensor may be or comprise an analog device or other device that is capable of detecting or measuring force quantitatively, or it may simply be a binary-type ON/OFF switch (e.g., a silicone membrane type switch). It is understood that quantitative measurements of force by the sensors may include gathering and transmitting or otherwise making available data that can be converted into quantitative force measurements by an electronic device, such as the module 22 or the external device 110. Some sensors as described herein, such as piezo sensors, force-sensitive resistor sensors, quantum tunneling composite sensors, custom conductive foam sensors, etc., can detect or measure differences or changes in resistance, capacitance, or electric potential, such that the measured differential can be translated to a force component. A spring-based sensor, as mentioned above, can be configured to measure deformation or change of resistance caused by pressure and/or deformation. A fiber optic based sensor, as described above, contains compressible tubes with a light source and a light measurement device connected thereto. In such a sensor, when the tubes are compressed, the wavelength or other property of light within the tubes changes, and the measurement device can detect such changes and translate the changes into a force measurement. Nanocoatings could also be used, such as a midsole dipped into conductive material. Polarized light sensors could be used, wherein changes in light transmission properties are measured and correlated to the pressure or force exerted on the sole. One embodiment utilizes a multiple array (e.g. 100) of binary on/off sensors, and force components can be detected by "puddling" of sensor signals in specific areas. Still other types of sensors not mentioned herein may be used. It is understood that the sensors can be relatively inexpensive and capable of being placed in shoes in a mass-production process. More complex sensor systems that may be more expensive could be incorporated in a training type shoe. It is understood that a combination of different types of sensors may be used in one embodiment.

Additionally, the sensors 16 may be placed or positioned in engagement with the shoe structure in many different manners. In one example, the sensors 16 may be printed conductive ink sensors, electrodes, and/or leads deposited on a sole member, such as an airbag or other fluid-filled chamber, a foam material, or another material for use in the shoe 100, or a sock, bootie, insert, liner, insole, midsole, etc. The sensors 16 and/or leads 18 may be woven into garment or fabric structures (such as sockliners, booties, uppers, inserts, etc.), e.g., using conductive fabric or yarns when weaving or knitting the garment or fabric structures. Many embodiments of the sensor system 12 can be made inexpensively, for example, by using a force-sensitive resistor sensor or a force-sensitive resistive material, as described below and shown in FIG. 9. It is understood that the sensors 16 and/or leads 18 also may be deposited on or engaged with a portion of the shoe structure in any desired manner, such as by conventional deposition techniques, by conductive nano-coating, by conventional mechanical connectors, and any other applicable known method. The sensor system can also be configured to provide mechanical feedback to the wearer. Additionally, the sensor system 12 may include a separate power lead to supply power or act as a ground to the sensors 16. In the embodiments described below and shown in FIGS. 7-9, the sensor system 12 includes a separate power lead 18A that is used to connect the sensors 16, to the port 14A-E to supply power from the module 22 to the sensors 16. As a further example, the sensor system 12 can be made by incorporating printed conductive ink sensors 16 or electrodes and conductive fabric or yarn leads 18, or forming such sensors on the foam or airbag of a shoe. Sensors 16 could be incorporated onto or into an airbag in a variety of manners. In one embodiment, the sensors 16 could be made by printing a conductive, force-sensitive material on the airbag on one or more surfaces of the airbag to achieve a strain gauge-like effect. When the bag surfaces expand and/or contract during activity, the sensors can detect such changes through changes in resistance of the force-sensitive material to detect the forces on the airbag. In a bag having internal fabrics to maintain a consistent shape, conductive materials can be located on the top and bottom of the airbag, and changes in the capacitance between the conductive materials as the bag expands and compresses can be used to determine force. Further, devices that can convert changes in air pressure into an electrical signal can be used to determine force as the airbag is compressed.

Figure 6:
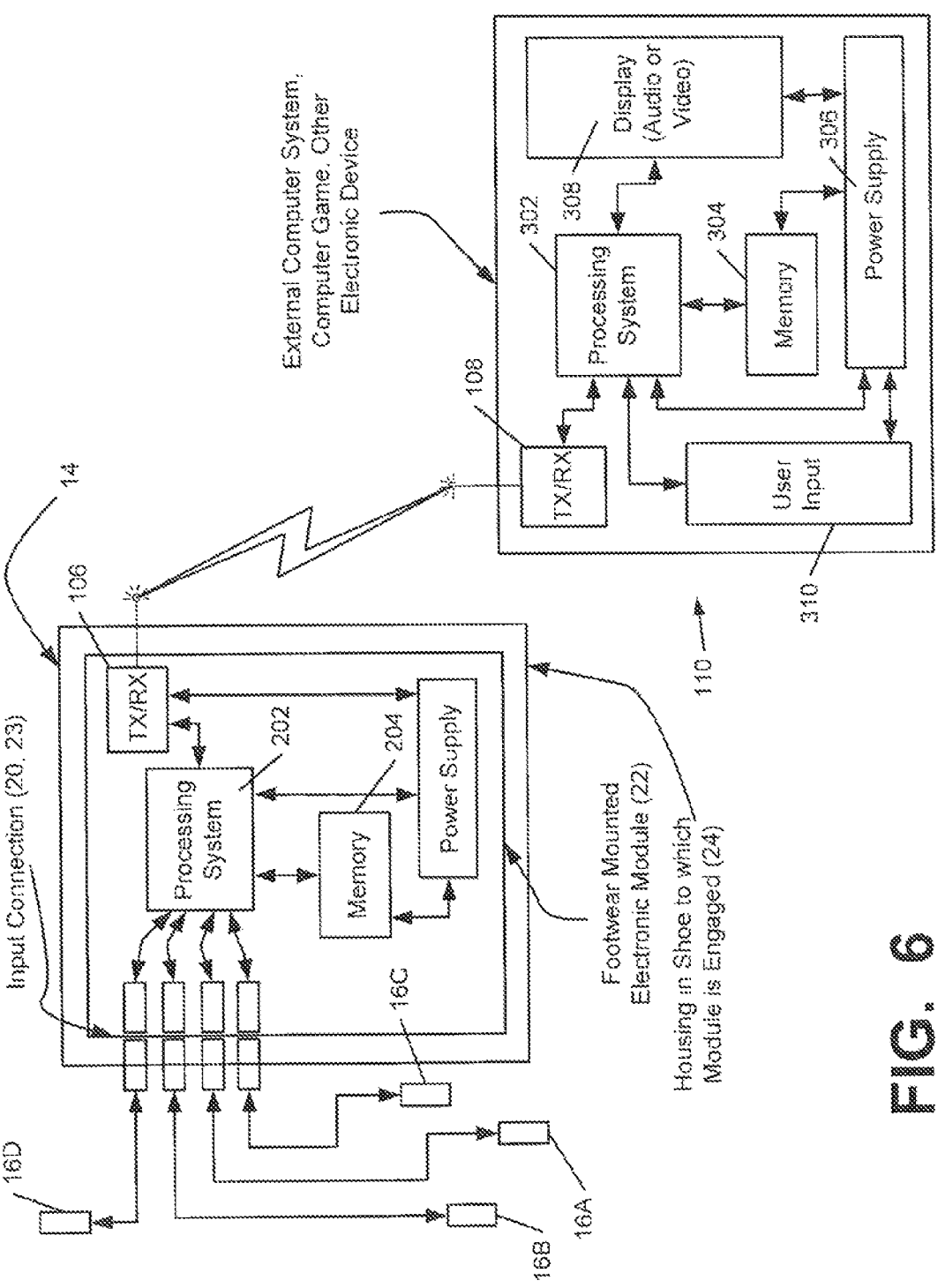
FIG. 6 is a schematic diagram of one embodiment of an electronic module capable of use with a sensor system, in communication with an external electronic device.

The port 14 is configured for communication of data collected by the sensors 16 to an outside source, in one or more known manners. In one embodiment, the port 14 is a universal communication port, configured for communication of data in a universally readable format. In the embodiments shown in FIGS. 3-5, the port 14 includes an interface 20 for connection to an electronic module 22, shown in connection with the port 14 in FIG. 3. In the embodiment shown in FIGS. 3-5, the interface 20 includes a plurality of electrical contacts, similarly to the interfaces 320, et seq. described below. Additionally, in this embodiment, the port 14 is associated with a housing 24 for insertion of the electronic module 22, located in the well 135 in the middle arch or midfoot region of the article of footwear 100. The positioning of the port 14 in FIGS. 3-5 not only presents minimal contact, irritation, or other interference with the user's foot, but also provides easy accessibility by simply lifting the foot contacting member 133. Additionally, as illustrated in FIG. 6, the sensor leads 18 also form a consolidated interface or connection 19 at their terminal ends, in order to connect to the port 14 and the port interface 14. In one embodiment, the consolidated interface 19 may include individual connection of the sensor leads 18 to the port interface 20, such as through a plurality of electrical contacts. In another embodiment, the sensor leads 18 could be consolidated to form an external interface, such as a plug-type interface, or in another manner, and in a further embodiment, the sensor leads 18 may form a non-consolidated interface, with each lead 18 having its own sub-interface. As illustrated in FIG. 6, the sensor leads 18 can converge to a single location to form the consolidated interface. As also described below, the module 22 may have an interface 23 for connection to the port interface 20 and/or the sensor leads 18.

The port 14 is adapted for connection to one or a variety of different electronic modules 22, which may be as simple as a memory component (e.g., a flash drive) or which may contain more complex features. It is understood that the module 22 could be as complex a component as a personal computer, mobile device, server, etc. The port 14 is configured for transmitting data gathered by the sensors 16 to the module 22 for storage and/or processing. In another embodiment, the port 14 may include necessary components (e.g. a processor, memory, software, TX/RX, etc.) in order to accomplish storage and/or execution of such computer programs/algorithms and/or direct (wired or wireless) transmission of data and/or other information to an external device 110. Examples of a housing and electronic modules in a footwear article are illustrated in U.S. patent application Ser. No. 11/416,458, published as U.S. Patent Application Publication No. 2007/0260421, which is incorporated by reference herein and made part hereof. Although the port 14 is illustrated with electrical contacts forming an interface 20 for connection to a module, in other embodiments, the port 14 may contain one or more additional or alternate communication interfaces for communication with the sensors 16, the module 22, the external device 110, and/or another component. For example, the port 14 may contain or comprise a USB port, a Firewire port, 16-pin port, or other type of physical contact-based connection, or may include a wireless or contactless communication interface, such as an interface for Wi-Fi, Bluetooth, near-field communication, RFID, Bluetooth Low Energy, Zigbee, or other wireless communication technique, or an interface for infrared or other optical communication technique (or combination of such techniques).

The port 14 and/or the module 22 may have one or more interfaces 20, 23, and the port 14 may have internal circuitry to connect all of the leads 18, 18A to the interfaces 20, 23. Additionally, the module 22 may have one or more interfaces 23 that are complementary to the interface(s) 20 of the port 14, for connection thereto. For example, if the port 14 has interface(s) 20 in the side walls 139 and/or base wall 143 thereof, the module 22 may have complementary interface(s) 23 in the side walls and/or base wall as well. It is understood that the module 22 and the port 14 may not have identically complementary interfaces 20, 23, and that only one pair of complementary interfaces 20, 23 may be able to achieve communication between the components. In other embodiments, the port 14 and the well 135 may have a different configuration for connection of the leads 18, 18A. Additionally, the port 14 may have a different shape, which may enable a greater variety of connection configurations. Further, any of the connection configurations described herein, or combinations thereof, can be utilized with the various embodiments of sensor systems described herein.

The module 22 may additionally have one or multiple communication interfaces for connecting to an external device 110 to transmit the data, e.g. for processing, as described below and shown in FIG. 6. Such interfaces can include any of the contacted or contactless interfaces described above. In one example, the module 22 includes at least a retractable USB connection for connection to a computer. In another example, the module 22 may be configured for contacted or contactless connection to a mobile device, such as a watch, cell phone, portable music player, etc. The module 22 may be configured to be removed from the footwear 100 to be directly connected to the external device 110 for data transfer, such as by the retractable USB connection described above or another connection interface. However, in another embodiment, the module 22 may be configured for wireless communication with the external device 110, which allows the device 22 to remain in the footwear 100 if desired. In a wireless embodiment, the module 22 may be connected to an antenna for wireless communication. The antenna may be shaped, sized, and positioned for use with the appropriate transmission frequency for the selected wireless communication method. Additionally, the antenna may be located internally within the module 22 or external to the module 22, such as at the port 14 or another location. In one example, the sensor system 12 itself (such as the leads 18 and conductive portions of the sensors 16) could be used to form an antenna in whole or in part. It is understood that the module 22 may contain an antenna in addition to an antenna connected elsewhere in the sensor system 12, such as at the port 14, at one or more of the sensors 16, etc. In one embodiment, the module 22 may be permanently mounted within the footwear 100, or alternately may be removable at the option of the user and capable of remaining in the footwear 100 if desired. Additionally, as further explained below, the module 22 may be removed and replaced with another module 22 programmed and/or configured for gathering and/or utilizing data from the sensors 16 in another manner. If the module 22 is permanently mounted within the footwear 100, the sensor system 12 may further contain an external port 15 to allow for data transfer and/or battery charging, such as a USB or Firewire port. Such an external port 15 may additionally or alternately be used for communication of information. The module 22 may further be configured for contactless charging, such as inductive charging. It is understood that the module 22 may be configured for contacted and/or contactless communication.

While the port 14 may be located in a variety of positions without departing from the invention, in one embodiment, the port 14 is provided at a position and orientation and/or is otherwise structured so as to avoid or minimize contact with and/or irritation of the wearer's foot, e.g., as the wearer steps down in and/or otherwise uses the article of footwear 100, such as during an athletic activity. The positioning of the port 14 in FIGS. 3-5 illustrates one such example. In another embodiment, the port 14 is located proximate the heel or instep regions of the shoe 100. Other features of the footwear structure 100 may help reduce or avoid contact between the wearer's foot and the port 14 (or an element connected to the port 14) and improve the overall comfort of the footwear structure 100. For example, as illustrated in FIGS. 4-5, the foot contacting member 133, or other foot contacting member, may fit over and at least partially cover the port 14, thereby providing a layer of padding between the wearer's foot and the port 14. Additional features for reducing contact between and modulating any undesired feel of the port 14 at the wearer's foot may be used. Of course, if desired, the opening to the port 14 may be provided through the top surface of the foot contacting member 133 without departing from the invention. Such a construction may be used, for example, when the housing 24, electronic module 22, and other features of the port 14 include structures and/or are made from materials so as to modulate the feel at the user's foot, when additional comfort and feel modulating elements are provided, etc. Any of the various features described above that help reduce or avoid contact between the wearer's foot and a housing (or an element received in the housing) and improve the overall comfort of the footwear structure may be provided without departing from this invention, including the various features described above in conjunction with FIGS. 4-5, as well as other known methods and techniques.

In one embodiment, where the port 14 is configured for contacted communication with a module 22 contained in a well 135 in the sole structure 130, the port 14 is positioned within or immediately adjacent the well 135, for connection to the module 22. It is understood that if the well 135 further contains a housing 24 for the module 22, the housing 24 may be configured for connection to the interface 20, such as by providing physical space for the interface 20 or by providing hardware for interconnection between the interface 20 and the module 22. The positioning of the interface 20 in FIG. 3 illustrates one such example, where the housing 24 provides physical space to receive the interface 20 for connection to the module 22.

FIG. 6 shows a schematic diagram of an example electronic module 22 including data transmission/reception capabilities through a data transmission/reception system 106, which may be used in accordance with at least some examples of this invention. While the example structures of FIG. 6 illustrate the data transmission/reception system (TX-RX) 106 as integrated into the electronic module structure 22, those skilled in the art will appreciate that a separate component may be included as part of a footwear structure 100 or other structure for data transmission/reception purposes and/or that the data transmission/reception system 106 need not be entirely contained in a single housing or a single package in all examples of the invention. Rather, if desired, various components or elements of the data transmission/reception system 106 may be separate from one another, in different housings, on different boards, and/or separately engaged with the article of footwear 100 or other device in a variety of different manners without departing from this invention. Various examples of different potential mounting structures are described in more detail below.

In the example of FIG. 6, the electronic module 22 may include a data transmission/reception element 106 for transmitting data to and/or receiving data from one or more remote systems. In one embodiment, the transmission/reception element 106 is configured for communication through the port 14, such as by the contacted or contactless interfaces described above. In the embodiment shown in FIG. 6, the module 22 includes an interface 23 configured for connection to the port 14 and/or sensors 16. In the module 22 illustrated in FIG. 3, the interface 23 has contacts that are complementary with the contacts of the interface 20 of the port 14, to connect with the port 14. In other embodiments, as described above, the port 14 and the module 22 may contain different types of interfaces 20, 23, which may be wired or wireless. It is understood that in some embodiments, the module 22 may interface with the port 14 and/or sensors 16 through the TX-RX element 106. Accordingly, in one embodiment, the module 22 may be external to the footwear 100, and the port 14 may comprise a wireless transmitter interface for communication with the module 22. The electronic module 22 of this example further includes a processing system 202 (e.g., one or more microprocessors), a memory system 204, and a power supply 206 (e.g., a battery or other power source). The power supply 206 may supply power to the sensors 16 and/or other components of the sensor system 12. The shoe 100 may additionally or alternately include a separate power source to operate the sensors 16 if necessary, such as a battery, piezoelectric, solar power supplies, or others.

Connection to the one or more sensors can be accomplished through TX-RX element 106, and additional sensors (not shown) may be provided to sense or provide data or information relating to a wide variety of different types of parameters. Examples of such data or information include physical or physiological data associated with use of the article of footwear 100 or the user, including pedometer type speed and/or distance information, other speed and/or distance data sensor information, temperature, altitude, barometric pressure, humidity, GPS data, accelerometer output or data, heart rate, pulse rate, blood pressure, body temperature, EKG data, EEG data, data regarding angular orientation and changes in angular orientation (such as a gyroscope-based sensor), etc., and this data may be stored in memory 204 and/or made available, for example, for transmission by the transmission/reception system 106 to some remote location or system. The additional sensor(s), if present, may also include an accelerometer (e.g., for sensing direction changes during steps, such as for pedometer type speed and/or distance information, for sensing jump height, etc.).

As additional examples, electronic modules, systems, and methods of the various types described above may be used for providing automatic impact attenuation control for articles of footwear. Such systems and methods may operate, for example, like those described in U.S. Pat. No. 6,430,843, U.S. Patent Application Publication No. 2003/0009913, and U.S. Patent Application Publication No. 2004/0177531, which describe systems and methods for actively and/or dynamically controlling the impact attenuation characteristics of articles of footwear (U.S. Pat. No. 6,430,843, U.S. Patent Application Publication No. 2003/0009913, and U.S. patent application Publication No. 2004/0177531 each are entirely incorporated herein by reference and made part hereof). When used for providing speed and/or distance type information, sensing units, algorithms, and/or systems of the types described in U.S. Pat. Nos. 5,724,265, 5,955,667, 6,018,705, 6,052,654, 6,876,947 and 6,882,955 may be used. These patents each are entirely incorporated herein by reference.

In the embodiment of FIG. 6, an electronic module 22 can include an activation system (not shown). The activation system or portions thereof may be engaged with the module 22 or with the article of footwear 100 (or other device) together with or separate from other portions of the electronic module 22. The activation system may be used for selectively activating the electronic module 22 and/or at least some functions of the electronic module 22 (e.g., data transmission/reception functions, etc.). A wide variety of different activation systems may be used without departing from this invention. In one example, the sensor system 12 may be activated and/or deactivated by activating the sensors 16 in a specific pattern, such as consecutive or alternating toe/heel taps, or a threshold force exerted on one or more sensors 16. In another example, the sensor system 12 may be activated by a button or switch, which may be located on the module 22, on the shoe 100, or on an external device in communication with the sensor system 12, as well as other locations. In any of these embodiments, the sensor system 12 may contain a "sleep" mode, which can deactivate the system 12 after a set period of inactivity. In one embodiment, the sensor system 12 may return to "sleep" mode if no further activity occurs in a short time after activation, in case of unintentional activation. In an alternate embodiment, the sensor system 12 may operate as a low-power device that does not activate or deactivate.

The module 22 may further be configured for communication with an external device 110, which may be an external computer or computer system, mobile device, gaming system, or other type of electronic device, as shown in FIG. 6. The exemplary external device 110 shown in FIG. 6 includes a processor 302, a memory 304, a power supply 306, a display 308, a user input 310, and a data transmission/reception system 108. The transmission/reception system 108 is configured for communication with the module 22 via the transmission/reception system 106 of the module 22, through any type of known electronic communication, including the contacted and contactless communication methods described above and elsewhere herein. It is understood that the module 22 can be configured for communication with a plurality of external devices, including a wide variety of different types and configurations of electronic devices, and that the device(s) with which the module 22 communicates can change over time. Additionally, the transmission/reception system 106 of the module 22 may be configured for a plurality of different types of electronic communication. It is further understood that the external device 110 as described herein may be embodied by two or more external devices in communication with the module 22, the port 14, and/or each other, including one or more intermediate devices that pass information to the external device 110, and that the processing, execution of programs/algorithms, and other functions of the external device 110 may be performed by a combination of external devices.

Many different types of sensors can be incorporated into sensor systems according to the present invention. FIGS. 7-10 illustrate one example embodiment of a sole structure 130 for a shoe 100 that contains a sensor system 212 that includes a sensor assembly 213 incorporating a plurality of force-sensitive resistor (FSR) sensors 216. The sensor system 212 is similar to the sensor system 12 described above, and also includes a port 14 in communication with an electronic module 22 and a plurality of leads 218 connecting the FSR sensors 216 to the port 14. The module 22 is contained within a housing 24 in a well or cavity 135 in the sole structure 130 of the shoe 100, and the port 14 is connected to the well 135 to enable connection to the module 22 within the well 135. The port 14 and the module 22 include complementary interfaces 220, 223 for connection and communication. The sensors 216 and sensor leads 218 of the sensor system 212 are positioned on an insert 237 that is adapted to be engaged with the sole structure 130. In the embodiment shown in FIGS. 7-10, the insert 237 is positioned on top of the midsole 131, between the foot contacting member 133 and the midsole 131 of the sole structure 130, and the housing 24 is positioned within a well 135 in the midsole 131 and is covered by the foot contacting member 133. During assembly, the insert 237 can be inserted above the midsole member 131 (and above the strobel, if present) during manufacturing of the shoe 100 after connection of the upper 120 to the midsole 131 and outsole 132, and then the foot-contacting member 133 can be inserted over the sensor system 212, although other assembly methods can be used. In other embodiments, the sensor system 212 can be differently configured or positioned, such as by placing the insert 237, the sensors 216, and/or the port 14 in a different location. For example, the well 135, the housing 24 and/or the port 14 may be positioned wholly or partially within the foot contacting member 133, as shown in FIG. 5, or the sensor system 212 and/or the insert 237 can be positioned on top of the foot contacting member 133. Any of the configurations of sensor systems, including any of the types and configurations of sensors, ports, inserts, etc., shown and described in U.S. Patent Application Publications Nos. 2010/0063778 and 2010/0063779, both filed on Jun. 12, 2009, can be used, which applications are incorporated by reference herein in their entireties and made part hereof. It is understood that the sensor system 12 shown in FIGS. 3-5 can have a configuration similar to the sensor system 212 of FIGS. 7-10, or any other configuration described herein, including any configuration shown and described in U.S. Patent Application Publications Nos. 2010/0063778 and 2010/0063779.

The sensor system 212 in FIGS. 7-10 includes four sensors 216, with a first sensor 216 positioned in the first phalange (big toe) area, a second sensor 216 positioned in the first metatarsal head area, a third sensor 216 positioned in the fifth metatarsal head area, and a fourth sensor 216 positioned in the heel area. The sensors 216 each have a sensor lead 218 connecting the sensor 216 to the port 14. Additionally, a power lead 218A extends from the port 14 and is connected to all four sensors 216. The power lead 218A may be connected in a parallel, series, or other configuration in various embodiments, and each sensor 216 may have an individual power lead in another embodiment All of the leads 218, 218A are connected to the port 14 for connection and transfer of data to a module 22 connected to the port 14. It is understood that the port 14 may have any configuration described herein. In this embodiment, the leads 218, 218A are positioned suitably for a 5-pin connection.

The FSR sensors 216 shown in FIGS. 7-9 contain first and second electrodes or electrical contacts 240, 242 and a force-sensitive resistive material 244 disposed between the electrodes 240, 242 to electrically connect the electrodes 240, 242 together. When force/pressure is applied to the force-sensitive material 244, the resistivity and/or conductivity of the force-sensitive material 244 changes, which changes the electrical potential and/or the current between the electrodes 240, 242. The change in resistance can be detected by the sensor system 212 to detect the force applied on the sensor 216. The force-sensitive resistive material 244 may change its resistance under pressure in a variety of ways. For example, the force-sensitive material 244 may have an internal resistance that decreases when the material is compressed, similar to the quantum tunneling composites described in greater detail below. Further compression of this material may further decrease the resistance, allowing quantitative measurements, as well as binary (on/off) measurements. In some circumstances, this type of force-sensitive resistive behavior may be described as "volume-based resistance," and materials exhibiting this behavior may be referred to as "smart materials." As another example, the material 244 may change the resistance by changing the degree of surface-to-surface contact. This can be achieved in several ways, such as by using microprojections on the surface that raise the surface resistance in an uncompressed condition, where the surface resistance decreases when the microprojections are compressed, or by using a flexible electrode that can be deformed to create increased surface-to-surface contact with another electrode. This surface resistance may be the resistance between the material 244 and the electrode 240, 242 and/or the surface resistance between a conducting layer (e.g. carbon/graphite) and a force-sensitive layer (e.g. a semiconductor) of a multi-layer material 244. The greater the compression, the greater the surface-to-surface contact, resulting in lower resistance and enabling quantitative measurement. In some circumstances, this type of force-sensitive resistive behavior may be described as "contact-based resistance." It is understood that the force-sensitive resistive material 244, as defined herein, may be or include a doped or non-doped semiconducting material.

The electrodes 240, 242 of the FSR sensor 216 can be formed of any conductive material, including metals, carbon/graphite fibers or composites, other conductive composites, conductive polymers or polymers containing a conductive material, conductive ceramics, doped semiconductors, or any other conductive material. The leads 218 can be connected to the electrodes 240, 242 by any suitable method, including welding, soldering, brazing, adhesively joining, fasteners, or any other integral or non-integral joining method. Alternately, the electrode 240, 242 and associated lead 218 may be formed of a single piece of the same material. As described below, the force sensitive resistive material 244 can be carbon (such as carbon black) in one embodiment, however other types of sensors may utilize a different type of force-sensitive resistive material 244, such as a quantum tunneling composite, a custom conductive foam, a force transducing rubber, and other force-sensitive resistive materials described herein.

In the example embodiment shown in FIGS. 7-9, the electrodes 240, 242 of the FSR sensor 216 have a plurality of interlocking or intermeshing fingers 246, with the force-sensitive resistive material 244 positioned between the fingers 246 to electrically connect the electrodes 240, 242 to each other. In the embodiment shown in FIG. 8, each of the leads 218 independently supplies power from the module 22 to the sensor 216 to which each respective lead 218 is connected. It is understood that the sensor leads 218 may include separate leads extending from each electrode 240, 242 to the port 14, and that the module 22 may provide electrical power to the electrodes 240, 242 through such separate leads, such as through a separate power lead 218A.

Force-sensitive resistors suitable for use in the sensor system 212 are commercially available from sources such as Sensitronics LLC. Examples of force-sensitive resistors which may be suitable for use are shown and described in U.S. Pat. Nos. 4,314,227 and 6,531,951, which are incorporated herein by reference in their entireties and made parts hereof.

In the embodiment of the sensor system 212 shown in FIGS. 7-10, each sensor 216 includes two contacts 240, 242 constructed of a conductive metallic layer and a carbon layer (such as carbon black) forming a contact surface on the metallic layer (not shown). The sensors 216 also include a force-sensitive resistive material 244 that is constructed of a layer or puddle of carbon (such as carbon black), which is in contact with the carbon contact surfaces of the electrodes 240, 242. The carbon-on-carbon contact can produce greater conductivity changes under pressure, increasing the effectiveness of the sensors 216. The leads 218, 218A in this embodiment are constructed of a conductive metallic material that may be the same as the material of the metallic layer of the contacts 240, 242. In one embodiment, the leads 218, 218A and the metallic layers of the contacts 240, 242 are constructed of silver.

As shown in FIG. 9, in this example embodiment, the sensor system 212 is constructed of two flexible layers 241 and 245 that combine to form an insert member 237 for insertion into an article of footwear, such as between the foot contacting member 133 and the midsole member 131 as discussed above. The layers 241, 245 can be formed of any flexible material, such as a flexible polymer material. In one embodiment, the layers 241, 245 are formed of a 0.05-0.2 mm thick pliable thin Mylar material. The insert 237 is constructed by first depositing the conductive metallic material on the first layer 241, such as by printing, in the traced pattern of the leads 218, 218A and the electrodes 240, 242 of the sensors 216, to form the configuration shown in FIGS. 7-9. Then, the additional carbon contact layer is deposited on the first layer 241, tracing over the electrodes 240, 242 of the sensors 216, and the carbon force-sensitive resistive material 244 is deposited as puddles on the second layer 245, as also shown in FIG. 9. After all the materials have been deposited, the layers 241, 245 are positioned in a superimposed manner, as shown in FIG. 9, so that the electrodes 240, 242 are aligned with the puddles of force-sensitive resistive material 244, to form the insert member 237 for insertion into the article of footwear 100. It is understood that the conductive metallic material and the carbon material 244 are deposited on the faces of the layers 266, 268 that face each other (e.g. the top surface of the bottom-most layer 266, 268 and the bottom surface of the top-most layer 266, 268). In one embodiment, the sensor system 212 constructed in this manner can detect pressures in the range of 10-750 kPa. In addition, the sensor system 212 may be capable of detecting pressures throughout at least a portion of this range with high sensitivity. The insert member 237 may further include one or more additional layers, such as a graphic layer (not shown).

Figure 11:
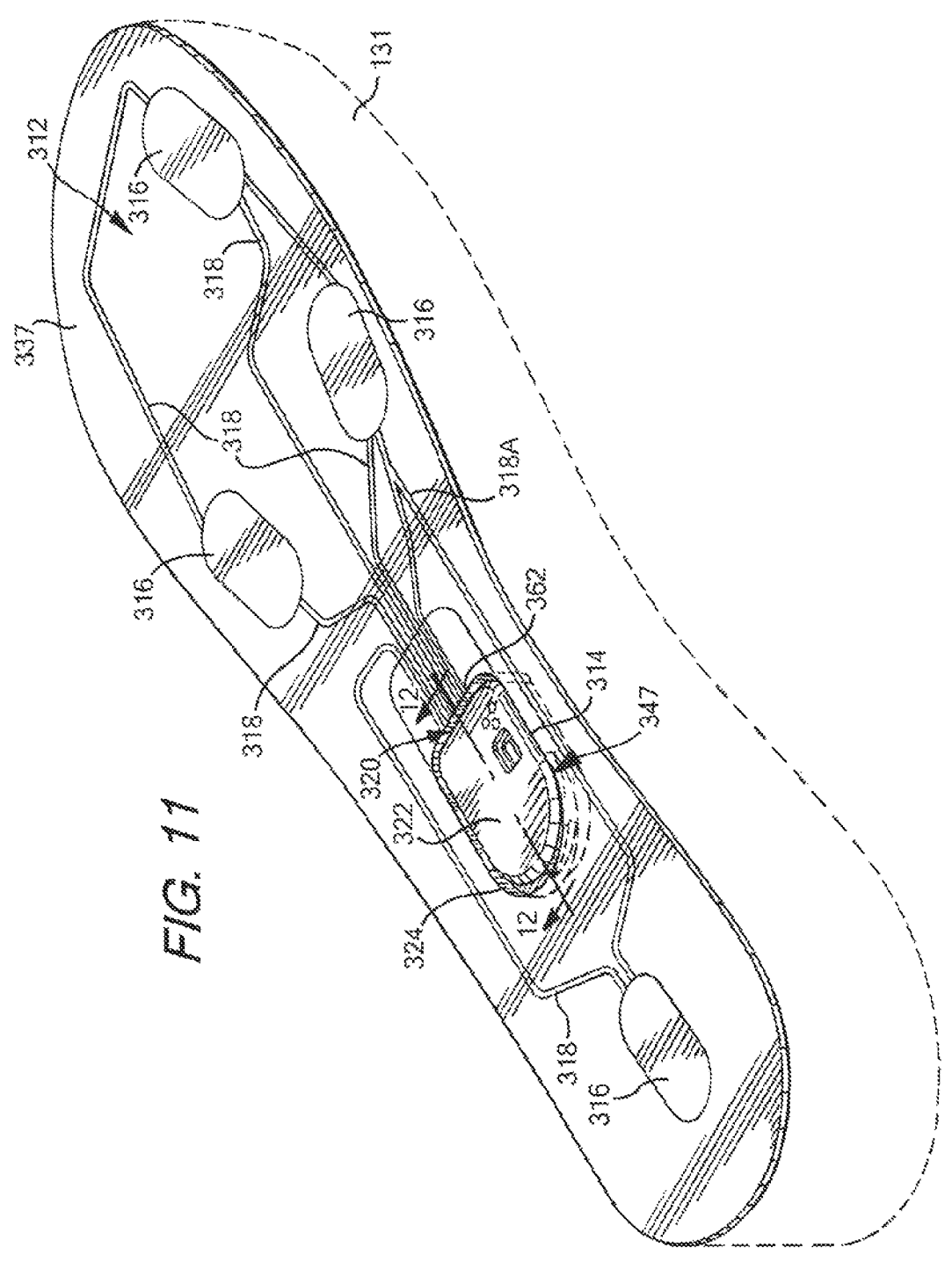
FIG. 11 is a perspective view of another embodiment of a sensor system according to aspects of the invention, for use with an article of footwear, with a sole structure of the article of footwear being depicted schematically by broken lines.

FIGS. 11-85 illustrate various embodiments of ports 14 that can be used with sensor systems 12, 212 as shown in FIGS. 1-10, or with other embodiments of sensor systems, as well as modules 22 that can be used in connection with such ports 14. Some of these embodiments may include retaining structures and other specific structures for the ports 14, modules 22, and other components. Any of such embodiments may be adapted to provide alternative or additional retaining structures or other structures, including structures and features described herein with respect to other embodiments, as well as structures and features not described herein. FIGS. 11-18A illustrate one embodiment of a port 314 that can be used in connection with a sensor system 312 according to aspects and features described herein. FIGS. 11-18A illustrate the port 314 as part of the sensor system 312 configured similarly to the sensor system 212 described above, with four sensors 316 positioned in the first phalange (big toe) area, the first metatarsal head area, the fifth metatarsal head area, and the heel area. The sensors 316 may be FSR sensors or a different type of sensor, as described above, and in one embodiment, the sensor system 312 may utilize two or more different types of sensors. The sensors 316 and the leads 318, including the power lead 318A, are disposed on an insert 337 that is positioned to engage the midsole member 131 of the sole structure 130 of an article of footwear, similarly to the sensor system 212 described above and shown in FIGS. 7-10. Additionally, the port 314 includes an interface 320 for electrical connection to an electronic module 322, and the sensor leads 318, 318A all end at the interface 320. The port 314 is at least partially received in a well 135 in the sole structure 130, and in this embodiment, the well 135 is located entirely within the midsole member 131.

Figure 86:
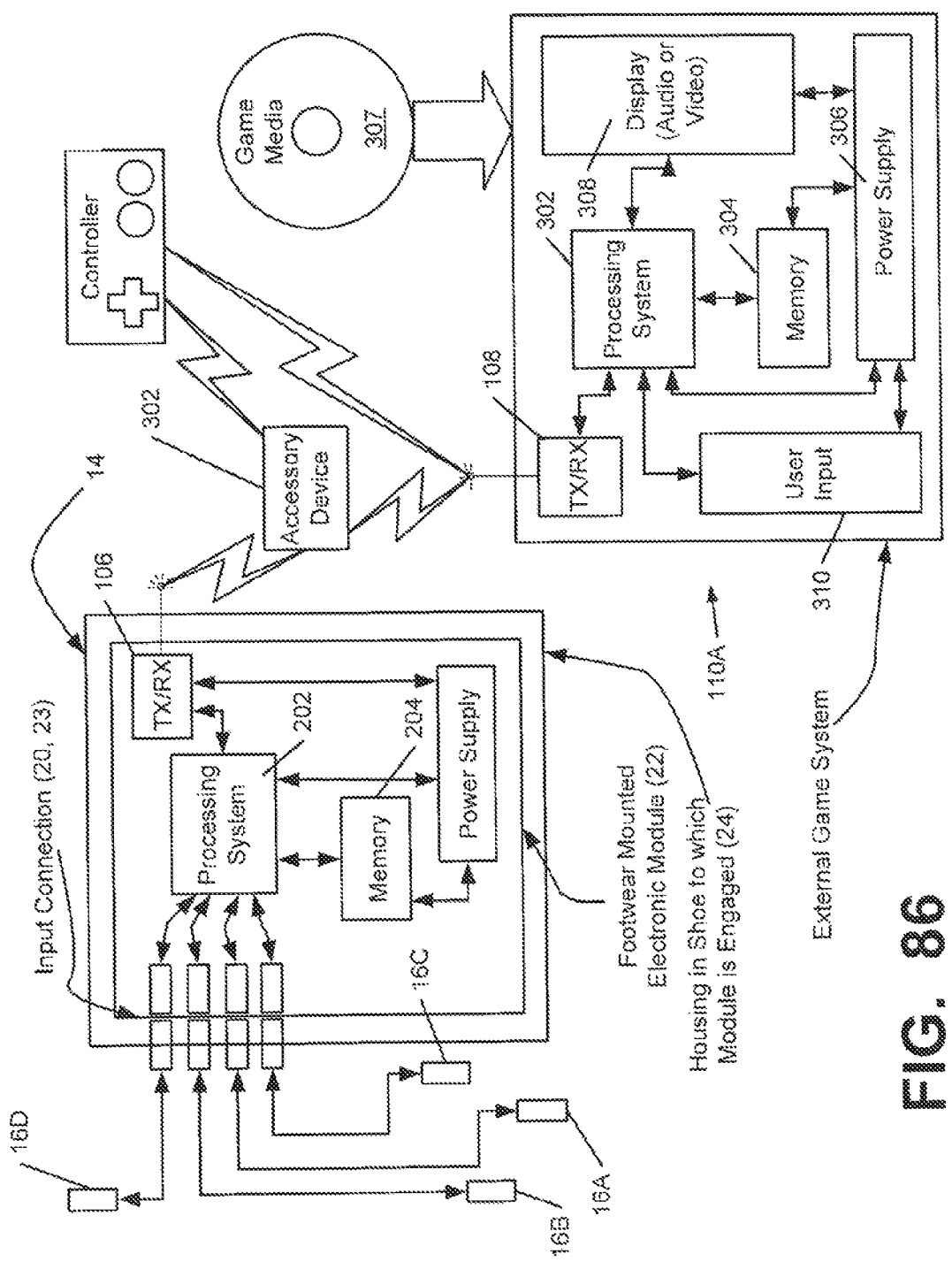
FIG. 86 is a schematic diagram of the electronic module of FIG. 6, in communication with an external gaming device.

One embodiment of an electronic module 322 as described above is illustrated in FIGS. 11-18A. The shape of the module 322 is generally rectangular at the front end, with a rounded rear end, as seen in FIGS. 14-17. As seen in FIGS. 12-18, the module 322 also has a lip or flange 351 located around the rounded rear end and extending outward from the body of the module 322. The module 322 has an interface 323 at the front end thereof, having one or more electrical contacts 353 and being adapted for forming an electrical connection with the interface 320 of the port 314. The contacts 353 in this embodiment are in the form of electrical contact springs 353 with contact surfaces 354 that extend slightly outwardly from the module 322. The module 322 may include any additional features described herein, such as in FIGS. 6 and 86, including any necessary hardware and software for collecting, processing, and/or transmitting data.

In the embodiment illustrated in FIGS. 11-18A, the port 314 includes a housing 324 that is adapted to be received in the well 135 of the sole structure 130 and the interface 320 engaged with the housing 324. As shown in FIG. 11, the housing 324 in this embodiment is engaged with the insert 337 of the sensor system 312, and is positioned in an opening 347 in the insert 337 to be accessible through the insert 337. In other embodiments, the housing 324 may be differently configured with respect to the insert 337, such as being positioned below the insert 337 so that the insert 337 must be raised to access the housing 324. The housing 324 has a chamber 348 that is defined by a plurality of side walls 339 and a bottom wall 343 and is adapted to receive the module 322 therein. In this embodiment, the chamber 348 is substantially rectangular and defined by four side walls 339, with one side wall 339 being curved similarly to the rear end of the module 322, but the chamber 348 may have a different shape in other embodiments, such as some embodiments described below. The well 135 may be complementarily dimensioned with the housing 324 to fit the housing 324 within, and may further include a bonding material (e.g. elastomeric material) or other connection to secure the housing 324 and/or other components within the well 135. It is understood that if a housing 324 is not utilized, the well 135 may be dimensioned to hold the module 322 in the same manner. The same is true of other housings, wells, and modules described herein with respect to other embodiments, any of which may include such complementarily dimensioned structures.

Figures 12, 13:
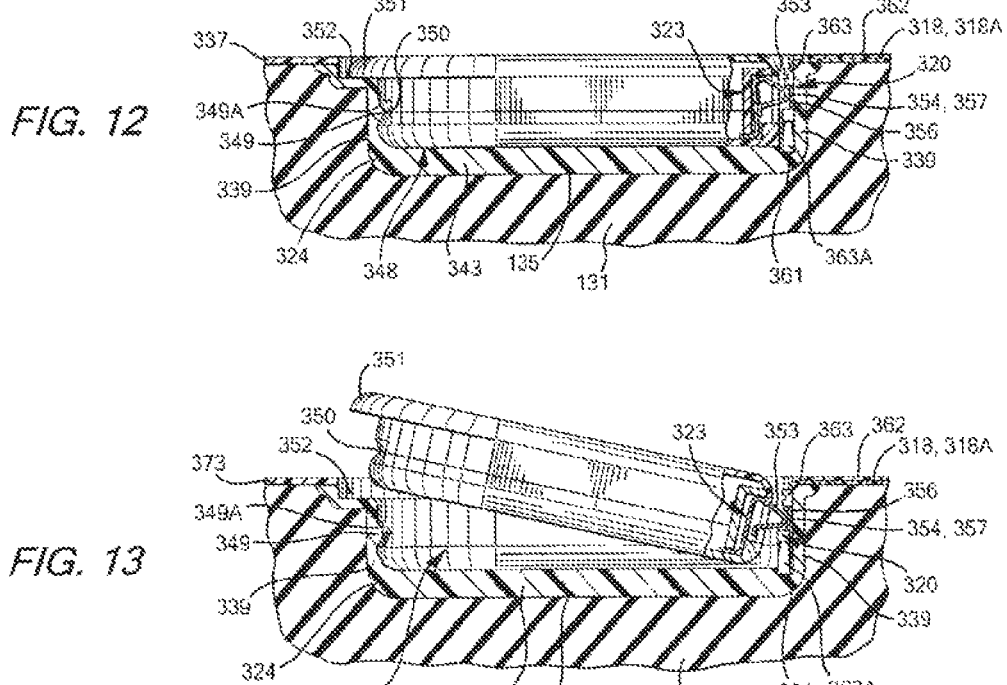
FIG. 12 is a cross-sectional view taken along lines 12-12 of FIG. 11, showing a port of the sensor system of FIG. 11 and an electronic module being received in a housing of the sensor system.
FIG. 13 is a cross-sectional view showing the port and the module of FIG. 12, with the module being inserted into the port.
Figures 14, 15, 15A, 16, 17, 18:
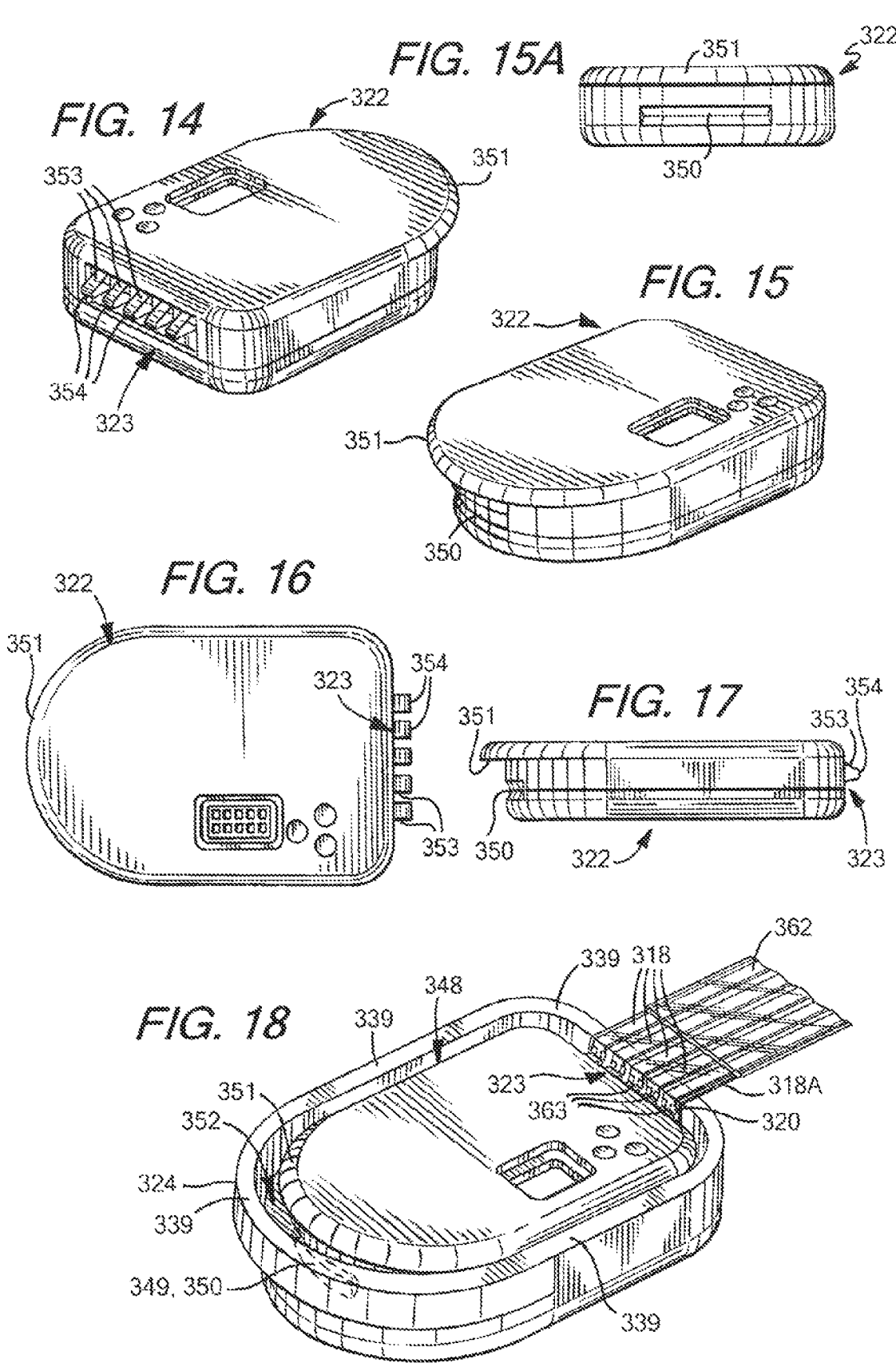
FIG. 14 is a perspective view of the module shown in FIG. 12.
FIG. 15 is a rear perspective view of the module of FIG. 14.
FIG. 15A is a rear view of the module of FIG. 14.
FIG. 16 is a top view of the module of FIG. 14.
FIG. 17 is a side view of the module of FIG. 14.
FIG. 18 is a perspective view of the port of FIG. 11, showing the module received in the housing thereof.

The housing 324 also includes retaining structure to retain the module 322 within the chamber 348. In this embodiment, the retaining structure includes a retaining member 349 adapted to engage the module 322 and exert a downward retaining force on the module 322. The retaining member 349 includes at least one resilient retaining tab 349. In the embodiment shown in FIGS. 11-18A, the housing 324 includes one retaining tab 349 positioned on the rounded side wall 339 of the chamber 348, at the opposite end of the chamber 348 from the interface 320. As shown in FIGS. 12-13, the module 322 can be inserted into the chamber 348 by first placing the front of the module 322 in position so the module interface 323 is proximate the port interface 320 and then pressing the back of the module 322 downward. The retaining tab 349 is resilient and has a ramped surface 349A that help guide the module 322 and permit the module 322 to pass by, whereupon the tab 349 is received in the notch 350 in the module 322 to retain the module 322 within the chamber 348. Additionally, the engagement between the tab 349 and the module 322 exerts a forward force on the module 322, pushing the interface 323 of the module 322 into contact with the interface 320 of the port 314.

In this embodiment, the housing 324 also has a recess 352 formed by a rounded platform 352A located in the rounded side wall 339 of the housing 324. When the module 322 is received in the chamber 348, the lip 351 of the module 322 is at least partially received in the recess 352, and the recess 352 provides room for the lip 351 of the module 322 to be accessed by a user. To remove the module 322, the user can pull or pry the module 322 out of the chamber 348 by use of the lip 351, exerting sufficient force to separate the tab 349 from the notch 350 in the module 322 to enable the module 322 to be released from the chamber 348.

The interface 320 is engaged with the housing 324 and is adapted for electrical connection to the module interface 323 when the module 322 is received in the chamber 348. The interface 320 contains one or more electrical contacts 356 having contact surfaces 357 that are exposed to the chamber 348 and are adapted to form an electrical connection by engaging the contact surface(s) 354 of the electrical contact(s) 353 of the module interface 323. In the embodiment illustrated in FIGS. 11-18A, the contacts 356 of the interface 320 are in the form of contact pads 356 that are held in place by a support structure 363 that engages the sensor leads 318 and hold the contact pads 356 in place at the front end of the chamber 348, in position to engage the contacts 353 of the module 322, as described below. The contact springs 353 of the module 322 are flexible and can flex slightly inwardly when they engage the contact pads 356 of the port interface 320. Additionally, the contact springs 353 are biased outwardly when flexed by engagement with the contact pads 356, in order to provide more secure engagement between the contacts 353 of the module 322 and the contacts 356 of the port 314. FIGS. 12-13 illustrate flexing of the contact springs 353.

Figure 18A:
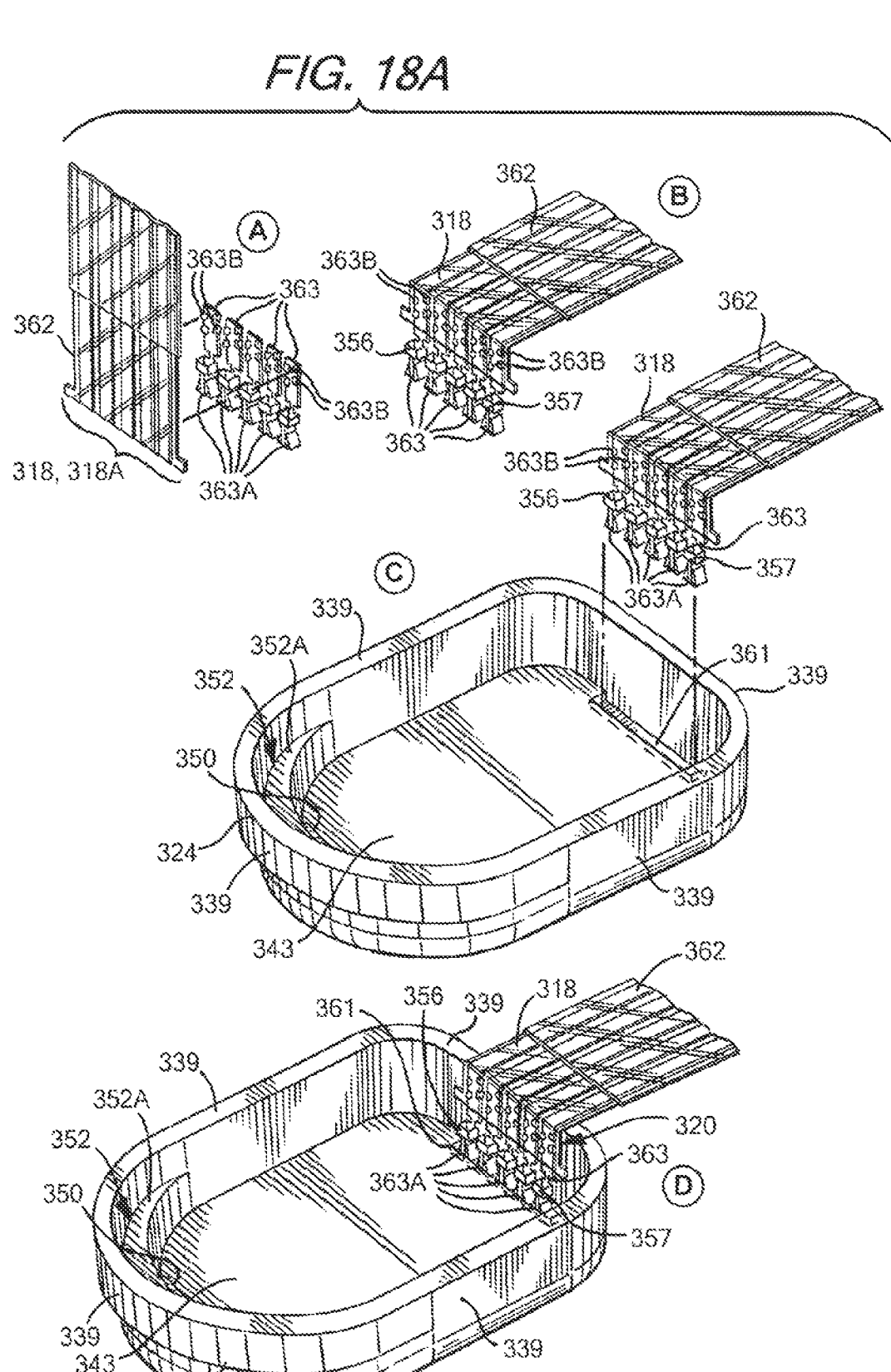
FIG. 18A is a schematic view illustrating the assembly of an interface of the port as shown in FIG. 11.

In this embodiment, the support structure 363 holds the contacts 356 so that the contact surfaces 357 are at least partially exposed to the chamber 348 for engagement by the module 322. The support structure 363 is engaged with the housing 324 to properly position the contacts 356. As shown in FIGS. 12, 13, and 18A, the support structure 363 is connected to the side wall 339 at the front end of the housing 324 opposite the retaining tab 349. Additionally, the housing 324 has a slot 361 along the front side wall 339 that is configured to receive a mounting portion 363A of the support structure 363 therein, to connect the support structure 363 to the housing 324 and mount the support structure 363 within the chamber. In the embodiment shown in FIG. 18A, the mounting portion 363A of the support structure 363 comprises a plurality of legs 363A that are received in the slot 361. The contacts 356 of the interface 320 are each connected to one of the sensor leads 318, 318A of the sensor system 312, in order to form an electrical connection for communication between the sensors 316 and the module 322. As shown in FIG. 18A, the sensor leads 318, 318A are bound together near the interface 320 with a band or strip 362 of Mylar or other material and are connected to the support structure 363, which are adapted for connection with the contacts 356 of the interface 320. The support structure 363 has crimping portions 363B that are crimped around the ends of the sensor leads 318, 318A to form an electrical connection. The crimping portions 363B may extend through the band 362. The support structure 363 is also engaged with the contact pads 356, as shown in FIGS. 12-13. In other embodiments, the sensor leads 318, 318A may be connected to the interface 320 in another manner, such as in the configurations described below with respect to other embodiments.

Figures 19, 20, 21:
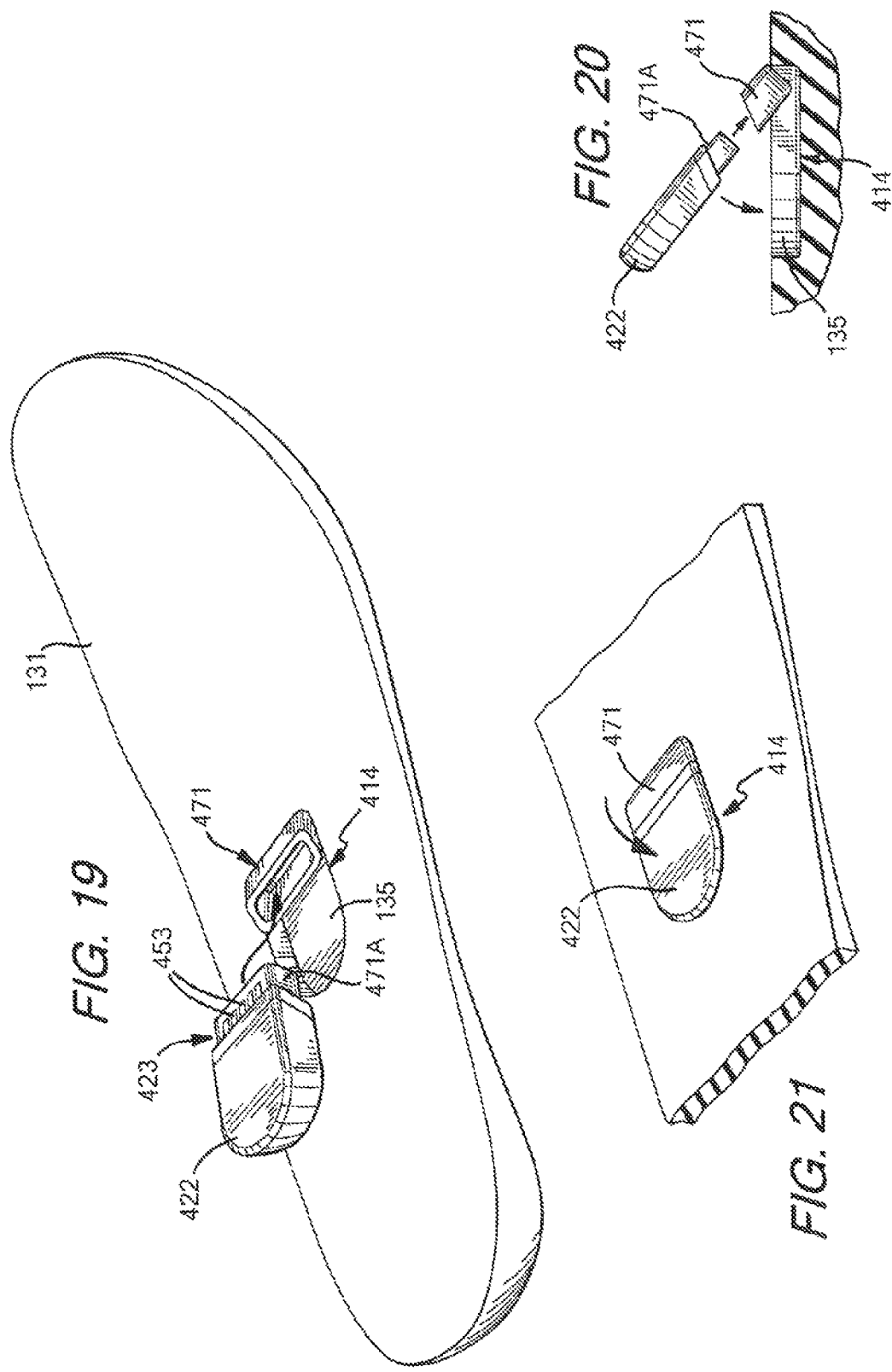
FIG. 19 is a perspective view of another embodiment of a sole member of an article of footwear, having a port and an electronic module configured for connection to the port.
FIG. 20 is a partial cross-sectional view of the sole member of FIG. 19, with the module being connected to the port.
FIG. 21 is a perspective view of the sole member of FIG. 19, with the module connected to the port.

FIGS. 19-21 illustrate another embodiment of a port 414, illustrated within a well 135 within a midsole member 131 of an article of footwear. Many features of this embodiment are similar or comparable to features of the port 314 described above and shown in FIGS. 11-18A, and such features are referred to using similar reference numerals under the "4xx" series of reference numerals, rather than "3xx" as used in the embodiment of FIGS. 11-18A. Accordingly, certain features of the port 414 that were already described above with respect to the port 314 of FIGS. 11-18A may be described in lesser detail, or may not be described at all. Additionally, the port 414 may be used in connection with any sensor systems 12, 212, 312 described above.

In this embodiment, the port 414 has an interface 420 with electrical contacts (not shown) located within a boot or sleeve 471 extending into a well 135 in the midsole 131. The port 414 does not contain a housing in this embodiment, and the well 135 functions as the chamber for receiving the module 422, although the port 414 may be provided with a housing in other embodiments. The module 422 has a shape that is generally the same as, or otherwise complementarily dimensioned with, the well 135. The module 422 has a plug 471A with an interface 423 located thereon, which includes electrical contact pads 453. The plug 471A is adapted to be received within the boot 471, and the boot 471 is pivotable or otherwise moveable within the well 135 for facilitated connection with the module 422, as shown in FIGS. 48-49. When the plug 471A is received within the boot 471, the interface 423 of the module 422 engages the interface 420 of the port 414 to form an electrical connection. The module 422 and the boot 471 can then be pivoted downwardly to fit the module 422 snugly within the well 135. Removal of the module 422 can be accomplished through reversal of such actions. It is understood that the interface 420 of the port 414 may be connected to a sensor system 12, 212, 312 as described above. Additionally, the boot 471 may be made partially or entirely of an elastomeric material that compresses when the plug 471A is inserted into the boot 471, in order to create a snug, water-tight seal. It is understood that in this embodiment, such a seal may be snug or water-tight, or both snug and water-tight. The same is true of other embodiments described herein as snug and/or water-tight. Further, either or both of the module 422 and the well 135 may include an elastomeric material at their respective surfaces of engagement, to snugly retain the module 422 within the well 135.

Figures 22, 23, 24:
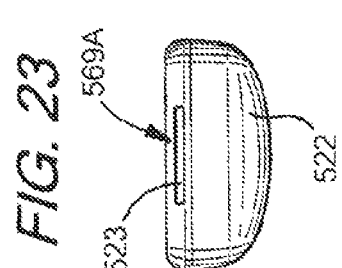
FIG. 22 is a perspective view of another embodiment of a sole member of an article of footwear, having a port and an electronic module configured for connection to the port.
FIG. 23 is an end view of the module of FIG. 22.
FIG. 24 is a perspective view of the sole member of FIG. 22, with the module connected to the port.

FIGS. 22-24 illustrate another embodiment of a port 514, illustrated within a well 135 within a midsole member 131 of an article of footwear. Many features of this embodiment are similar or comparable to features of the port 314 described above and shown in FIGS. 11-18A, and such features are referred to using similar reference numerals under the "5xx" series of reference numerals, rather than "3xx" as used in the embodiment of FIGS. 11-18A. Accordingly, certain features of the port 514 that were already described above with respect to the port 314 of FIGS. 11-18A may be described in lesser detail, or may not be described at all. Additionally, the port 514 may be used in connection with any sensor systems 12, 212, 312 described above.

Figure 53:
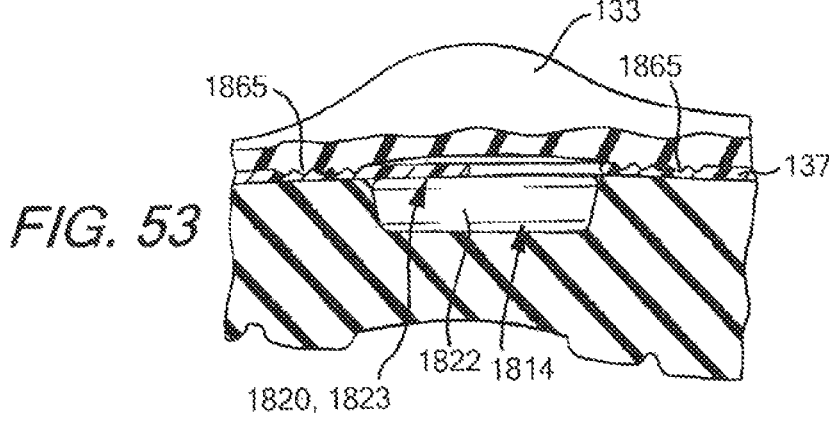
FIG. 53 is a partial cross-sectional view of the portion of the article of footwear of FIG. 52, with the module connected to the port.

In this embodiment, the port 514 has an interface 520 with electrical contacts 556 located on a plug 569. In one embodiment, the plug 569 may be in the form of a Mylar strip treated with a rigid coating, extending over a well 135 in the midsole 131. The port 514 does not contain a housing in this embodiment, and the well 135 functions as the chamber for receiving the module 522, although the port 514 may be provided with a housing in other embodiments. The module 522 has a shape that is complementary with the shape of the well 135. The module 522 has an interface 523 within an opening 569A on the end thereof, which includes electrical contacts in the form of foam connection strips (e.g. Zebra strips) (not shown). The opening 569A is dimensioned to removably receive the plug 569. When the module 522 is inserted into the well 135, the plug 569 is received in the opening 569A on the module 522, as shown in FIG. 53, and the interface 523 of the module 522 engages the interface 520 of the port 514 to form an electrical connection. The well 135 is oversized to permit the module 522 to be inserted by sliding the module 522 forward so that the plug 569 is received in the opening 569A. The well 135, the module 522, or other components may contain "lead-in" geometry to guide connection, which can include complementary grooves and ridges and/or flaring, such as flaring of the opening 569A. Additionally, the plug 569 and opening 569A may be respectively dimensioned to retain a proper electric connection if the module 522 slides within the oversized well 135. The well 135 may be provided slightly loose to ease removable insertion or, as generally stated above, may be smaller than the module 522 in one or more dimensions to enhance retention. It is understood that the interface 520 of the port 514 may be connected to a sensor system 12, 212, 312 as described above. Additionally, the opening 569A contain an elastomeric material that compresses when the plug 569 is inserted into the opening 569A, in order to create a snug, water-tight seal. Further, the module 522 has a detent 572 on the top surface thereof to facilitate manipulation by a user's finger.

FIGS. 25-27 illustrate another embodiment of a port 614, illustrated within a well 135 within a midsole member 131 of an article of footwear. Many features of this embodiment are similar or comparable to features of the port 314 described above and shown in FIGS. 11-18A, and such features are referred to using similar reference numerals under the "6xx" series of reference numerals, rather than "3xx" as used in the embodiment of FIGS. 11-18A. Accordingly, certain features of the port 614 that were already described above with respect to the port 314 of FIGS. 11-18A may be described in lesser detail, or may not be described at all. Additionally, the port 614 may be used in connection with any sensor systems 12, 212, 312 described above.

In this embodiment, the port 614 has an interface 620 with electrical contacts (not shown) located within a boot or sleeve 671 extending into a well 135 in the midsole 131. The port 614 does not contain a housing in this embodiment, and the well 135 functions as the chamber for receiving the module 622, although the port 614 may be provided with a housing in other embodiments. The module 622 has a shape that is complementary with the shape of the well 135. The module 622 has a plug 671A with an interface 623 located thereon, which includes electrical contact pads 653. The plug 671A is adapted to be received within the boot 671 that is rigidly fixed at one end of the well 135. When the plug 671A is received within the boot 671, the interface 623 of the module 622 engages the interface 620 of the port 614 to form an electrical connection. The well 135 is oversized longitudinally to permit the module 622 to be inserted into the well 135 by sliding the plug 671A into the boot 671, as shown in FIG. 26. As such, the oversized well 135 enables the removable insertion and sliding in the longitudinal direction. In the lateral dimension, the well 135 may be undersized to enhance retention of the module 622. It is understood that the interface 620 of the port 614 may be connected to a sensor system 12, 212, 312 as described above. Additionally, the boot 671 may be made partially or entirely of an elastomeric material that compresses when the plug 671A is inserted into the boot 671, in order to create a snug, water-tight seal. The boot 671 may additionally or alternately include plastic sufficiently hard so as to enable "snap" features, so as to give the user tactile feedback (e.g., as to full insertion) and/or as a retaining structure. Further, either or both of the module 422 and the well 135 may include an elastomeric material at their respective surfaces of engagement, to snugly retain the module 422 within the well 135.

FIGS. 28-29 illustrate another embodiment of a port 714, illustrated as received in a well 135 within a midsole member 131 of an article of footwear. Many features of this embodiment are similar or comparable to features of the port 314 described above and shown in FIGS. 11-18A, and such features are referred to using similar reference numerals under the "7xx" series of reference numerals, rather than "3xx" as used in the embodiment of FIGS. 11-18A. Accordingly, certain features of the port 714 that were already described above with respect to the port 314 of FIGS. 11-18A may be described in lesser detail, or may not be described at all. Additionally, the port 714 may be used in connection with any sensor systems 12, 212, 312 described above.

In this embodiment, the port 714 has an interface 720 with electrical contact pads 756 on the bottom wall 743 of the housing 724. The housing 724 has a chamber 748 defined by a plurality of side walls 739 and the bottom wall 743. In an example embodiment, the housing 724 has a squared or rectangular shape on one end and a rounded shape on the opposite end. The housing 724 may be rigid, semi-rigid, or having selected rigidity among its components. The module 722 and chamber 748 have complementary engaging shapes. In an example embodiment, the complementary engaging shapes provide or promote a friction-fit when the module 722 is inserted into the chamber 748. In one or more embodiments, the respective rigidity and other physical characteristics of the module 722 and housing 724 are provided so as to provide or promote the friction-fit. The module 722 has an interface 723 on the bottom surface thereof, which includes contact pads 753, but may alternately include contact springs, or another type of electrical contact. When the module 722 is inserted into the housing, the interface of the module engages the interface 720 of the port 714 to form an electrical connection. It is understood that the interface 720 of the port 714 may be connected to a sensor system 12, 212, 312 as described above. Additionally, the module 722 may have an elastomeric ridge or other structure 765, around one or more edges thereof, which compresses when the module 722 is inserted into the housing 724. In example embodiments, an elastomeric structure may be disposed completely or partially around the module's respective edge. In these or other example embodiments (e.g., with or without the module 722 having a structure 765), the housing 724 may have one or more elastomeric ridges or structures 765 disposed on one or more of its walls, e.g., wholly or partially around the chamber 748, or in various combinations. In example embodiments, the housing 724 and the module 722 may have respective one or more elastomeric ridge(s) or other structure(s). In some of these example embodiments, the structures 765 may be complementarily shaped and/or disposed, e.g., so as to (i) be separate from each other (e.g., a housing structure 765 may be disposed on a wall adjacent the bottom of the chamber 748 while a module structure 765 may be disposed adjacent its top surface so as to adjoin the chamber's upper rim when the module is inserted in the chamber, and/or (ii) mate with each other when the module 722 is inserted in the chamber 748. It is understood that any one or more of such elastomeric ridge(s) or structure(s) 765 may be provided in order to enhance the friction fit between the module 722 and the walls 739 of the housing 724 and/or to create a snug, water-tight seal. Further, in an example embodiment, the housing 724 may have a notch 765A in one of the side walls 739, to permit easier access to remove the module 722, such as with a fingernail or a screwdriver or other tool. In any such embodiment, one or more elastomeric structures 765 may be disposed so as to provide a seal between the notch 765A and the chamber 748.

FIGS. 30-31 illustrate another embodiment of a port 814, illustrated as received in a well 135 within a midsole member 131 of an article of footwear. Many features of this embodiment are similar or comparable to features of the port 314 described above and shown in FIGS. 11-18A, and such features are referred to using similar reference numerals under the "8xx" series of reference numerals, rather than "3xx" as used in the embodiment of FIGS. 11-18A. Accordingly, certain features of the port 814 that were already described above with respect to the port 314 of FIGS. 11-18A may be described in lesser detail, or may not be described at all. Additionally, the port 814 may be used in connection with any sensor systems 12, 212, 312 described above.

In this embodiment, the port 814 has an interface 820 with electrical contact pads 856 on a post 866 extending upward from the bottom wall 843 of the housing 824. The housing 824 may be a semi-rigid structure in one embodiment, and has a chamber 848 defined by a plurality of side walls 839 and the bottom wall 843, having a squared or rectangular shape on one end and a rounded shape on the opposite end. The chamber 848 may have a different shape in other embodiments. The module 822 has a shape that is the same as the chamber 848. The module 822 has an interface 823 on the bottom surface thereof, which may include contact pads, contact springs, or another type of electrical contact. The module 822 also includes a recess 866A on the bottom surface, and the contacts 853 of the interface 823 are located within the recess 866A. When the module 822 is inserted into the housing, the post 866 of the housing 824 is received in the recess 866A on the module 822, and the interface 823 of the module 822 engages the interface 820 of the port 814 to form an electrical connection. It is understood that the interface 820 of the port 814 may be connected to a sensor system 12, 212, 312 as described above. Additionally, the housing 824 has an elastomeric gasket 865 or other elastomeric structure around the edges of the post 866, which compresses when the module 822 is inserted into the housing 824, in order to enhance the friction fit with the recess of the module 822 and to create a snug, water-tight seal. The module 822 may have an elastomeric seal, in addition to or instead of the elastomeric gasket 865 of the housing 824, to perform the same function(s). Further, the housing 824 has a notch 865A in one of the side walls 839, to permit easier access to remove the module 822, such as with a fingernail or a screwdriver or other tool. In any such embodiment, one or more elastomeric structures may be disposed so as to provide a seal between the notch 865A and the chamber 848.

Figures 32, 32A, 33, 34:
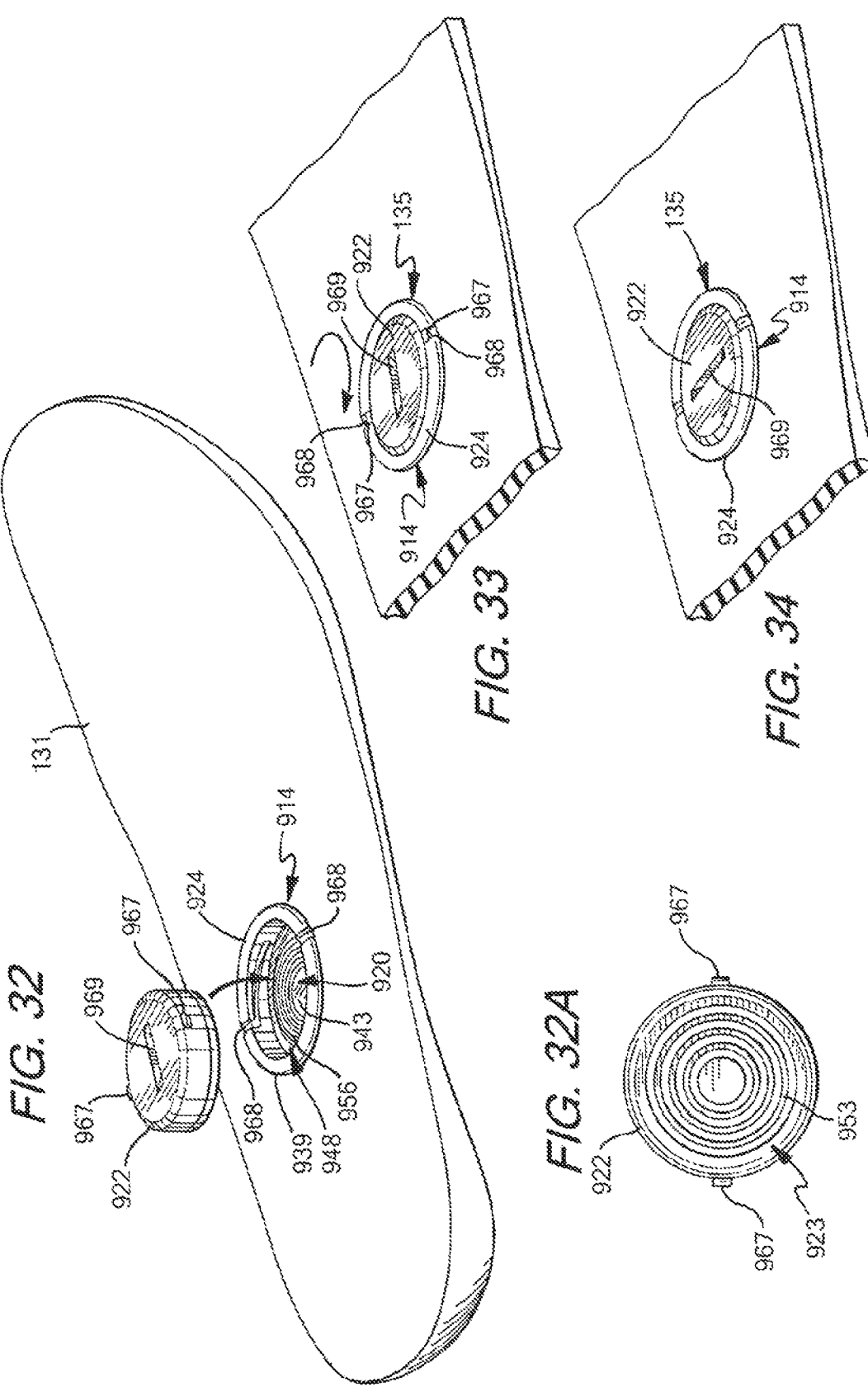
FIG. 32 is a perspective view of another embodiment of a sole member of an article of footwear, having a port and an electronic module configured for connection to the port.
FIG. 32A is a bottom view of the module of FIG. 32.
FIG. 33 is a perspective view of the sole member of FIG. 32, with the module being connected to the port.
FIG. 34 is a perspective view of the sole member of FIG. 32, with the module connected to the port.

FIGS. 32-34 illustrate another embodiment of a port 914, illustrated as received in a well 135 within a midsole member 131 of an article of footwear. Many features of this embodiment are similar or comparable to features of the port 314 described above and shown in FIGS. 11-18A, and such features are referred to using similar reference numerals under the "9xx" series of reference numerals, rather than "3xx" as used in the embodiment of FIGS. 11-18A. Accordingly, certain features of the port 914 that were already described above with respect to the port 314 of FIGS. 11-18A may be described in lesser detail, or may not be described at all. Additionally, the port 914 may be used in connection with any sensor systems 12, 212, 312 described above.

In this embodiment, the port 914 has an interface 920 with electrical contact pads 956 that have circular shapes and are arranged concentrically on the bottom wall 943 of the housing 924. The housing 924 is a semi-rigid structure in one embodiment, and has a chamber 948 defined by side walls 939 having a circular or substantially circular cross-section, and a bottom wall 943, having a circular or substantially circular shape, such that the walls 939, 943 form a chamber of cylindrical or substantially cylindrical geometry. The module 922 also has a disk-like shape, such that the module 922 and chamber 948 have complementary engaging shapes. The module 922 has an interface 923 on the bottom surface thereof, which may include annular contact pads 953, but may also include contact springs, a different type of contact pad, or another type of electrical contact. The interface 920 of the port 914 may have similar contact structures. The module 922 also includes projections 967 on opposite sides thereof, the housing has elongated, ramped grooves 968 in the side walls 939 that extend from the top of the housing 924 downward. When the module 922 is inserted into the housing, the projections 967 of the module 922 are received in the grooves 968, as shown in FIG. 33, and the module 922 is then rotated so the projections 967 travel within the grooves 968 to lock the module 922 within the housing 924. The locking may occur at a predetermined rotation, e.g. a quarter turn. Additionally, the connection between the projections 967 and the grooves 968 may be enhanced by additional structure, such as a biasing member (not shown) to engage the module 922, so that the projections 967 are urged into the grooves 968 by the biasing member. The module 922 includes a slot 969 in the top surface that can be engaged by a finger, a coin, or a tool to rotate the module 922 to insert and remove the module 922 from the housing 924. Once locked, the interface of the module 922 engages the interface 920 of the port 914 to form an electrical connection. It is understood that the interface 920 of the port 914 may be connected to a sensor system 12, 212, 312 as described above. Additionally, the module 922 has an elastomeric ridge, gasket or other structure 965 around the edges of the bottom surface thereof, which compresses when the module 922 is inserted into housing 924, in order to create a snug, water-tight seal. The housing 924 may additionally or alternately contain such elastomeric structure.

Figures 35, 35A, 36, 37:
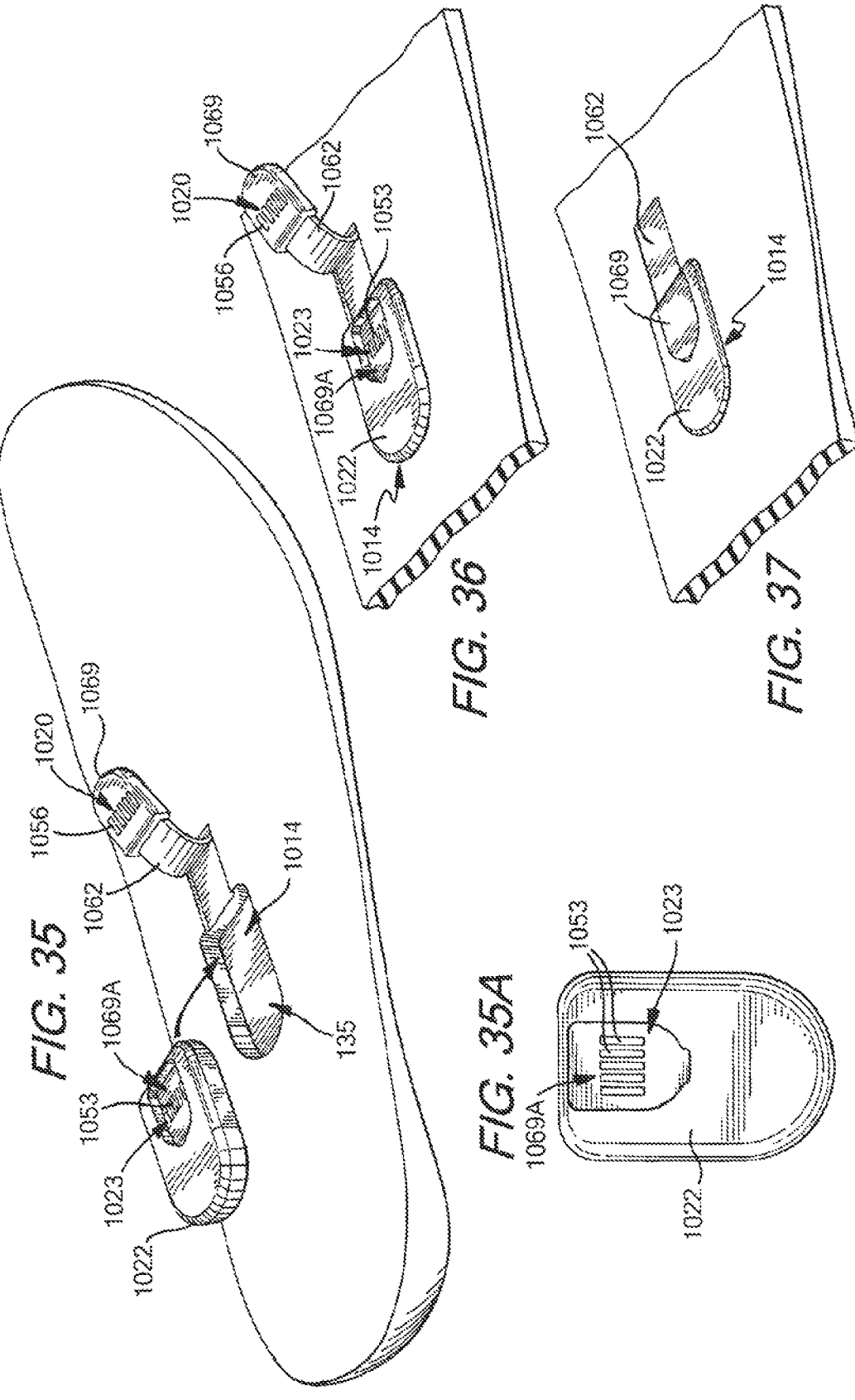
FIG. 35 is a perspective view of another embodiment of a sole member of an article of footwear, having a port and an electronic module configured for connection to the port.
FIG. 35A is a top view of the module of FIG. 35.
FIG. 36 is a perspective view of the sole member of FIG. 35, with the module being connected to the port.
FIG. 37 is a perspective view of the sole member of FIG. 35, with the module connected to the port.

FIGS. 35-37 illustrate another embodiment of a port 1014, illustrated within a well 135 within a midsole member 131 of an article of footwear. Many features of this embodiment are similar or comparable to features of the port 314 described above and shown in FIGS. 11-18A, and such features are referred to using similar reference numerals under the "10xx" series of reference numerals, rather than "3xx" as used in the embodiment of FIGS. 11-18A. Accordingly, certain features of the port 1014 that were already described above with respect to the port 314 of FIGS. 11-18A may be described in lesser detail, or may not be described at all. Additionally, the port 1014 may be used in connection with any sensor systems 12, 212, 312 described above.

In this embodiment, the port 1014 has an interface 1020 with electrical contact pads 1056 located on a plug 1069 connected to a flexible band or strip of Mylar 1062 extending over a well 135 in the midsole 131. The port 1014 does not contain a housing in this embodiment, and the well 135 functions as the chamber for receiving the module 1022, although the port 1014 may be provided with a housing in other embodiments. The module 1022 has a shape that is the same as the well 135. The module 1022 has an interface 1023 on the top surface thereof, which includes electrical contact pads 1053. The module 1022 also includes a recess 1069A on the top surface, and the contacts 1053 of the interface 1023 are located within the recess 1069A. When the module 1022 is inserted into the well 135, the plug 1069 is received in the recess 1069A on the module 1022, as shown in FIGS. 36-37, and the interface 1023 of the module 1022 engages the interface 1020 of the port 1014 to form an electrical connection. The band 1062 is flexible to permit the plug 1069 to be moved in order to facilitate insertion of the module 1022, as shown in FIG. 36. It is understood that the interface 1020 of the port 1014 may be connected to a sensor system 12, 212, 312 as described above. Additionally, the plug 1069 may be made of an elastomeric material that compresses when the plug 1069 is inserted into the recess 1069A, in order to create a snug, water-tight seal. The plug 1069 may include a divot as similarly described above, for removal of the plug 1069.

Figures 38, 38A, 39:
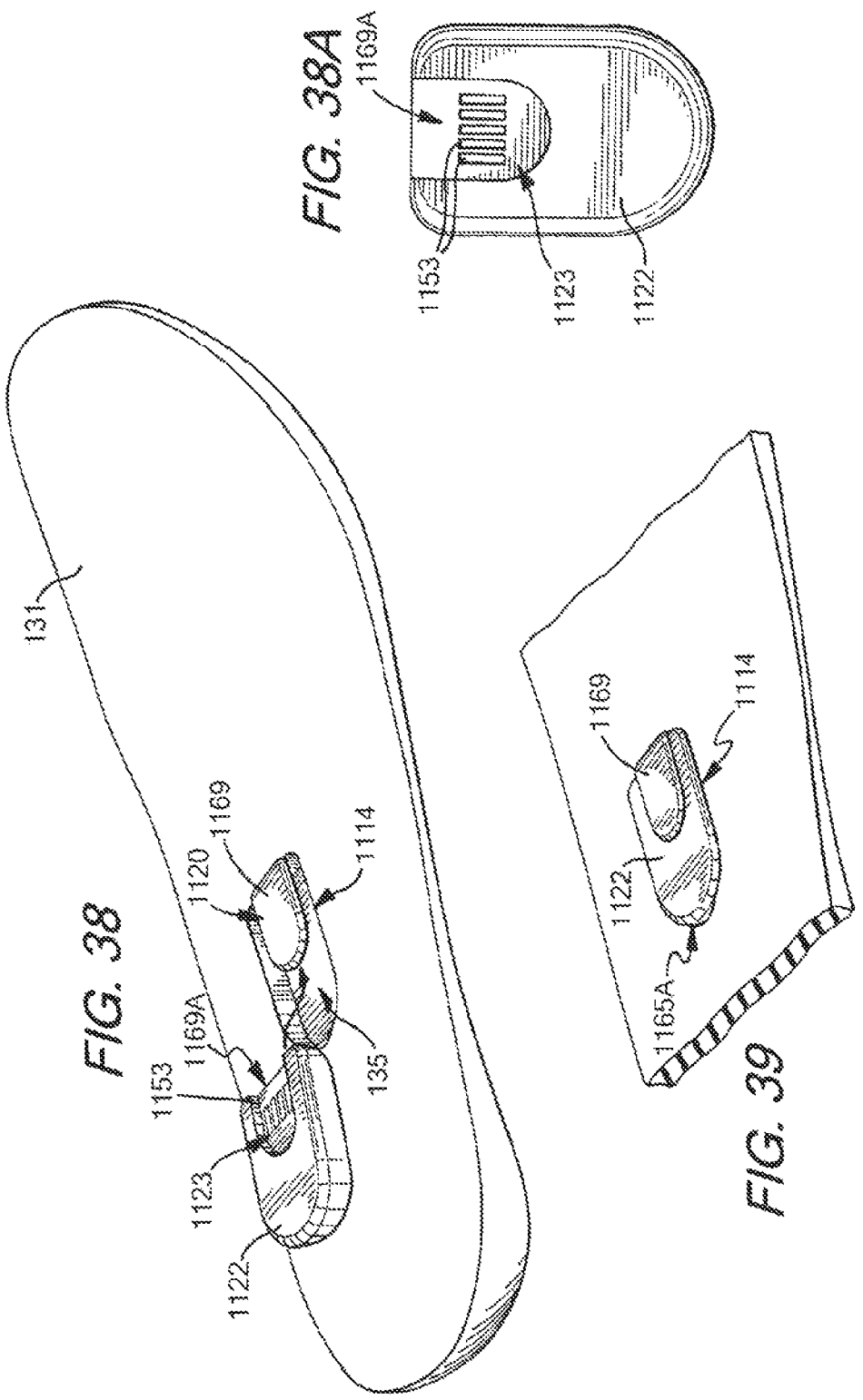
FIG. 38 is a perspective view of another embodiment of a sole member of an article of footwear, having a port and an electronic module configured for connection to the port.
FIG. 38A is a top view of the module of FIG. 38.
FIG. 39 is a perspective view of the sole member of FIG. 38, with the module connected to the port.

FIGS. 38-39 illustrate another embodiment of a port 1114, illustrated within a well 135 within a midsole member 131 of an article of footwear. Many features of this embodiment are similar or comparable to features of the port 314 described above and shown in FIGS. 11-18A, and such features are referred to using similar reference numerals under the "11xx" series of reference numerals, rather than "3xx" as used in the embodiment of FIGS. 11-18A. Accordingly, certain features of the port 1114 that were already described above with respect to the port 314 of FIGS. 11-18A may be described in lesser detail, or may not be described at all. Additionally, the port 1114 may be used in connection with any sensor systems 12, 212, 312 described above.

In this embodiment, the port 1114 has an interface 1120 with electrical contact pads (not shown) located on a rigid plug 1169 extending over a well 135 in the midsole 131. The port 1114 does not contain a housing in this embodiment, and the well 135 functions as the chamber for receiving the module 1122, although the port 1114 may be provided with a housing in other embodiments. The module 1122 has a shape that is the same as the well 135. The module 1122 has an interface 1123 on the top surface thereof, which includes electrical contact pads 1153. The module 1122 also includes a recess 1169A on the top surface, and the contacts 1153 of the interface 1123 are located within the recess 1169A. When the module 1122 is inserted into the well 135, the plug 1169 is received in the recess 1169A on the module 1122, as shown in FIGS. 38-39, and the interface 1123 of the module 1122 engages the interface 1120 of the port 1114 to form an electrical connection. The module 1122 is inserted by sliding under the rigid plug 1169, as shown in FIG. 38. It is understood that the interface 1120 of the port 1114 may be connected to a sensor system 12, 212, 312 as described above. Additionally, the plug 1169 may have an elastomeric portion that compresses when the plug 1169 is inserted into the recess 1169A, in order to create a snug, water-tight seal. Further, the well 135 has a notch 1165A in one of the side walls, to permit easier access to remove the module 1122, such as with a fingernail or a screwdriver or other tool. In any such embodiment, one or more elastomeric structures may be disposed so as to provide a seal between the notch 1165A and the well 135.

FIGS. 40-74 illustrate several configurations of ports 1214, et seq. that are engaged with a sole structure 130 of an article of footwear 100. In these embodiments, the ports 1214, et seq. are not illustrated with housings as described above, and the well 135 in the midsole member 131 functions as the chamber receiving the module 1222, et seq. in each configuration, although a housing or another receiving structure such as a liner, a pocket, etc., may be used in other embodiments to partially or entirely define the chamber for receiving the module 1222, et seq. It is therefore understood that any features of the well 135 described below with respect to FIGS. 40-74 may be equally attributed to a housing or similar receiving structure located inside the well 135. Additionally, each of the ports 1214, et seq. illustrated in FIGS. 40-74 and described below has an interface 1220, et seq. for connection to an electronic module 1222, et seq., and it is understood that the interfaces 1220, et seq. of any of these embodiment may be connected to a sensor system 12, 212, 312 as described above. Further, it is understood that any elastomeric or other sealing structures on the embodiments of FIGS. 40-74 that are shown and/or described as being located on a surface may be additionally or alternately located on another surface engaging that surface to form a seal.

FIG. 40 illustrates another embodiment of a port 1214, illustrated as received in a well 135 within a midsole member 131 of an article of footwear. Many features of this embodiment are similar or comparable to features of the port 314 described above and shown in FIGS. 11-18A, and such features are referred to using similar reference numerals under the "12xx" series of reference numerals, rather than "3xx" as used in the embodiment of FIGS. 11-18A. Accordingly, certain features of the port 1214 that were already described above with respect to the port 314 of FIGS. 11-18A may be described in lesser detail, or may not be described at all. In this embodiment, the port 1214 has a USB-style interface 1220 in the side of the well 135, and the module 1222 has a USB-plug interface 1223 located on the side surface thereof. The module 1222 further has a resilient and flexible flanged projection 1269 on the bottom surface, and the connector 1256 has an opening 1269A that receives the projection 1269. When the USB interfaces 1220, 1223 are connected together, the projection 1269 is received in the opening 1269A to further secure the connection.

FIGS. 41-42 illustrate another embodiment of a port 1314, illustrated as received in a well 135 within a midsole member 131 of an article of footwear. Many features of this embodiment are similar or comparable to features of the port 314 described above and shown in FIGS. 11-18A, and such features are referred to using similar reference numerals under the "13xx" series of reference numerals, rather than "3xx" as used in the embodiment of FIGS. 11-18A. Accordingly, certain features of the port 1314 that were already described above with respect to the port 314 of FIGS. 11-18A may be described in lesser detail, or may not be described at all. In this embodiment, the module 1322 has an interface on the top surface, adapted to be connected to a port interface 1320 that may be similar to the interface shown in FIGS. 38-39 or another interface configuration in which the module 1322 slides into contact with the interface 1320. In this embodiment, the module 1322 includes wings 1381 on opposite sides that fit into grooves 1381A on the sides of the well 135. As the module 1322 is slid into the well 135, the wings 1381 engage the grooves 1381A to retain the module 1322 within the well 135.

FIGS. 43-44 illustrate another embodiment of a port 1414, illustrated as received in a well 135 within a midsole member 131 of an article of footwear. Many features of this embodiment are similar or comparable to features of the port 314 described above and shown in FIGS. 11-18A, and such features are referred to using similar reference numerals under the "14xx" series of reference numerals, rather than "3xx" as used in the embodiment of FIGS. 11-18A. Accordingly, certain features of the port 1414 that were already described above with respect to the port 314 of FIGS. 11-18A may be described in lesser detail, or may not be described at all. In this embodiment, the module 1422 has an interface on the top surface, adapted to be connected to a port interface 1420 that is similar to the interface shown in FIGS. 38-39. In this embodiment, the port interface 1420 includes a rigid platform 1469 that contains the electrical contacts 1456, and the module 1422 fits underneath the platform 1469 to connect to the interface 1420. As shown in FIG. 91, the platform 1469 may be angled or otherwise biased downwardly to apply additional pressure and retaining force to the module 1422.

FIGS. 45-46A illustrate another embodiment of a port 1514, illustrated as received in a well 135 within a midsole member 131 of an article of footwear. Many features of this embodiment are similar or comparable to features of the port 314 described above and shown in FIGS. 11-18A, and such features are referred to using similar reference numerals under the "15xx" series of reference numerals, rather than "3xx" as used in the embodiment of FIGS. 11-18A. Accordingly, certain features of the port 1514 that were already described above with respect to the port 314 of FIGS. 11-18A may be described in lesser detail, or may not be described at all. In this embodiment, the port 1514 has an interface 1520 connected to an insert member 1537 that contains a sensor system (not shown) as described above. The interface 1520 contains a rigid Mylar connector forming upwardly-extending electrical contacts 1556. The module 1522 has an interface 1523 on the bottom surface thereof. When the module 1522 is inserted into the well 135, the interface 1523 of the module 1522 engages and receives the contacts 1556 of the port 1514 to form an electrical connection with the interface 1520. Additionally, the module 1522 and the port 1514 have elastomeric O-rings 1565 around the interfaces 1520, 1523 thereof, as shown in FIG. 46A, which compress when the module 1522 is inserted into the well 135, in order to create a snug, water-tight seal. In another embodiment, the module 1522 and/or the port 1514 may contain magnets or other locking/retaining devices to further secure the module 1522 in connection with the port 1514.

FIGS. 47-48 illustrate another embodiment of a port 1614, illustrated as received in a well 135 within a midsole member 131 of an article of footwear. Many features of this embodiment are similar or comparable to features of the port 314 described above and shown in FIGS. 11-18A, and such features are referred to using similar reference numerals under the "16xx" series of reference numerals, rather than "3xx" as used in the embodiment of FIGS. 11-18A. Accordingly, certain features of the port 1614 that were already described above with respect to the port 314 of FIGS. 11-18A may be described in lesser detail, or may not be described at all. In this embodiment, the port 1614 has an interface 1620 connected to an insert member 1637 that contains a sensor system (not shown) as described above. The interface 1620 contains a rigid connector 1656 extending inwardly from the edge of the well 135. The module 1622 has an interface 1623 on the top surface thereof. When the module 1622 is inserted into the well 135, the interface 1623 of the module 1622 engages the interface 1620 of the port 1614, in a manner similar to the configuration shown in FIGS. 38-39. Additionally, the foot contacting member 133 and the insert 1637 have a printed static sticker 1665 or other static seal around the port 1614, which adhere to each other when the members 133, 1637 are pressed together, in order to create a snug, water-tight seal around the port 1614. It is understood that the static sealing members 1665 may be located elsewhere in other embodiments, such as between the foot contacting member 133 and the midsole member 131.

Figure 51:
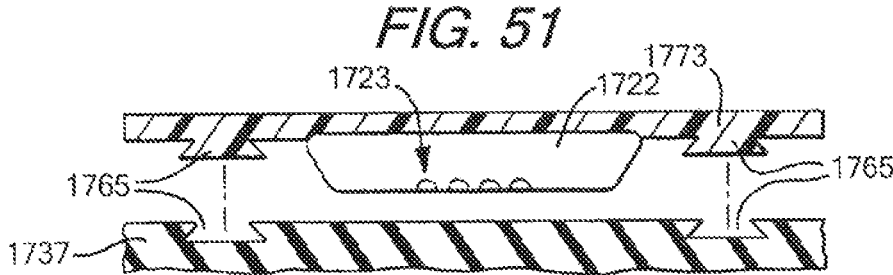
FIG. 51 is a partial cross-sectional view of the module of FIG. 52, with a portion of the port.

FIGS. 49-51 illustrate another embodiment of a port 1714, illustrated as received in a well 135 within a midsole member 131 of an article of footwear. Many features of this embodiment are similar or comparable to features of the port 314 described above and shown in FIGS. 11-18A, and such features are referred to using similar reference numerals under the "17xx" series of reference numerals, rather than "3xx" as used in the embodiment of FIGS. 11-18A. Accordingly, certain features of the port 1714 that were already described above with respect to the port 314 of FIGS. 11-18A may be described in lesser detail, or may not be described at all. In this embodiment, the port 1714 has an interface 1720 connected to an insert member 1737 that contains a sensor system (not shown) as described above. The interface 1720 contains a connector 1756 extending inwardly from the bottom edge of the well 135. The module 1722 has an interface 1723 on the bottom surface thereof. When the module 1722 is inserted into the well 135, the interface 1723 of the module 1722 engages the interface 1720 of the port 1714. Additionally, the module 1722 and the insert 1737 have complementary-engaging sealing members 1765 to achieve sealing around the port 1714, such as a resealable plastic bag-like seal, or other types of seal structures, which connect to each other when the module 1722 is pressed together with the insert 1737, in order to create a snug, water-tight seal around the port 1714. In this embodiment, the module 1722 has a flange or flanges 1773 around the edges thereof, which flange or flanges 1773 have the sealing members 1765 thereon and extend outside the well 135 to engage the sealing members 1765 of the insert 1737. The seal can be accomplished by pressure, such as running a user's finger around the area of the sealing members 1765, similar to sealing a resealable plastic bag. It is understood that the sealing members 1765 may be located elsewhere in other embodiments, such as between the foot contacting member 133 and the insert 1737 and/or the midsole member 131.

Figure 52:
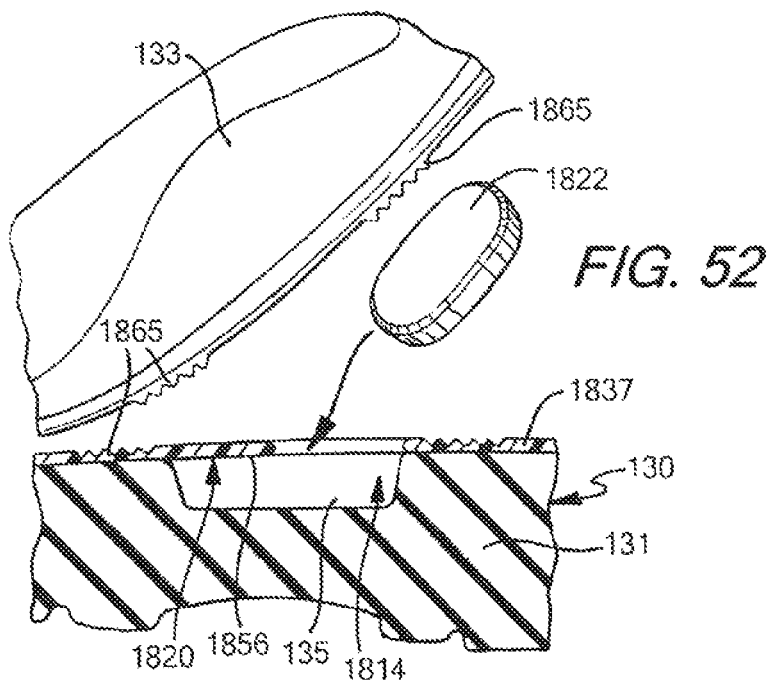
FIG. 52 is a partial cross-sectional view of a portion of another embodiment of an article of footwear, having a port and an electronic module configured for connection to the port.

FIGS. 52-53 illustrate another embodiment of a port 1814, illustrated as received in a well 135 within a midsole member 131 of an article of footwear. Many features of this embodiment are similar or comparable to features of the port 314 described above and shown in FIGS. 11-18A, and such features are referred to using similar reference numerals under the "18xx" series of reference numerals, rather than "3xx" as used in the embodiment of FIGS. 11-18A. Accordingly, certain features of the port 1814 that were already described above with respect to the port 314 of FIGS. 11-18A may be described in lesser detail, or may not be described at all. In this embodiment, the port 1814 has an interface 1820 connected to an insert member 1837 that contains a sensor system (not shown) as described above. The interface 1820 contains a rigid connector 1856 extending inwardly from the edge of the well 135. The module 1822 has an interface 1823 on the top surface thereof. When the module 1822 is inserted into the well 135, the interface 1823 of the module 1822 engages the interface 1820 of the port 1814, in a manner similar to the configuration shown in FIGS. 38-39. Additionally, the foot contacting member 133 and the insert 1837 have textured sealing portions 1865 around the port 1814, which engage each other when the members 133, 1837 are pressed together, in order to create a snug, water-tight seal around the port 1814. It is understood that the static sealing members 1865 may be located elsewhere in other embodiments, such as between the foot contacting member 133 and the midsole member 131.

Figure 54:
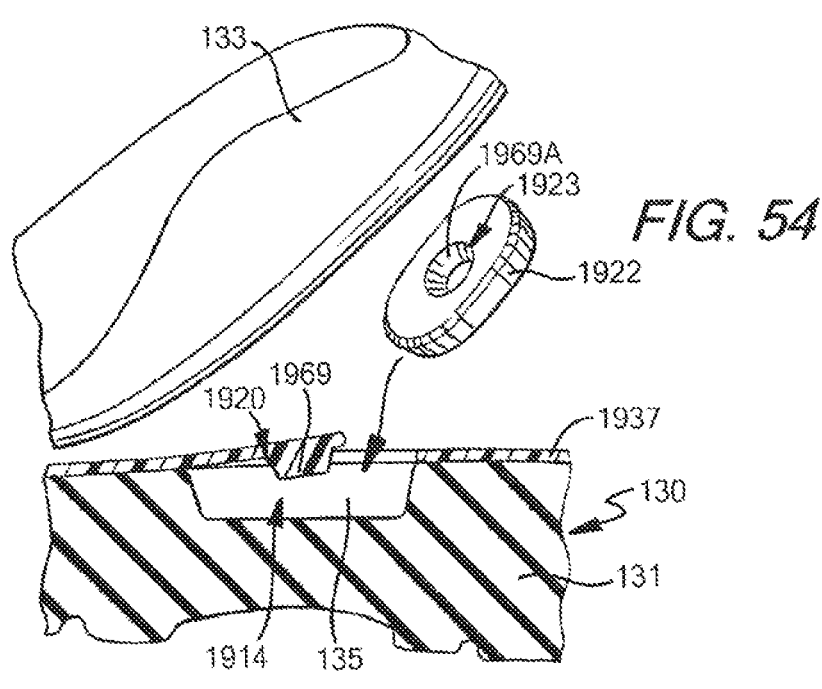
FIG. 54 is a partial cross-sectional view of a portion of another embodiment of an article of footwear, having a port and an electronic module configured for connection to the port.
Figure 55:
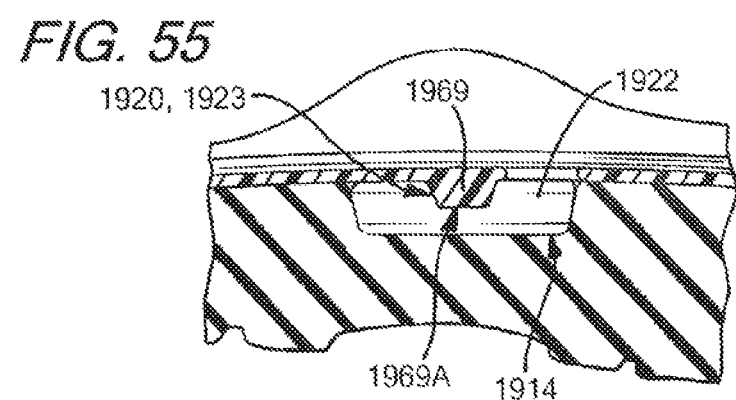
FIG. 55 is a partial cross-sectional view of the portion of the article of footwear of FIG. 54, with the module connected to the port.
Figure 56:
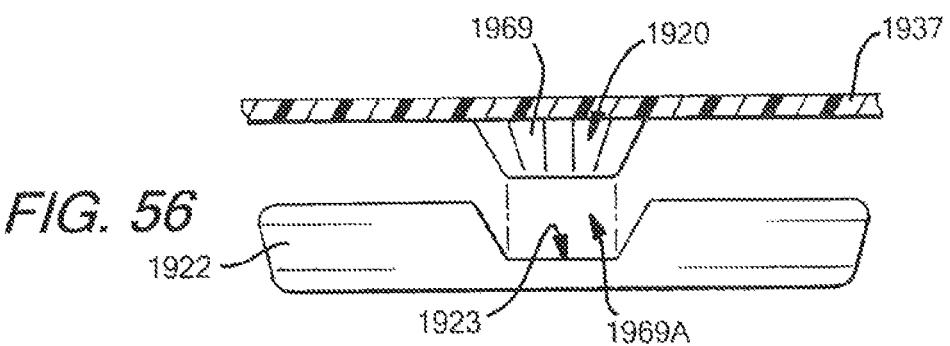
FIG. 56 is a partial cross-sectional view of a portion of the module and the port of FIG. 54.

FIGS. 54-56 illustrate another embodiment of a port 1914, illustrated as received in a well 135 within a midsole member 131 of an article of footwear. Many features of this embodiment are similar or comparable to features of the port 314 described above and shown in FIGS. 11-18A, and such features are referred to using similar reference numerals under the "19xx" series of reference numerals, rather than "3xx" as used in the embodiment of FIGS. 11-18A. Accordingly, certain features of the port 1914 that were already described above with respect to the port 314 of FIGS. 11-18A may be described in lesser detail, or may not be described at all. In this embodiment, the port 1914 has an interface 1920 connected to an insert member 1937 that contains a sensor system (not shown) as described above. The interface 1920 contains a rigid Mylar connector extending inwardly from the edge of the well 135, with the connectors positioned on a downwardly-extending plug 1969. The module 1922 has an interface 1923 on the top surface thereof, within a recess 1969A on the top surface. When the module 1922 is inserted into the well 135, the plug 1969 is received in the recess 1969A, and the interface 1923 of the module 1922 engages the interface 1920 of the port 1914. Additionally, the plug 1969 and the recess 1969A have nearly the exact same geometry, in order to create a friction-fit and a snug, water-tight seal. Downward pressure from the foot contacting member 133 further increases the friction-fit connection. In another embodiment, the module 1922 and/or the port 1914 may contain magnets or other locking/retaining devices to further secure the module 1922 in connection with the port 1914.

Figures 57, 58, 58A, 58B, 58C:
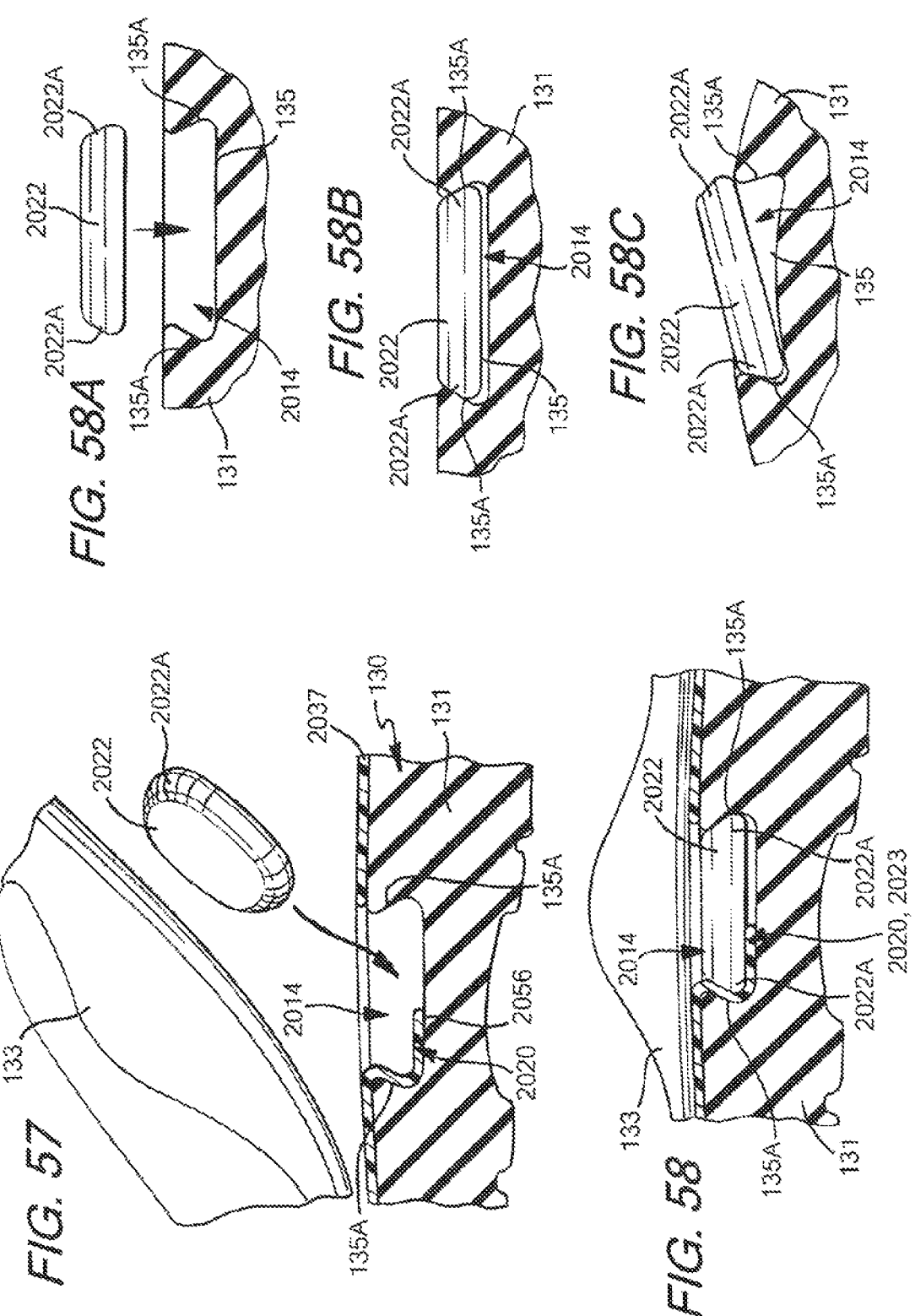
FIG. 57 is a partial cross-sectional view of a portion of another embodiment of an article of footwear, having a port and an electronic module configured for connection to the port.
FIG. 58 is a partial cross-sectional view of the portion of the article of footwear of FIG. 57, with the module connected to the port.
FIG. 58A is a partial cross-sectional view of a portion of a midsole member of the article of footwear of FIG. 57, shown during insertion of the module.
FIG. 58B is a partial cross-sectional view of the midsole member as shown in FIG. 58A, shown after insertion of the module.
FIG. 58C is a partial cross-sectional view of the midsole member as shown in FIG. 58A, shown during removal of the module.

FIGS. 57-58C illustrate another embodiment of a port 2014, illustrated as received in a well 135 within a midsole member 131 of an article of footwear. Many features of this embodiment are similar or comparable to features of the port 314 described above and shown in FIGS. 11-18A, and such features are referred to using similar reference numerals under the "20xx" series of reference numerals, rather than "3xx" as used in the embodiment of FIGS. 11-18A. Accordingly, certain features of the port 2014 that were already described above with respect to the port 314 of FIGS. 11-18A may be described in lesser detail, or may not be described at all. In this embodiment, the port 2014 has an interface 2020 connected to an insert member 2037 that contains a sensor system (not shown) as described above. The interface 2020 contains a connector 2056 extending inwardly from the bottom edge of the well 135. The module 2022 has an interface 2023 on the bottom surface thereof. When the module 2022 is inserted into the well 135, the interface 2023 of the module 2022 engages the interface 2020 of the port 2014. Additionally, the well 135 in the midsole member 131 and the module 2022 have complementary engaging shapes to retain the module 2022 within the well 135. As shown in FIGS. 58A-C, the module 2022 has tapered edges 2022A that taper outwardly from top to bottom, and the well 135 has similarly tapered side walls 135A that lock the module 2022 in the well 135. Inserting or removing the module 2022 can be accomplished by flexing the midsole member 131 sufficiently to provide clearance for the module 2022 to be inserted or removed, as shown in FIG. 58C. The contact between the tapered edges 2022A and tapered side walls 135A of the module 2022 and the well 135 can create a water-resistant seal around the interfaces 2020, 2023. In one embodiment, the port 2014 may include a resilient foam housing or pocket around the inside of the well 135 to hold the module 2022.

FIGS. 59-60 illustrate another embodiment of a port 2114, illustrated as received in a well 135 within a midsole member 131 of an article of footwear. Many features of this embodiment are similar or comparable to features of the port 314 described above and shown in FIGS. 11-18A, and such features are referred to using similar reference numerals under the "21xx" series of reference numerals, rather than "3xx" as used in the embodiment of FIGS. 11-18A. Accordingly, certain features of the port 2114 that were already described above with respect to the port 314 of FIGS. 11-18A may be described in lesser detail, or may not be described at all. In this embodiment, the port 2114 has an interface 2120 connected to an insert member 2137 that contains a sensor system (not shown) as described above. The interface 2120 contains a rigid connector 2156 extending inwardly from the edge of the well 135. The module 2122 has an interface 2123 on the top surface thereof. When the module 2122 is inserted into the well 135, the interface 2123 of the module 2122 engages the interface 2120 of the port 2114. Additionally, the foot contacting member 133 and the midsole member 131 have complementary interlocking structures around the port 2114, which engage each other when the members 131, 133 are pressed together, in order to create a snug, water-tight seal around the port 2114. The interlocking structure includes a plug 2174 on the foot contacting member 133 that extends downwardly into the well 135 to create a seal. The plug 2174 has a gasket ring 2174A that snaps into a receiving ring 2174B on the midsole member to enhance the seal, as shown in FIG. 60.

FIGS. 61-62 illustrate another embodiment of a port 2214, illustrated as received in a well 135 within a midsole member 131 of an article of footwear. Many features of this embodiment are similar or comparable to features of the port 314 described above and shown in FIGS. 11-18A, and such features are referred to using similar reference numerals under the "22xx" series of reference numerals, rather than "3xx" as used in the embodiment of FIGS. 11-18A. Accordingly, certain features of the port 2214 that were already described above with respect to the port 314 of FIGS. 11-18A may be described in lesser detail, or may not be described at all. In this embodiment, the port 2214 has an interface 2220 connected to an insert member 2237 that contains a sensor system (not shown) as described above. The interface 2220 contains a rigid connector 2256 extending inwardly from the edge of the well 135. The module 2222 has an interface 2223 on the top surface thereof. When the module 2222 is inserted into the well 135, the interface 2223 of the module 2222 engages the interface 2220 of the port 2214. Additionally, the insert member 2237 has an over-molding forming a capsule 2275 surrounding the connector 2256. The capsule 2275 can envelop the module 2222 in order to create a water-tight or water-resistant seal around the interfaces 2220, 2223. The capsule 2275 can be made from a resilient and/or flexible material, such as silicone, rubber, or another suitable material.

FIGS. 63-64 illustrate another embodiment of a port 2314, illustrated as received in a well 135 within a midsole member 131 of an article of footwear. Many features of this embodiment are similar or comparable to features of the port 314 described above and shown in FIGS. 11-18A, and such features are referred to using similar reference numerals under the "23xx" series of reference numerals, rather than "3xx" as used in the embodiment of FIGS. 11-18A. Accordingly, certain features of the port 2314 that were already described above with respect to the port 314 of FIGS. 11-18A may be described in lesser detail, or may not be described at all. In this embodiment, the port 2314 has an interface 2320 connected to an insert member 2337 that contains a sensor system (not shown) as described above. The interface 2320 contains a rigid or flexible connector 2356 extending inwardly from the edge of the well 135. The module 2322 has an interface 2323 on the top surface thereof. When the module 2322 is inserted into the well 135, the interface 2323 of the module 2322 engages the interface 2320 of the port 2314. Additionally, the insert member 2337 and the module 2322 have complementary-engaging sealing members 2365, such as a resealable plastic bag-like seal, or other seal around the interfaces 2320, 2323, which connect to each other when the connector 2356 is pressed together with the module 2322, in order to create a snug, water-tight seal. The pressure can be accomplished by running a user's finger around the sealing members 2365, similar to closing a resealable plastic bag.

FIGS. 65-66 illustrate another embodiment of a port 2414, illustrated as received in a well 135 within a midsole member 131 of an article of footwear. Many features of this embodiment are similar or comparable to features of the port 314 described above and shown in FIGS. 11-18A, and such features are referred to using similar reference numerals under the "24xx" series of reference numerals, rather than "3xx" as used in the embodiment of FIGS. 11-18A. Accordingly, certain features of the port 2414 that were already described above with respect to the port 314 of FIGS. 11-18A may be described in lesser detail, or may not be described at all. In this embodiment, the port 2414 has an interface 2420 connected to an insert member 2437 that contains a sensor system (not shown) as described above. The interface 2420 contains a rigid male-type plug 2469 extending inwardly from the edge of the well 135. The module 2422 has an interface 2423 located within a receiver 2469A or other female-type connecting structure. When the module 2422 is inserted into the well 135, plug 2469 is received within the receiver 2469A to connect the interfaces 2420, 2423. The strength of the plug 2469 may be sufficient to hold the module 2422 within the well 135, however additional retaining structure may be used, including any retaining structure described herein.

Figures 67, 68, 69, 69A:
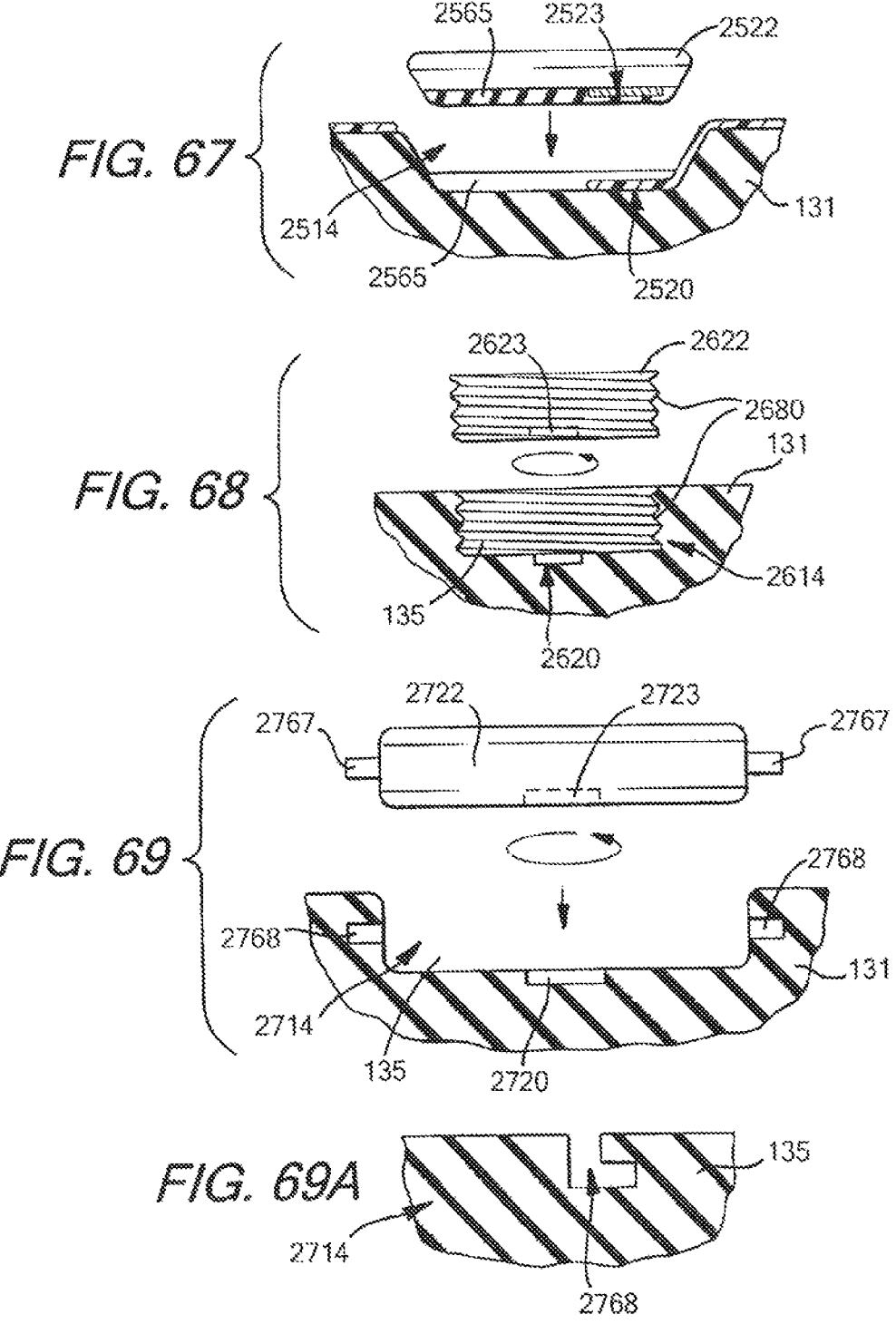
FIG. 67 is a partial cross-sectional view of a portion of another embodiment of a sole structure for an article of footwear, having a port and an electronic module configured for connection to the port.
FIG. 68 is a partial cross-sectional view of a portion of another embodiment of a sole structure for an article of footwear, having a port and an electronic module configured for connection to the port.
FIG. 69 is a partial cross-sectional view of a portion of another embodiment of a sole structure for an article of footwear, having a port and an electronic module configured for connection to the port.
FIG. 69A is a side view of the port of FIG. 69.

FIG. 67 illustrates another embodiment of a port 2514, illustrated as received in a well 135 within a midsole member 131 of an article of footwear. Many features of this embodiment are similar or comparable to features of the port 314 described above and shown in FIGS. 11-18A, and such features are referred to using similar reference numerals under the "25xx" series of reference numerals, rather than "3xx" as used in the embodiment of FIGS. 11-18A. Accordingly, certain features of the port 2514 that were already described above with respect to the port 314 of FIGS. 11-18A may be described in lesser detail, or may not be described at all. In this embodiment, the port 2514 has an interface 2520 located on the bottom of the well 135, and the module 2522 has an interface 2523 located on the bottom surface thereof. The port 2514 and the module 2522 each have a soft sealing material 2565 lining the contacting surfaces adjacent the interfaces 2520, 2523, which press together to create a watertight or water-resistant seal when the module 2522 is received in the well 135. In one embodiment, additional retaining structure may be used to retain the module 2522 within the well 135, including any retaining structure described herein.

FIG. 68 illustrates another embodiment of a port 2614, illustrated as received in a well 135 within a midsole member 131 of an article of footwear. Many features of this embodiment are similar or comparable to features of the port 314 described above and shown in FIGS. 11-18A, and such features are referred to using similar reference numerals under the "26xx" series of reference numerals, rather than "3xx" as used in the embodiment of FIGS. 11-18A. Accordingly, certain features of the port 2614 that were already described above with respect to the port 314 of FIGS. 11-18A may be described in lesser detail, or may not be described at all. In this embodiment, the port 2614 has an interface 2620 located on the bottom of the well 135, and the module 2622 has an interface 2623 located on the bottom surface thereof. The well 135 and the module 2622 each have complementary threading 2680 on the sides thereof, allowing the module 2622 to be screwed into the well 135. The module may utilize a slot for a coin-turn or a tool, such as the embodiment shown in FIGS. 40-42.

FIGS. 69 and 69A illustrate another embodiment of a port 2714, illustrated as received in a well 135 within a midsole member 131 of an article of footwear. Many features of this embodiment are similar or comparable to features of the port 314 described above and shown in FIGS. 11-18A, and such features are referred to using similar reference numerals under the "27xx" series of reference numerals, rather than "3xx" as used in the embodiment of FIGS. 11-18A. Accordingly, certain features of the port 2714 that were already described above with respect to the port 314 of FIGS. 11-18A may be described in lesser detail, or may not be described at all. In this embodiment, the port 2714 has an interface 2720 located on the bottom of the well 135, and the module 2722 has an interface 2723 located on the bottom surface thereof. The well 135 and the module 2722 have complementary bayonet-style locking structure, including projections 2767 on opposite sides of the module 2722 that are received in L-shaped or substantially L-shaped grooves 2768 on the sides of the well 135, allowing the module 2722 to be locked into the well 135 by rotating. The module may utilize a slot for a coin-turn or a tool, such as the embodiment shown in FIGS. 32-34.

Figures 70, 71, 72:
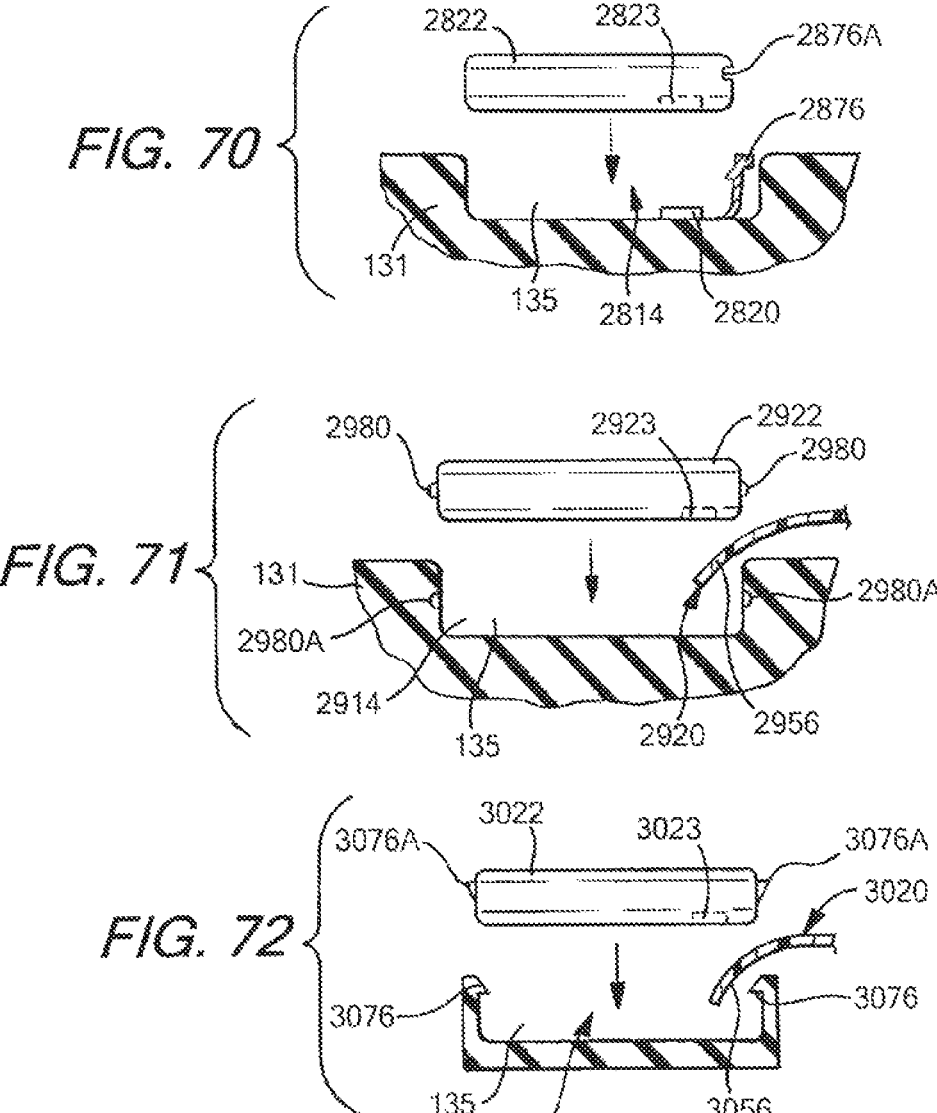
FIG. 70 is a partial cross-sectional view of a portion of another embodiment of a sole structure for an article of footwear, having a port and an electronic module configured for connection to the port.
FIG. 71 is a partial cross-sectional view of a portion of another embodiment of a sole structure for an article of footwear, having a port and an electronic module configured for connection to the port.
FIG. 72 is a partial cross-sectional view of a portion of another embodiment of a sole structure for an article of footwear, having a port and an electronic module configured for connection to the port.

FIG. 70 illustrates another embodiment of a port 2814, illustrated as received in a well 135 within a midsole member 131 of an article of footwear. Many features of this embodiment are similar or comparable to features of the port 314 described above and shown in FIGS. 11-18A, and such features are referred to using similar reference numerals under the "28xx" series of reference numerals, rather than "3xx" as used in the embodiment of FIGS. 11-18A. Accordingly, certain features of the port 2814 that were already described above with respect to the port 314 of FIGS. 11-18A may be described in lesser detail, or may not be described at all. In this embodiment, the port 2814 has an interface 2820 located on the bottom of the well 135, and the module 2822 has an interface 2823 located on the bottom surface thereof. The port 2814 has a resilient clip member 2876 that clips or clamps onto the side of the module 2822, and the module 2822 has a detent 2876A on the side to lock with the clip member 2876. The clip member 2876 can be pulled backward to release the module 2822, such as by manipulation by a user's fingertip.

FIG. 71 illustrates another embodiment of a port 2914, illustrated as received in a well 135 within a midsole member 131 of an article of footwear. Many features of this embodiment are similar or comparable to features of the port 314 described above and shown in FIGS. 11-18A, and such features are referred to using similar reference numerals under the "29xx" series of reference numerals, rather than "3xx" as used in the embodiment of FIGS. 11-18A. Accordingly, certain features of the port 2914 that were already described above with respect to the port 314 of FIGS. 11-18A may be described in lesser detail, or may not be described at all. In this embodiment, the port 2914 has an interface 2920 including a connector 2956 that extends to the bottom of the well 135, and the module 2922 has an interface 2923 located on the bottom surface thereof. The module 2922 has resilient tab members 2980 that are received within detents 2980A on the walls of the well 135 to retain the module 2922 within the well 135.

FIG. 72 illustrates another embodiment of a port 3014, illustrated as received in a well 135 within a midsole member 131 of an article of footwear. Many features of this embodiment are similar or comparable to features of the port 314 described above and shown in FIGS. 11-18A, and such features are referred to using similar reference numerals under the "30xx" series of reference numerals, rather than "3xx" as used in the embodiment of FIGS. 11-18A. Accordingly, certain features of the port 3014 that were already described above with respect to the port 314 of FIGS. 11-18A may be described in lesser detail, or may not be described at all. In this embodiment, the port 3014 has an interface 3020 including a connector 3056 that extends to the bottom of the well 135, and the module 3022 has an interface 3023 located on the bottom surface thereof. The port 3014 has resilient clip members 3076 that clip or clamp onto the sides of the module 3022, and the module 3022 has tabs 3076A on the sides to lock with the clip members 3076.

Figures 73, 74, 75, 76, 77, 78:
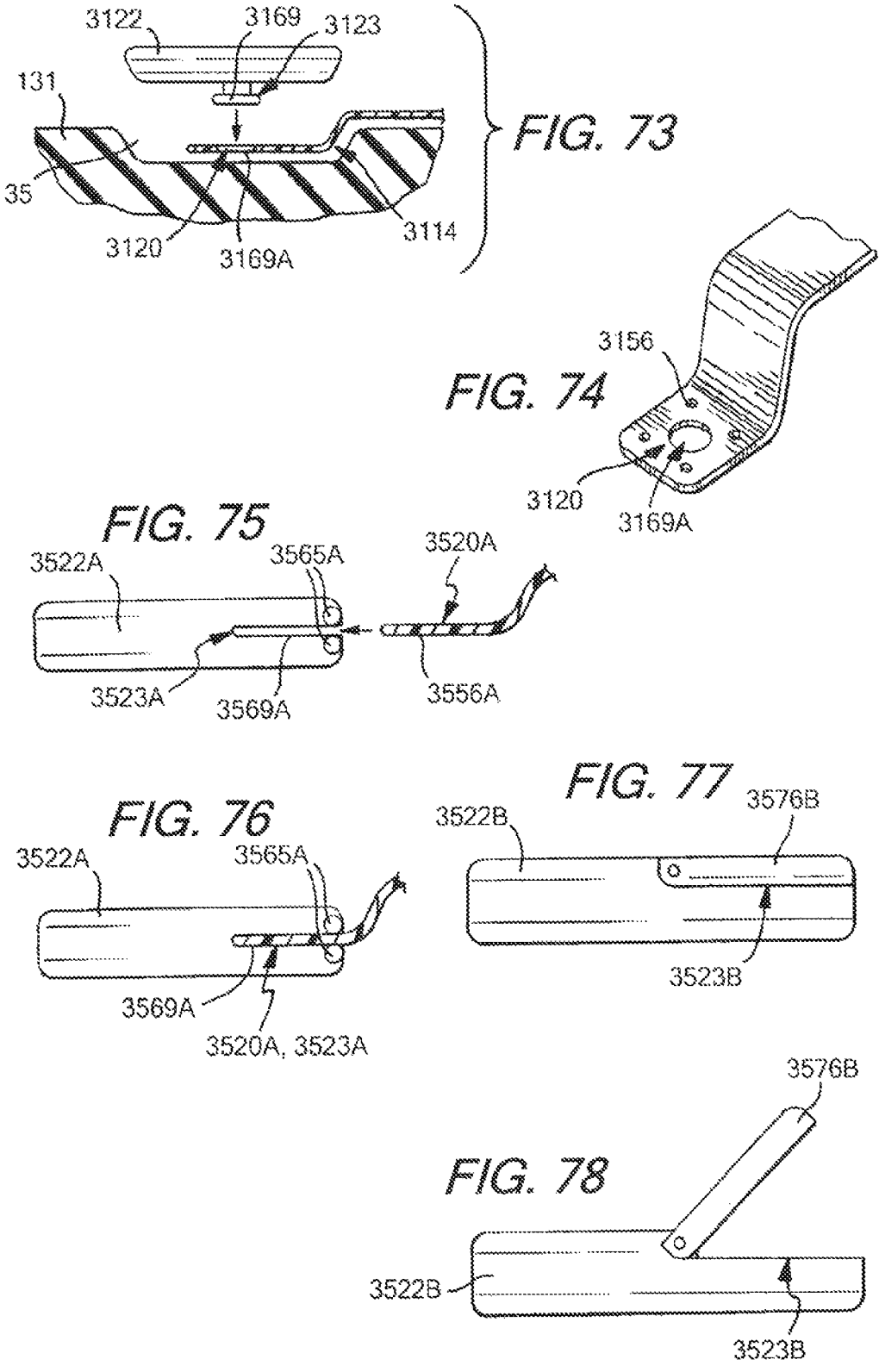
FIG. 73 is a partial cross-sectional view of a portion of another embodiment of a sole structure for an article of footwear, having a port and an electronic module configured for connection to the port.
FIG. 74 is a partial cross-sectional view of an interface of the port of FIG. 73.
FIG. 75 is a partial cross-sectional view of a portion of another embodiment of a sole structure for an article of footwear, having a port and an electronic module configured for connection to the port.
FIG. 76 is a partial cross-sectional view of the portion of the sole structure of FIG. 75, with the module connected to the port.
FIG. 77 is a partial cross-sectional view of a portion of another embodiment of a sole structure for an article of footwear, having a port and an electronic module configured for connection to the port.
FIG. 78 is a partial cross-sectional view of the portion of the sole structure of FIG. 77, with the module connected to the port.

FIGS. 73-74 illustrate another embodiment of a port 3114, illustrated as received in a well 135 within a midsole member 131 of an article of footwear. Many features of this embodiment are similar or comparable to features of the port 314 described above and shown in FIGS. 11-18A, and such features are referred to using similar reference numerals under the "31xx" series of reference numerals, rather than "3xx" as used in the embodiment of FIGS. 11-18A. Accordingly, certain features of the port 3114 that were already described above with respect to the port 314 of FIGS. 11-18A may be described in lesser detail, or may not be described at all. In this embodiment, the port 3114 has an interface 3120 including a connector 3156 that extends to the bottom of the well 135, and the module 3122 has an interface 3123 located on the bottom surface thereof. The module 3122 has a flanged projection 3169 on the bottom surface, proximate the interface 3123, and the connector 3156 has an opening 3169A that receives the projection 3169 to connect the interfaces 3120, 3123 together. In this embodiment, the flanged projection 3169 is resilient and flexible to fit within the opening 3169A snugly, creating a water seal.

FIGS. 75-85 illustrate various embodiments of connecting structure for ports 14, et seq. for connecting the interfaces 3520A-G of the ports 14, et seq. to the interfaces 3523A-G of various modules 3522A-G having complementary connecting structure. The embodiments in FIGS. 75-85 will be described briefly below with respect to their connecting structures, with the understanding that the connecting structures in FIGS. 75-85 can be used with various designs for ports 14, et seq., sensor systems 12, et seq., and footwear 100 described herein.

FIGS. 75-76 illustrate a module 3522A that includes a gasket or other water seal 3565A located around a slot 3569A, with the interface 3523A located within the slot 3569A. The port interface 3520A has a rigid or flexible Mylar connector 3556A that slides tightly into the slot 3569A to form a water seal and connect the interfaces 3520A, 3523A.

FIGS. 77-78 illustrate a module 3522B that includes a moveable clamping member 3576B positioned adjacent the interface 3523B. The clamping member 3576B can pivot to clamp down on a connector or other component of the port interface (not shown). The module 3522B may include a gasket or other sealing member (not shown).

FIGS. 79-80 illustrate a module 3522C that includes moveable clamping arms 3576C, with the interface 3523C located between the arms 3576C. The port interface 3520C has a rigid or flexible Mylar connector 3556C, and the arms 3576C clamp together on the connector 3556C to connect the interfaces 3520C, 3523C. The arms 3576C may include gaskets or other sealing members (not shown).

FIG. 81 illustrates a connecting structure that includes a capsule 3575D positioned around the interface 3520D, similar to the capsule 2275 illustrated in FIGS. 61-62 and described above. In this embodiment, the port interface 3520D and the interface 3523D of the module 3522D contain male-female connecting structure, which differs from the configuration in FIGS. 61-62. The port interface 3520D includes a connector 3556D that is received in a receiver 3569D in the module 3522D in this embodiment.

FIG. 82 illustrates a module 3522E and a port interface 3520E that include magnets 3577E around the interfaces 3520E, 3523E. The magnets 3577E connect the interfaces 3520E, 3523E together. The module 3522E may additionally include a gasket or other sealing member (not shown).

FIG. 83 illustrates a module 3522F that includes a clamping member 3576F positioned adjacent the interface 3523F that is clamped by the use of fasteners 3578F. The clamping member 3576F receives a connector 3556F of the port interface 3520F, and the fasteners 3578F are then tightened to clamp down on the connector 3556F. The module 3522F also includes a sealing member 3565F to create a water seal around the connector 3556F, such as a Mylar liner, a silicone or rubber liner or gasket, or other sealing member 3565F.

FIGS. 84-85 illustrate a module 3522G that includes a slot 3569G having snap-clamping members 3576G, with the interface 3523G located within the slot 3569G. The module 3522G also includes a trigger 3579G within the slot 3569G that activates the clamping members 3576G through an internal mechanism. The port interface 3520G has a Mylar connector 3556G that is inserted into the slot 3569G. When the connector 3556G hits the trigger 3579G, the clamping members 3576G clamp together on the connector 3556G to retain the connector 3556G in the slot 3569G. The clamping members 3576G may sandwich and frictionally retain the connector 3556G, or may extend through holes in the connector 3556G. The slot 3569G may include gaskets or other sealing members (not shown).

The operation and use of the sensor systems 12, 212, including the ports 14, et seq. shown and described herein, are described below with respect to the sensor system 12 shown in FIGS. 3-5, and it is understood that the principles of operation of the sensor system 12, including all embodiments and variations thereof, are applicable to the other embodiments of the sensor systems 212, et seq. and ports 214, et seq. described above. In operation, the sensors 16 gather data according to their function and design, and transmit the data to the port 14. The port 14 then allows the electronic module 22 to interface with the sensors 16 and collect the data for later use and/or processing. In one embodiment, the data is collected, stored, and transmitted in a universally readable format, so the data is able to be accessed and/or downloaded by a plurality of users, with a variety of different applications, for use in a variety of different purposes. In one example, the data is collected, stored, and transmitted in XML format. Additionally, in one embodiment, data may be collected from the sensors 16 in a sequential manner, and in another embodiment, data may be collected from two or more sensors 16 simultaneously.

In different embodiments, the sensor system 12 may be configured to collect different types of data. In one embodiment (described above), the sensor(s) 16 can collect data regarding the number, sequence, and/or frequency of compressions. For example, the system 12 can record the number or frequency of steps, jumps, cuts, kicks, or other compressive forces incurred while wearing the footwear 100, as well as other parameters, such as contact time and flight time. Both quantitative sensors and binary on/off type sensors can gather this data. In another example, the system can record the sequence of compressive forces incurred by the footwear, which can be used for purposes such as determining foot pronation or supination, weight transfer, foot strike patterns, or other such applications. In another embodiment (also described above), the sensor(s) 16 are able to quantitatively measure the compressive forces on the adjacent portions of the shoe 100, and the data consequently can include quantitative compressive force and/or impact measurement. Relative differences in the forces on different portions of the shoe 100 can be utilized in determining weight distribution and "center of pressure" of the shoe 100. The weight distribution and/or center of pressure can be calculated independently for one or both shoes 100, or can be calculated over both shoes together, such as to find a center of pressure or center of weight distribution for a person's entire body. As described above, a relatively densely packed array of on/off binary sensors can be used to measure quantitative forces by changes detected in "puddling" activation of the sensors during moments of greater compression. In further embodiments, the sensor(s) 16 may be able to measure rates of changes in compressive force, contact time, flight time or time between impacts (such as for jumping or running), and/or other temporally-dependent parameters. It is understood that, in any embodiment, the sensors 16 may require a certain threshold force or impact before registering the force/impact.

As described above, the data is provided through the universal port 14 to the module 22 in a universally readable format, so that the number of applications, users, and programs that can use the data is nearly unlimited. Thus, the port 14 and module 22 are configured and/or programmed as desired by a user, and the port 14 and module 22 receive input data from the sensor system 12, which data can be used in any manner desired for different applications. In many applications, the data is further processed by the module 22 and/or the external device 110 prior to use. It is understood that one or more of the sensors 16, the port 14, the module 22, the external device 110 (including the device 110A), and/or any combination of such components may process at least a portion of the data in some embodiments, provided that such components include hardware and/or other structure with processing capability. In configurations where the external device 110 further processes the data, the module 22 may transmit the data to the external device 110. This transmitted data may be transmitted in the same universally-readable format, or may be transmitted in another format, and the module 22 may be configured to change the format of the data. Additionally, the module 22 can be configured and/or programmed to gather, utilize, and/or process data from the sensors 16 for one or more specific applications. In one embodiment, the module 22 is configured for gathering, utilizing, and/or processing data for use in a plurality of applications. Examples of such uses and applications are given below. As used herein, the term "application" refers generally to a particular use, and does not necessarily refer to use in a computer program application, as that term is used in the computer arts. Nevertheless, a particular application may be embodied wholly or partially in a computer program application.

Further, the module 22 can be removed from the footwear 100 and replaced with a second module 22 configured for operating differently than the first module 22. The original module 22 can be removed, such as in manners described above, and the second module 22 may be inserted in the same manner as the original module 22. The second module 22 may be programmed and/or configured differently than the first module 22. It is understood that the module 22 can be removed and replaced by another module 22 configured in a similar or identical manner, such as replacement due to battery drain, malfunction, etc. In one embodiment, the first module 22 may be configured for use in one or more specific applications, and the second module 22 may be configured for use in one or more different applications. For example, the first module 22 may be configured for use in one or more gaming applications and the second module 22 may be configured for use in one or more athletic performance monitoring applications. Additionally, the modules 22 may be configured for use in different applications of the same type. For example, the first module 22 may be configured for use in one game or athletic performance monitoring application, and the second module 22 may be configured for use in a different game or athletic performance monitoring application. As another example, the modules 22 may be configured for different uses within the same game or performance monitoring application. In another embodiment, the first module 22 may be configured to gather one type of data, and the second module 22 may be configured to gather a different type of data. Examples of such types of data are described herein, including quantitative force measurement, relative force measurement (i.e. sensors 16 relative to each other), weight shifting/transfer, impact sequences (such as for foot strike patterns) rate of force change, etc. In a further embodiment, the first module 22 may be configured to utilize or process data from the sensors 16 in a different manner than the second module 22. For example, the modules 22 may be configured to only gather, store, and/or communicate data, or the modules 22 may be configured to further process the data in some manner, such as organizing the data, changing the form of the data, performing calculations using the data, etc. In yet another embodiment, the modules 22 may be configured to communicate differently, such as having different communication interfaces or being configured to communicate with different external devices 110. The modules 22 may function differently in other aspects as well, including both structural and functional aspects, such as using different power sources or including additional or different hardware components, such as additional sensors as described above (e.g. GPS, accelerometer, etc.).

One use contemplated for the data collected by the system 12 is in measuring weight transfer, which is important for many athletic activities, such as a golf swing, a baseball/softball swing, a hockey swing (ice hockey or field hockey), a tennis swing, throwing/pitching a ball, etc. The pressure data collected by the system 12 can give valuable feedback regarding balance and stability for use in improving technique in any applicable athletic field. It is understood that more or less expensive and complex sensor systems 12 may be designed, based on the intended use of the data collected thereby.

The data collected by the system 12 can be used in measurement of a variety of other athletic performance characteristics. The data can be used to measure the degree and/or speed of foot pronation/supination, foot strike patterns, balance, and other such parameters, which can be used to improve technique in running/jogging or other athletic activities. With regard to pronation/supination, analysis of the data can also be used as a predictor of pronation/supination. Speed and distance monitoring can be performed, which may include pedometer-based measurements, such as contact measurement or loft time measurement. Jump height can also be measured, such as by using contact or loft time measurement. Lateral cutting force can be measured, including differential forces applied to different parts of the shoe 100 during cutting. The sensors 16 can also be positioned to measure shearing forces, such as a foot slipping laterally within the shoe 100. As one example, additional sensors may be incorporated into the sides of the upper 120 of the shoe 100 to sense forces against the sides. As another example, a high-density array of binary sensors could detect shearing action through lateral changes in "puddling" of the activated sensors.

In another embodiment (not shown) one or more sensors 16 can additionally or alternately be incorporated into the upper 120 of the shoe 100. In this configuration, additional parameters can be measured, such as kick force, such as for soccer or football, as well as number and/or frequency of "touches" in soccer.

The data, or the measurements derived therefrom, may be useful for athletic training purposes, including improving speed, power, quickness, consistency, technique, etc. The port 14, module 22, and/or external device 110 can be configured to give the user active, real-time feedback. In one example, the port 14 and/or module 22 can be placed in communication with a computer, mobile device, etc., in order to convey results in real time. In another example, one or more vibration elements may be included in the shoe 100, which can give a user feedback by vibrating a portion of the shoe to help control motion, such as the features disclosed in U.S. Pat. No. 6,978,684, which is incorporated herein by reference and made part hereof. Additionally, the data can be used to compare athletic movements, such as comparing a movement with a user's past movements to show consistency, improvement, or the lack thereof, or comparing a user's movement with the same movement of another, such as a professional golfer's swing. Further, the system 12 may be used to record biomechanical data for a "signature" athletic movement of an athlete. This data could be provided to others for use in duplicating or simulating the movement, such as for use in gaming applications or in a shadow application that overlays a movement over a user's similar movement.

The system 12 can also be configured for "all day activity" tracking, to record the various activities a user engages in over the course of a day. The system 12 may include a special algorithm for this purpose, such as in the module 22, the external device 110, and/or the sensors 16.

The system 12 may also be used for control applications, rather than data collection and processing applications. In other words, the system 12 could be incorporated into footwear, or another article that encounters bodily contact, for use in controlling an external device 110, such as a computer, television, video game, etc., based on movements by the user detected by the sensors 16. In effect, the footwear with the incorporated sensors 16 and leads 18 extending to a universal port 14 allows the footwear to act as an input system, and the electronic module 22 can be configured, programmed, and adapted to accept the input from the sensors 16 and use this input data in any desired manner, e.g., as a control input for a remote system. For example, a shoe with sensor controls could be used as a control or input device for a computer, or for a program being executed by the computer, similarly to a mouse, where certain foot movements, gestures, etc. (e.g., a foot tap, double foot tap, heel tap, double heel tap, side-to-side foot movement, foot-point, foot-flex, etc.) can control a pre-designated operation on a computer (e.g., page down, page up, undo, copy, cut, paste, save, close, etc.). Software can be provided to assign foot gestures to different computer function controls for this purpose. It is contemplated that an operating system could be configured to receive and recognize control input from the sensor system 12. Televisions or other external electronic devices can be controlled in this manner. Footwear 100 incorporating the system 12 can also be used in gaming applications and game programs, similarly to the Nintendo Wii controller, where specific movements can be assigned certain functions and/or can be used to produce a virtual representation of the user's motion on a display screen. As one example, center of pressure data and other weight distribution data can be used in gaming applications, which may involve virtual representations of balancing, weight shifting, and other performance activities. The system 12 can be used as an exclusive controller for a game or other computer system, or as a complementary controller. Examples of configurations and methods of using sensor systems for articles of footwear as controls for external devices and foot gestures for such controls are shown and described in U.S. Provisional Application No. 61/138,048, which is incorporated by reference herein in its entirety.

Additionally, the system 12 may be configured to communicate directly with the external device 110 and/or with a controller for the external device. As described above, FIG. 6 illustrates one embodiment for communication between the electronic module 22 and the external device. In another embodiment, shown in FIG. 86, the system 12 can be configured for communication with an external gaming device 110A. The external gaming device 110A contains similar components to the exemplary external device 110 shown in FIG. 6. The external gaming device 110A also includes at least one game media 307 containing a game program (e.g. a cartridge, CD, DVD, Blu-Ray, or other storage device), and at least one remote controller 305 configured to communicate by wired and/or wireless connection through the transmitting/receiving element 108. In the embodiment shown, the controller 305 complements the user input 310, however in one embodiment, the controller 305 may function as the sole user input. In this embodiment, the system 12 is provided with an accessory device 303, such as a wireless transmitter/receiver with a USB plug-in, that is configured to be connected to the external device 110 and/or the controller 305 to enable communication with the module 22. In one embodiment, the accessory device 303 may be configured to be connected to one or more additional controllers and/or external devices, of the same and/or different type than the controller 305 and the external device 110. It is understood that if the system 12 includes other types of sensors described above (e.g., an accelerometer), such additional sensors can also be incorporated into controlling a game or other program on an external device 110.

An external device 110, such as a computer/gaming system, can be provided with other types of software to interact with the system 12. For example, a gaming program may be configured to alter the attributes of an in-game character based on a user's real-life activities, which can encourage exercise or greater activity by the user. In another example, a program may be configured to display an avatar of the user that acts in relation or proportion to the user activity collected by the sensing system of the shoe. In such a configuration, the avatar may appear excited, energetic, etc., if the user has been active, and the avatar may appear sleepy, lazy, etc., if the user has been inactive. The sensor system 12 could also be configured for more elaborate sensing to record data describing a "signature move" of an athlete, which could then be utilized for various purposes, such as in a gaming system or modeling system.

Figures 87, 88, 89:
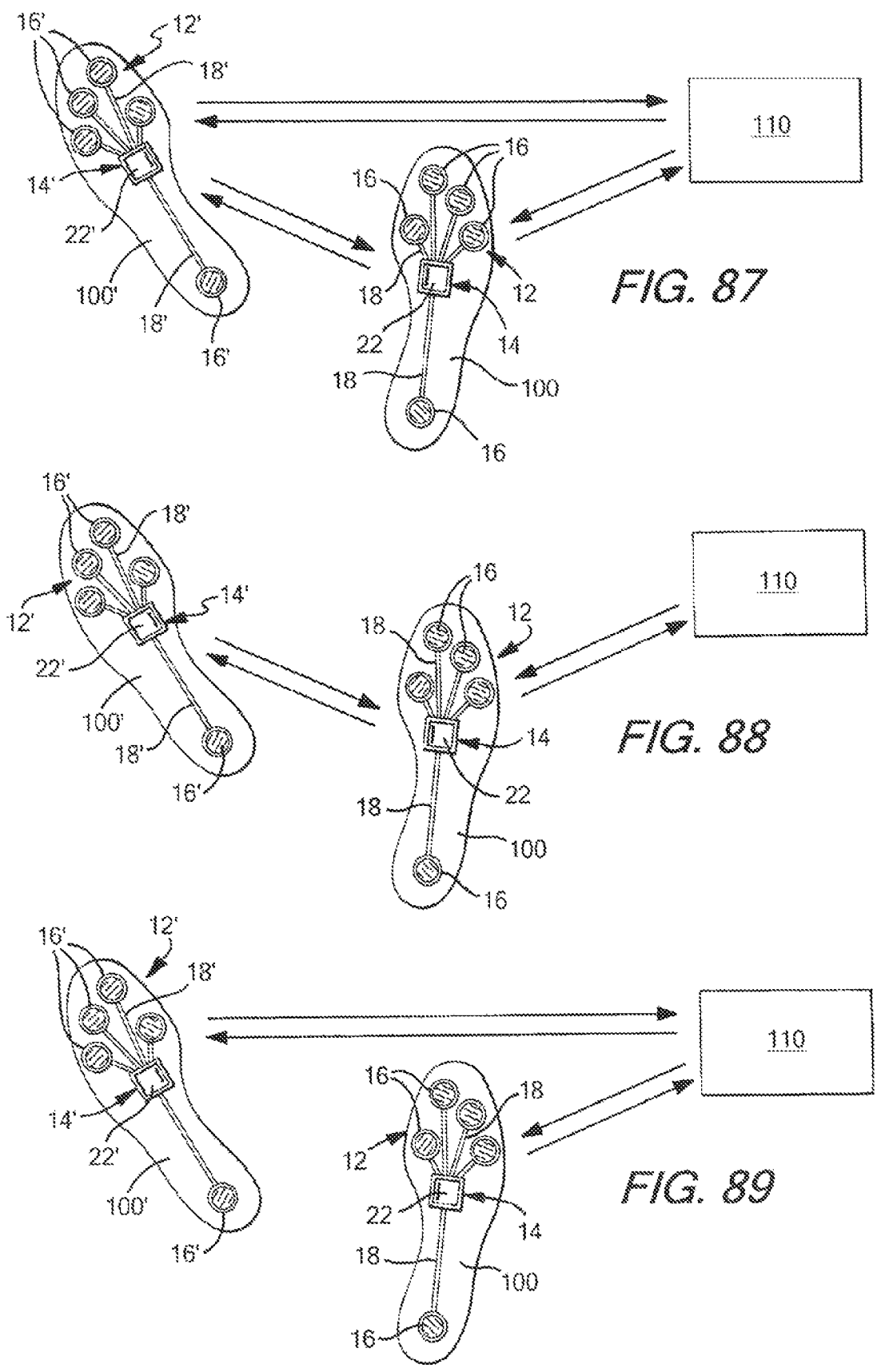
FIG. 87 is a schematic diagram of a pair of shoes, each containing a sensor system, in a mesh communication mode with an external device.
FIG. 88 is a schematic diagram of a pair of shoes, each containing a sensor system, in a "daisy chain" communication mode with an external device.
FIG. 89 is a schematic diagram of a pair of shoes, each containing a sensor system, in an independent communication mode with an external device.

A single article of footwear 100 containing the sensor system 12 as described herein can be used alone or in combination with a second article of footwear 100' having its own sensor system 12', such as a pair of shoes 100, 100' as illustrated in FIGS. 87-89. The sensor system 12' of the second shoe 100' generally contains one or more sensors 16' connected by sensor leads 18' to a port 14' in communication with an electronic module 22'. The second sensor system 12' of the second shoe 100' shown in FIGS. 87-89 has the same configuration as the sensor system 12 of the first shoe 100. However, in another embodiment, the shoes 100, 100' may have sensor systems 12, 12' having different configurations. The two shoes 100, 100' are both configured for communication with the external device 110, and in the embodiment illustrated, each of the shoes 100, 100' has an electronic module 22, 22' configured for communication with the external device 110. In another embodiment, both shoes 100, 100' may have ports 14, 14' configured for communication with the same electronic module 22. In this embodiment, at least one shoe 100, 100' may be configured for wireless communication with the module 22. FIGS. 87-89 illustrate various modes for communication between the modules 22, 22'

FIG. 87 illustrates a "mesh" communication mode, where the modules 22, 22' are configured for communicating with each other, and are also configured for independent communication with the external device 110. FIG. 88 illustrates a "daisy chain" communication mode, where one module 22' communicates with the external device 110 through the other module 22. In other words, the second module 22' is configured to communicate signals (which may include data) to the first module 22, and the first module 22 is configured to communicate signals from both modules 22, 22' to the external device 110. Likewise, the external device communicates with the second module 22' through the first module 22, by sending signals to the first module 22, which communicates the signals to the second module 22'. In one embodiment, the modules 22, 22' can also communicate with each other for purposes other than transmitting signals to and from the external device 110. FIG. 89 illustrates an "independent" communication mode, where each module 22, 22' is configured for independent communication with the external device 110, and the modules 22, 22' are not configured for communication with each other. In other embodiments, the sensor systems 12, 12' may be configured for communication with each other and/or with the external device 110 in another manner.

Still other uses and applications of the data collected by the system 12 are contemplated within the scope of the invention and are recognizable to those skilled in the art.

Sensor systems 12, 212 as described above can be customized for use with specific software for the electronic module 22 and/or the external device 110. Such software may be provided along with a sensor system 12, 212, such as in the form of a sole insert 237 having a customized sensor assembly 213, as a kit or package.

As will be appreciated by one of skill in the art upon reading the present disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more tangible computer-readable storage media or storage devices having computer-readable program code, or instructions, embodied in or on the storage media. Any suitable tangible computer readable storage media may be utilized, including hard disks, CD-ROMs, optical storage devices, magnetic storage devices, and/or any combination thereof. In addition, various intangible signals representing data or events as described herein may be transferred between a source and a destination in the form of electromagnetic waves traveling through signal-conducting media such as metal wires, optical fibers, and/or wireless transmission media (e.g., air and/or space).

As described above, aspects of the present invention may be described in the general context of computer-executable instructions, such as program modules, being executed by a computer and/or a processor thereof. Generally, program modules include routines, programs, objects, components, data structures, etc. that perform particular tasks or implement particular abstract data types. Such a program module may be contained in a tangible computer-readable medium, as described above. Aspects of the present invention may also be practiced in distributed computing environments where tasks are performed by remote processing devices that are linked through a communications network. Program modules may be located in a memory, such as the memory 204 of the module 22 or memory 304 of the external device 110, or an external medium, such as game media 307, which may include both local and remote computer storage media including memory storage devices. It is understood that the module 22, the external device 110, and/or external media may include complementary program modules for use together, such as in a particular application. It is also understood that a single processor 202, 302 and single memory 204, 304 are shown and described in the module 22 and the external device 110 for sake of simplicity, and that the processor 202, 302 and memory 204, 304 may include a plurality of processors and/or memories respectively, and may comprise a system of processors and/or memories.

The various embodiments of the sensor system described herein, as well as the articles of footwear, foot contacting members, inserts, and other structures incorporating the sensor system, provide benefits and advantages over existing technology. For example, many of the port embodiments described herein provide relatively low cost and durable options for use with sensor systems, so that a sensor system can be incorporated into articles of footwear with little added cost and good reliability. As a result, footwear can be manufactured with integral sensor systems regardless of whether the sensor systems are ultimately desired to be used by the consumer, without appreciably affecting price. Additionally, sole inserts with customized sensor systems can be inexpensively manufactured and distributed along with software designed to utilize the sensor systems, without appreciably affecting the cost of the software. As another example, the sensor system provides a wide range of functionality for a wide variety of applications, including gaming, fitness, athletic training and improvement, practical controls for computers and other devices, and many others described herein and recognizable to those skilled in the art. In one embodiment, third-party software developers can develop software configured to run using input from the sensor systems, including games and other programs. The ability of the sensor system to provide data in a universally readable format greatly expands the range of third party software and other applications for which the sensor system can be used. As a further example, the various sole inserts containing sensor systems, including liners, insoles, and other elements, permit interchangeability and customization of the sensor system for different applications. Still further, various port and module configurations described herein can provide for secure connections with reasonable expense and minimal to no negative effect on shoe performance or response. The connecting structures may also be water-resistant or water-tight to resist interference from sweat and other fluids. Additionally, the connecting structures of the various port configurations described herein may provide quick and easy interchanging of one module for another. Those skilled in the art will recognize yet other benefits and advantages from the configurations described herein.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "Providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention and the scope of protection is only limited by the scope of the accompanying Claims.

The invention claimed is:

1. An insert configured for use in an article of footwear, comprising:

an insert member adapted to be placed in contact with a sole structure of the article of footwear, the insert member being formed of a flexible polymer material and having an opening;

a plurality of force sensors connected to the insert member, the force sensors being adapted to sense a force exerted on the insert member;

a plurality of sensor leads extending away from the force sensors; and a port comprising:

a housing connected to the insert member, the housing comprising a chamber accessible through the opening in the insert member and adapted to removably receive an electronic module therein by insertion through the opening;

a plug extending into the chamber from a wall of the housing, the plug configured to be received in a receiver within the electronic module when the electronic module is received in the housing; and an interface in communication with the sensor leads and having a plurality of electrical contacts located on the plug, wherein the interface is configured to form an electrical connection with the electronic module, and each of the sensor leads is individually connected to one of the electrical contacts of the interface, such that the electronic module engages the electrical contacts to place the electronic module in communication with the sensor leads and the force sensors individually when the electronic module is received within the chamber and the plug is received within the receiver of the electronic module.

2. The insert of claim 1, wherein the sensor leads are connected to the electrical contacts of the interface.

3. The insert of claim 1, further comprising the electronic module, wherein the electronic module has the receiver therein, and the plug is received in the receiver when the electronic module is received within the housing.

4. The system of claim 3, wherein the plug has a rigid structure and engages the electronic module to removably retain the electronic module in the housing.

5. The insert of claim 1, wherein the wall of the housing is a side wall of the housing, and the plug extends horizontally into the housing from the side wall.

6. The insert of claim 5, wherein the housing further has a bottom wall and a top opening, with the side wall extending upward from the bottom wall to the top opening.

7. The insert of claim 5, wherein the plug has a rigid structure and is further configured to engage the electronic module to removably retain the electronic module in the housing.

8. The insert of claim 1, wherein the housing is configured to be received in a well in a sole structure of the article of footwear.

9. The insert of claim 1, wherein the housing further comprises a retaining structure adapted for removably retaining the electronic module in the housing.

10. The insert of claim 1, wherein the plug has a rigid structure and is further configured to engage the electronic module to removably retain the electronic module in the housing.

11. An article of footwear adapted to engage a foot, comprising:

a sole structure, the sole structure having a well defined therein;

an upper portion connected to the sole structure;

an insert member in contact with the sole structure, the insert member being formed of a flexible polymer material and having an opening;

a sensor system comprising a plurality of force sensors connected to the insert member;

an electronic module configured for data storage; and a port comprising:

a chamber within the well of the sole structure that is accessible through the opening in the insert member, wherein the chamber is configured for receiving the electronic module therein by insertion through the opening;

a plug extending into the chamber from a wall of the well, the plug configured to be received in a receiver within the electronic module when the electronic module is received in the well; and an interface in communication with the sensor system and having a plurality of electrical contacts located on the plug, wherein the interface is configured to form an electrical connection with the electronic module, and each of the force sensors of the sensor system is individually connected to one of the contacts of the interface, such that the electronic module engages the electrical contacts to place the electronic module in communication with the sensor system when the electronic module is received within the chamber and the plug is received within the receiver of the electronic module.

12. The article of footwear of claim 11, wherein the sensor system further comprises:

a plurality of sensor leads connected to the force sensors and extending from the force sensors to the port, wherein the sensor leads are connected to the electrical contacts of the interface.

13. The article of footwear of claim 12, wherein the port comprises a housing received in the well and defining the chamber and connected to the insert member.

14. The article of footwear of claim 11, wherein the wall of the well is a side wall of the well, and the plug extends horizontally into the chamber from the side wall.

15. The article of footwear of claim 14, wherein the well further has a bottom wall and a top opening, with the side wall extending upward from the bottom wall to the top opening.

16. The article of footwear of claim 14, wherein the plug has a rigid structure and engages the electronic module to removably retain the electronic module in the well.

17. The article of footwear of claim 11, wherein the plug has a rigid structure and engages the electronic module to removably retain the electronic module in the well.

\* \* \* \* \*